US011946319B2

(12) United States Patent
Betz et al.

(10) Patent No.: US 11,946,319 B2
(45) Date of Patent: Apr. 2, 2024

(54) LOAD TRANSFER STATIONS

(71) Applicant: Oshkosh Corporation, Oshkosh, WI (US)

(72) Inventors: Eric D. Betz, Clintonville, WI (US); David W. Archer, Hortonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1195 days.

(21) Appl. No.: 16/664,393

(22) Filed: Oct. 25, 2019

(65) Prior Publication Data

US 2020/0056426 A1 Feb. 20, 2020

Related U.S. Application Data

(63) Continuation of application No. 16/389,600, filed on Apr. 19, 2019, now Pat. No. 10,458,182.

(60) Provisional application No. 62/661,414, filed on Apr. 23, 2018.

(51) Int. Cl.

| | |
|---|---|
| ***E06C 5/44*** | (2006.01) |
| ***A62C 27/00*** | (2006.01) |
| ***B66F 11/04*** | (2006.01) |
| ***E06C 5/04*** | (2006.01) |

(52) U.S. Cl.

CPC ................ *E06C 5/44* (2013.01); *A62C 27/00* (2013.01); *B66F 11/046* (2013.01); *E06C 5/04* (2013.01)

(58) Field of Classification Search

CPC ... E06C 5/44; E06C 5/04; A62C 27/00; B66F 11/046

See application file for complete search history.

(56) References Cited

U.S. PATENT DOCUMENTS

| | | | | |
|---|---|---|---|---|
| 1,887,546 A | | 6/1931 | Cowell | |
| 4,852,690 A | * | 8/1989 | Salmi | E06C 5/04 182/2.11 |
| 4,998,982 A | * | 3/1991 | Arnold | E06C 7/46 182/159 |
| 5,538,274 A | | 7/1996 | Schmitz et al. | |
| 5,713,424 A | | 2/1998 | Christenson | |
| 5,820,150 A | | 10/1998 | Archer et al. | |
| 5,897,123 A | | 4/1999 | Cherney et al. | |
| 6,086,074 A | | 7/2000 | Braun | |
| 6,123,347 A | | 9/2000 | Christenson | |
| 6,561,718 B1 | | 5/2003 | Archer et al. | |
| 6,860,332 B1 | | 3/2005 | Archer et al. | |
| 6,883,815 B2 | | 4/2005 | Archer | |
| 6,976,688 B2 | | 12/2005 | Archer et al. | |
| 7,006,902 B2 | | 2/2006 | Archer et al. | |

(Continued)

*Primary Examiner* — Jacob D Knutson

(74) *Attorney, Agent, or Firm* — Foley & Lardner LLP

(57) ABSTRACT

A fire apparatus includes a chassis, axles coupled to the chassis, a turntable rotatably coupled to the chassis, and an aerial ladder assembly pivotably coupled the turntable. The aerial ladder assembly includes a first ladder section extending longitudinally, a second ladder section extending longitudinally, and a support slidably coupling the second ladder section to the first ladder section such that the first ladder section supports the second ladder section. The support facilitates longitudinal movement of the second ladder section relative to the first ladder section between an extended position and a retracted position. The support is pivotably coupled to the first ladder section.

12 Claims, 44 Drawing Sheets

(56) References Cited

U.S. PATENT DOCUMENTS 7,100,741 B2* 9/2006 Wissler ................ F16C 29/045 182/208
7,387,348 B2 6/2008 Archer et al.
7,389,826 B2 6/2008 Linsmeier et al.
8,839,902 B1 9/2014 Archer et al.
9,302,129 B1 4/2016 Betz et al.
9,492,695 B2 11/2016 Betz et al.
9,579,530 B2 2/2017 Betz et al.
9,580,960 B2 2/2017 Aiken et al.
9,580,962 B2 2/2017 Betz et al.
9,677,334 B2 6/2017 Aiken et al.
9,981,803 B2 5/2018 Davis et al.
10,196,205 B2 2/2019 Betz et al.
10,458,182 B1* 10/2019 Betz ...................... A62C 27/00
2002/0014364 A1 2/2002 Bartlett
2004/0245039 A1 12/2004 Braun et al.
2005/0253344 A1 11/2005 Trinkner et al.
2006/0021764 A1 2/2006 Archer et al.
2006/0032701 A1 2/2006 Linsmeier et al.
2006/0032702 A1 2/2006 Linsmeier et al.
2006/0086566 A1 4/2006 Linsmeier et al.
2006/0249325 A1 11/2006 Braun et al.
2007/0164552 A1 7/2007 Bauer et al.
2015/0273252 A1* 10/2015 Lenz, Jr. ............... A62C 27/00 182/17
2016/0144211 A1 5/2016 Betz et al.
2016/0145940 A1* 5/2016 Aiken ...................... B60R 3/02 182/64.1
2016/0304051 A1 10/2016 Archer et al.
2016/0305185 A1* 10/2016 Salmi ....................... E06C 5/04
2018/0215597 A1 8/2018 Linsmeier et al.
2018/0297597 A1 10/2018 Linsmeier et al.
2019/0106083 A1 4/2019 Archer et al.
2019/0161272 A1 5/2019 Betz et al.

* cited by examiner

LOAD TRANSFER STATIONS

CROSS-REFERENCE TO RELATED PATENT APPLICATIONS

This is a continuation of U.S. application Ser. No. 16/389,600, filed Apr. 19, 2019, which claims the benefit of and priority to U.S. Provisional Patent Application No. 62/661,414, filed Apr. 23, 2018, both of which are incorporated herein by reference in their entireties.

BACKGROUND

Certain types of fire apparatuses include aerial assemblies. These aerial assemblies typically include a turntable that is rotatably coupled to a chassis of the vehicle and an aerial ladder assembly that is pivotably coupled to the turntable. The aerial ladder assembly includes multiple sections slidably coupled to one another such that the ladder assembly is extendable over a great distance. Accordingly, the aerial assembly may be actuated to move the distal end of the aerial ladder assembly throughout a working envelope, providing firefighters with access to distant locations that would not otherwise be accessible (e.g., an upper floor of a burning building, etc.).

The aerial ladder assembly is cantilevered off of the turntable. Specifically, a base section of the ladder assembly is pivotably coupled to the turntable, and the other sections of the aerial ladder assembly are supported by the base section. Each ladder section is slidably coupled to the one above it using load transfer stations to facilitate relative movement between ladder the sections. In some configurations, a work basket is coupled to a distal end of the aerial ladder assembly. The work basket may support the weight of multiple firefighters, their equipment, and the work basket. Accordingly, the load transfer stations can experience large forces throughout operation. These large forces are conventionally accommodated using large, heavy load transfer stations to counteract wear.

SUMMARY

One embodiment relates to a fire apparatus. The fire apparatus includes a chassis, axles coupled to the chassis, a turntable rotatably coupled to the chassis, and an aerial ladder assembly pivotably coupled the turntable. The aerial ladder assembly includes a first ladder section extending longitudinally, a second ladder section extending longitudinally, a first support slidably coupling the second ladder section to the first ladder section such that the first ladder section supports the second ladder section, and a second support pivotably coupled to the first ladder section. The first support facilitates longitudinal movement of the second ladder section relative to the first ladder section between an extended position and a retracted position. The first support is pivotably coupled to the first ladder section.

Another embodiment relates to a ladder for an aerial ladder assembly for a fire apparatus. The aerial ladder assembly includes a first ladder section extending longitudinally, a second ladder section extending longitudinally, a first support coupled to the first ladder section, a second support coupled to the first ladder section and longitudinally offset from the first support, and a third support coupled to the first ladder section and configured to limit downward vertical movement of the second ladder section. The second ladder section is selectively repositionable relative to the first ladder section in a longitudinal direction between an extended position and a retracted position. The first support and the second support are configured to slidably couple the second ladder section to the first ladder section. The first support is configured to limit downward vertical movement of the second ladder section. The second support is configured to limit upward vertical movement of the second ladder section.

Still another embodiment relates to a load transfer station for an aerial ladder assembly of a fire apparatus. The aerial ladder assembly includes a first ladder section and a second ladder section. The load transfer station includes a first support configured to be pivotably coupled to the first ladder section and a second support configured to be pivotably coupled to the first ladder section. The first support defines a first engagement surface, and the second support defines a second engagement surface. The second engagement surface is configured to slidably engage a top surface of the base rail when the aerial ladder assembly is in the extended configuration.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
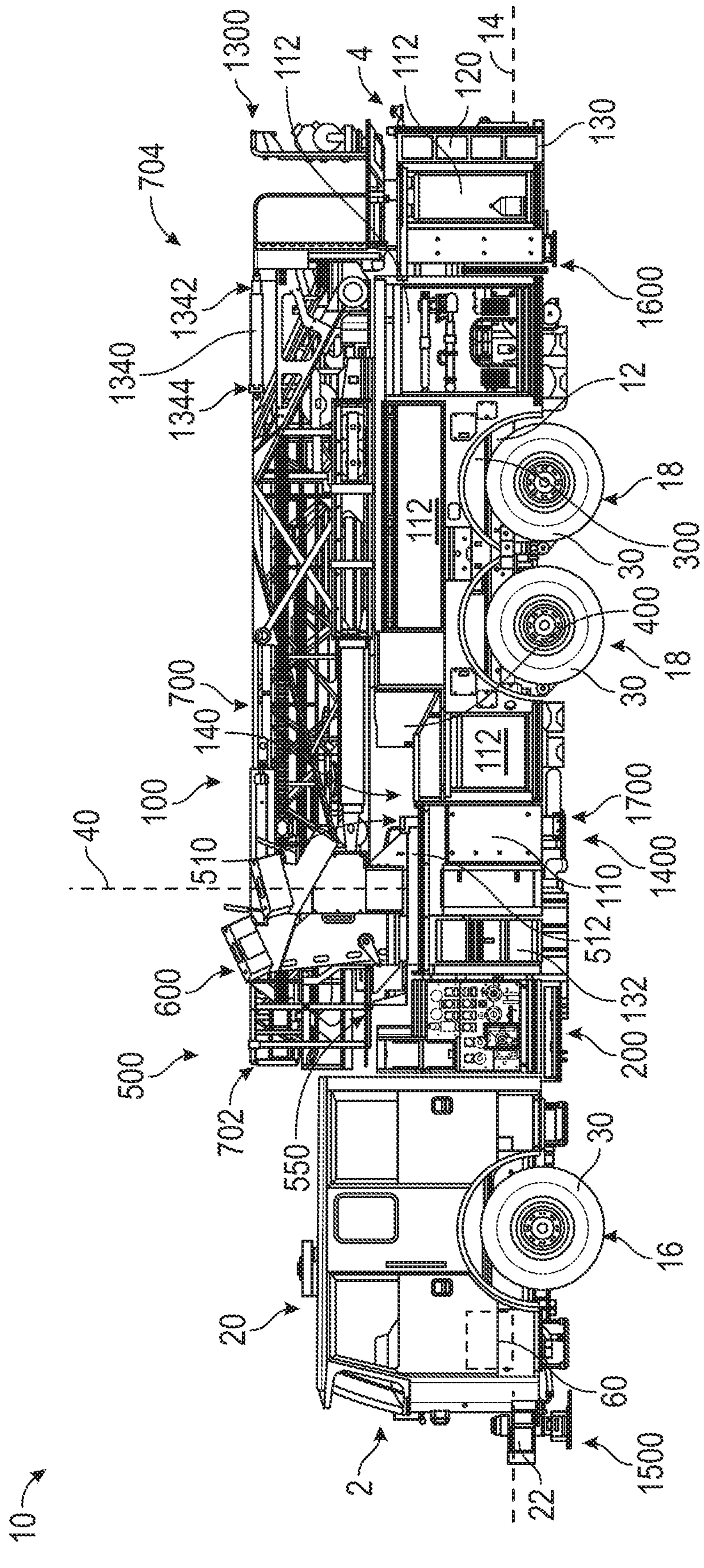
FIG. 1 is a left side view of a mid-mount fire apparatus, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes various components that improve performance relative to traditional systems. In one embodiment, the vehicle is a fire apparatus that includes an aerial ladder assembly. The aerial ladder assembly is coupled to the chassis and rotatable about an axis. The aerial ladder assembly includes a series of ladder sections that can be extended and retracted relative to one another. Each ladder section is slidably coupled to the ladder section immediately below it through a load transfer station. Each load transfer station includes a front support, a top rear support, and a bottom rear support. Each front support defines a recess that receives a base rail of a supported ladder section. Each top rear support and bottom rear support receive one of the base rails therebetween. The front supports and the top rear supports are pivotably coupled to a supporting ladder section. Because the front supports and top rear supports can rotate, the front supports and top rear supports automatically rotate to a position in which the surface area of the front supports and the top rear supports contacting the base rails is maximized. This reduces the stress on the supported ladder section and the supports, reducing wear and facilitating lessening the weight of the aerial ladder assembly.

Overall Vehicle

According to the exemplary embodiment shown in FIGS. 1-21, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. In yet other embodiments, the fire apparatus 10 is configured as a rear-mount, quint or non-quint, single rear axle or tandem rear axle, fire truck.

As shown in FIGS. 1-7, 10-13, 17, and 18, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly, shown as front cabin 20, coupled to and supported by the frame 12 and having a bumper, shown as front bumper 22; a prime mover, shown as engine 60, coupled to and supported by the frame 12; and a second assembly, shown as rear assembly 100, coupled to and supported by the frame 12.

As shown in FIGS. 1-7, 10, and 12, the front axle 16 and the rear axles 18 include tractive assemblies, shown as wheel and tire assemblies 30. As shown in FIGS. 1-4, the front cabin 20 is positioned forward of the rear assembly 100 (e.g., with respect to a forward direction of travel for the fire apparatus 10 along the longitudinal axis 14, etc.). According to an alternative embodiment, the cab assembly may be positioned behind the rear assembly 100 (e.g., with respect to a forward direction of travel for the fire apparatus 10 along the longitudinal axis 14, etc.). The cab assembly may be positioned behind the rear assembly 100 on, by way of example, a rear tiller fire apparatus. In some embodiments, the fire apparatus 10 is a ladder truck with a front portion that includes the front cabin 20 pivotally coupled to a rear portion that includes the rear assembly 100.

According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., the front axle 16, the rear axles 18, the wheel and tire assemblies 30, etc.). The final drive then propels or moves the fire apparatus 10. According to an exemplary embodiment, the engine 60 is a compression-ignition internal combustion engine that utilizes diesel fuel. In alternative embodiments, the engine 60 is another type of prime mover (e.g., a spark-ignition engine, a fuel cell, an electric motor, etc.) that is otherwise powered (e.g., with gasoline, compressed natural gas, propane, hydrogen, electricity, etc.).

As shown in FIGS. 1-7, 10-13, and 17-19, the rear assembly 100 includes a body assembly, shown as body 110, coupled to and supported by the frame 12; a fluid driver, shown as pump system 200, coupled to and supported by the frame 12; a chassis support member, shown as torque box 300, coupled to and supported by the frame 12; a fluid reservoir, shown as water tank 400, coupled to the body 110 and supported by the torque box 300 and/or the frame 12; and an aerial assembly, shown as aerial assembly 500, pivotally coupled to the torque box 300 and supported by the torque box 300 and/or the frame 12. In some embodiments, the rear assembly 100 does not include the water tank 400. In some embodiments, the rear assembly 100 additionally or alternatively includes an agent or foam tank (e.g., that receives and stores a fire suppressing agent, foam, etc.).

As shown in FIGS. 1, 2, and 10-12, the sides of the body 110 define a plurality of compartments, shown as storage compartments 112. The storage compartments 112 may receive and store miscellaneous items and gear used by emergency response personnel (e.g., helmets, axes, oxygen tanks, hoses, medical kits, etc.). As shown in FIGS. 5, 6, and 10-12, the rear end 4 of the body 110 defines a longitudinal storage compartment that extends along the longitudinal axis 14, shown as ground ladder compartment 114. The ground ladder compartment 114 may receive and store one or more ground ladders. As shown in FIGS. 3, 5, and 10-13, a top surface, shown as top platform 122, of the body 110 defines a cavity, shown as hose storage platform 116, and a channel, shown as hose chute 118, extending from the hose storage platform 116 to the rear end 4 of the body 110. The hose storage platform 116 may receive and store one or more hoses (e.g., up to 1000 feet of 5 inch diameter hose, etc.), which may be pulled from the hose storage platform 116 though the hose chute 118.

As shown in FIGS. 1-6 and 10-13, the rear end 4 of the body 110 has notched or clipped corners, shown as chamfered corners 120. In other embodiments, the rear end 4 of the body 110 does not have notched or clipped corners (e.g., the rear end 4 of the body 110 may have square corners, etc.). According to an exemplary embodiment, the chamfered corners 120 provide for increased turning clearance relative to fire apparatuses that have non-notched or non-clipped (e.g., square, etc.) corners. As shown in FIGS. 1-3, 5, 6, and 10-13, the rear assembly 100 includes a first selectively deployable ladder, shown as rear ladder 130, coupled to each of the chamfered corners 120 of the body 110. According to an exemplary embodiment, the rear ladders 130 are hingedly coupled to the chamfered corners 120 and repositionable between a stowed position (see, e.g., FIGS. 1-3, 5, 12, 13, etc.) and a deployed position (see, e.g., FIGS. 6, 10, 11, etc.). The rear ladders 130 may be selectively deployed such that a user may climb the rear ladder 130 to access the top platform 122 of the body 110 and/or one or more components of the aerial assembly 500 (e.g., a work basket, an implement, an aerial ladder assembly, the hose storage platform 116, etc.). In other embodiments, the body 110 has stairs in addition to or in place of the rear ladders 130.

As shown in FIGS. 1, 12, 17, and 18, the rear assembly 100 includes a second selectively deployable ladder, shown as side ladder 132, coupled to a side (e.g., a left side, a right side, a driver's side, a passenger's side, etc.) of the body 110. In some embodiments, the rear assembly 100 includes two side ladders 132, one coupled to each side of the body 110. According to an exemplary embodiment, the side ladder 132 is hingedly coupled to the body 110 and repositionable between a stowed position (see, e.g., FIGS. 1, 2, 17, 18, etc.)

and a deployed position. The side ladder 132 may be selectively deployed such that a user may climb the side ladder 132 to access one or more components of the aerial assembly 500 (e.g., a work platform, an aerial ladder assembly, a control console, etc.).

As shown in FIGS. 1, 2, 12 and 13, the body 110 defines a recessed portion, shown as aerial assembly recess 140, positioned (i) rearward of the front cabin 20 and (ii) forward of the water tank 400 and/or the rear axles 18. The aerial assembly recess 140 defines an aperture, shown as pedestal opening 142, rearward of the pump system 200.

According to an exemplary embodiment the water tank 400 is coupled to the frame 12 with a superstructure (e.g., disposed along a top surface of the torque box 300, etc.). As shown in FIGS. 1, 2, 12, and 13, the water tank 400 is positioned below the aerial ladder assembly 700 and forward of the hose storage platform 116. As shown in FIGS. 1, 2, 12 and 13, the water tank 400 is positioned such that the water tank 400 defines a rear wall of the aerial assembly recess 140. In one embodiment, the water tank 400 stores up to 300 gallons of water. In another embodiment, the water tank 400 stores more than or less than 300 gallons of water (e.g., 100, 200, 250, 350, 400, 500, etc. gallons). In other embodiments, fire apparatus 10 additionally or alternatively includes a second reservoir that stores another firefighting agent (e.g., foam, etc.). In still other embodiments, the fire apparatus 10 does not include the water tank 400 (e.g., in a non-quint configuration, etc.).

As shown in FIGS. 1-3, 5-7, 10, 17, and 18, the aerial assembly 500 includes a turntable assembly, shown as turntable 510, pivotally coupled to the torque box 300; a platform, shown work platform 550, coupled to the turntable 510; a console, shown as control console 600, coupled to the turntable 510; a ladder assembly, shown as aerial ladder assembly 700, having a first end (e.g., a base end, a proximal end, a pivot end, etc.), shown as proximal end 702, pivotally coupled to the turntable 510, and an opposing second end (e.g., a free end, a distal end, a platform end, an implement end, etc.), shown as distal end 704; and an implement, shown as work basket 1300, coupled to the distal end 704.

Figure 12:
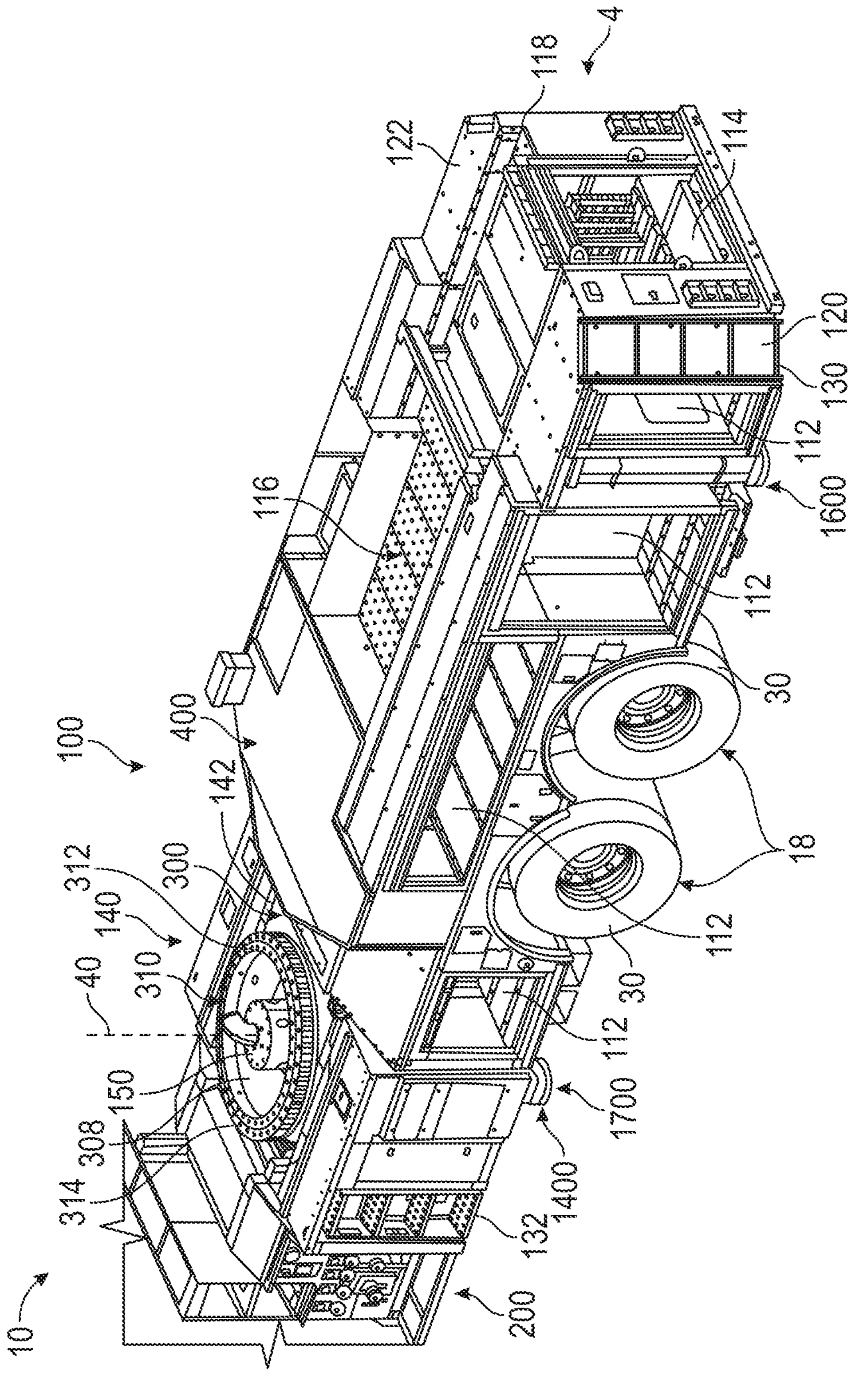
FIG. 12 is another rear perspective view of the rear assembly of FIG. 10 without a ladder assembly, according to an exemplary embodiment.
Figure 13:
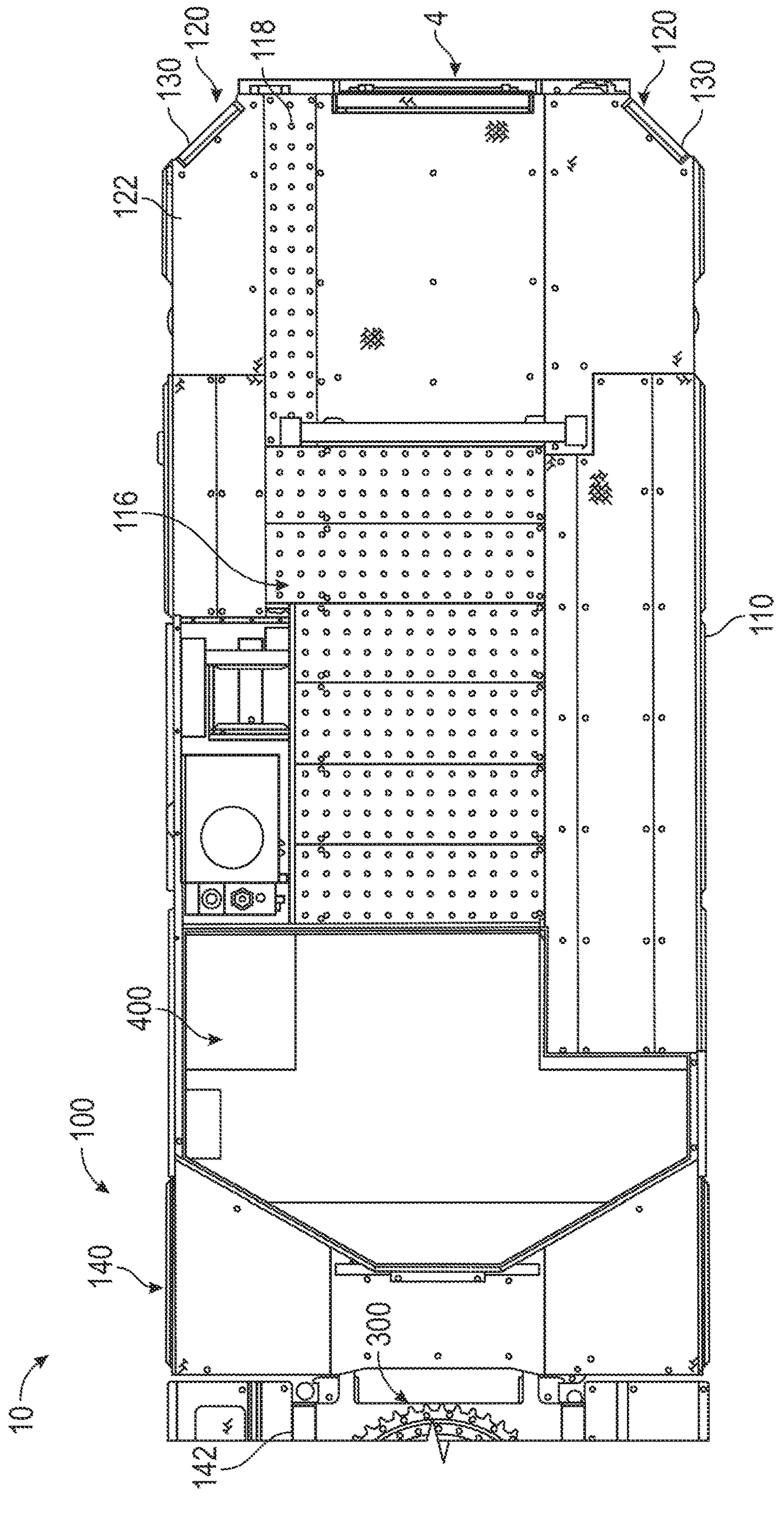
FIG. 13 is a top view of the rear assembly of FIG. 12, according to an exemplary embodiment.
Figure 14:
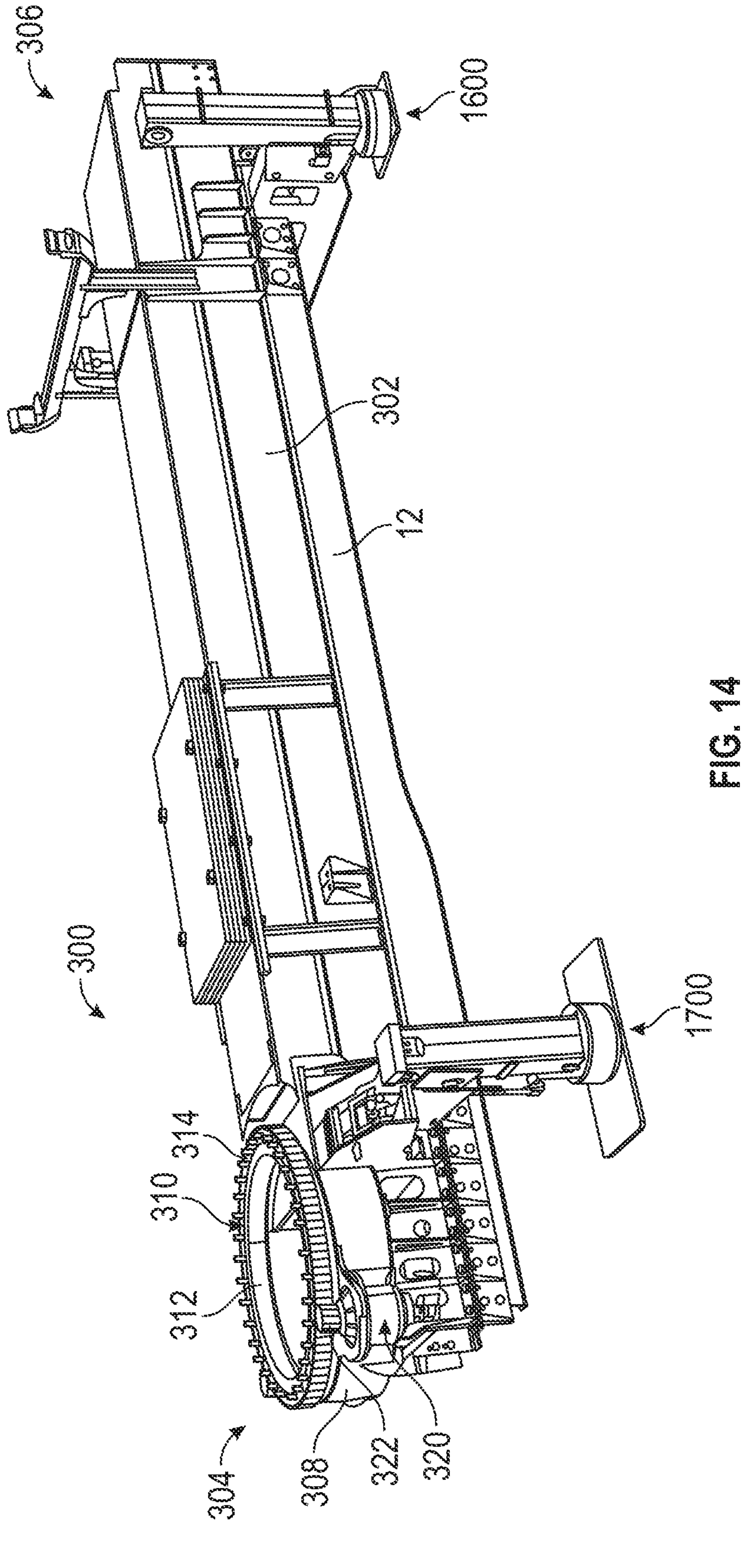
FIG. 14 is a perspective view of a torque box of the mid-mount fire apparatus of FIG. 1, according to an exemplary embodiment.
Figure 15:
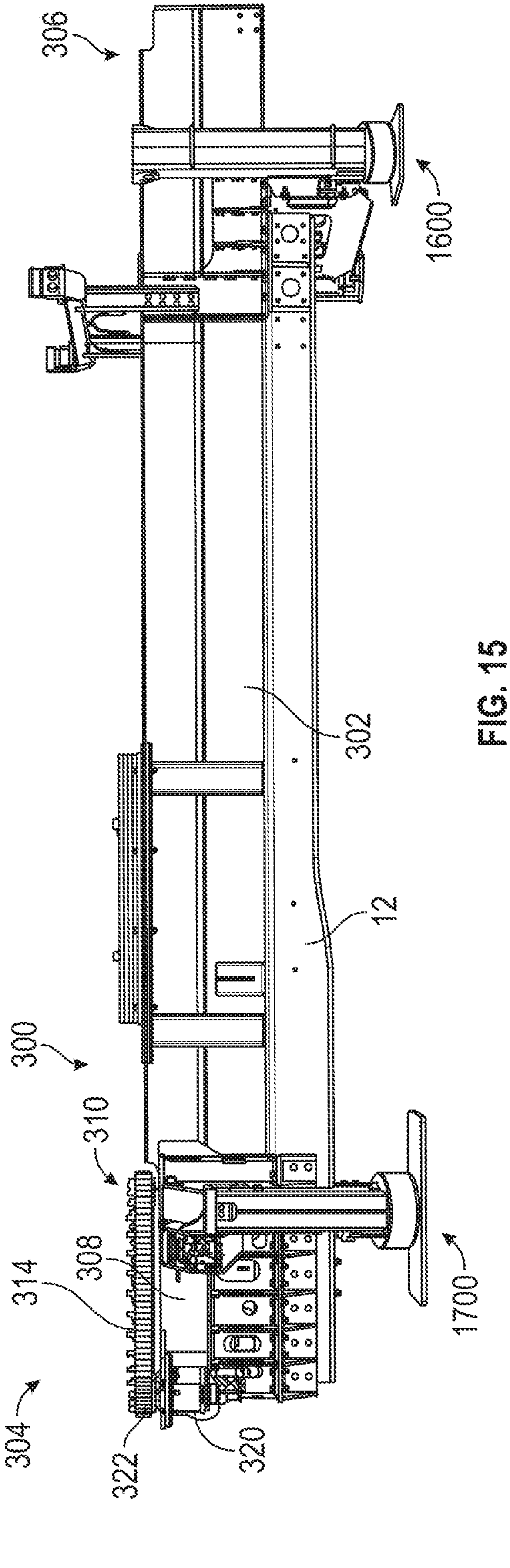
FIG. 15 is a side view of the torque box of FIG. 14, according to an exemplary embodiment.

As shown in FIGS. 1, 2, 4, 14, and 15, the torque box 300 is coupled to the frame 12. In one embodiment, the torque box 300 extends laterally the full width between the lateral outsides of the frame rails of the frame 12. As shown in FIGS. 14 and 15, the torque box 300 includes a body portion, shown as body 302, having a first end, shown as front end 304, and an opposing second end, shown as rear end 306. As shown in FIGS. 12, 14, and 15, the torque box 300 includes a support, shown as pedestal 308, coupled (e.g., attached, fixed, bolted, welded, etc.) to the front end 304 of the torque box 300. As shown in FIG. 12, the pedestal 308 extends through the pedestal opening 142 into the aerial assembly recess 140 such that the pedestal 308 is positioned (i) forward of the water tank 400 and the rear axles 18 and (ii) rearward of pump system 200, the front axle 16, and the front cabin 20.

Figure 2:
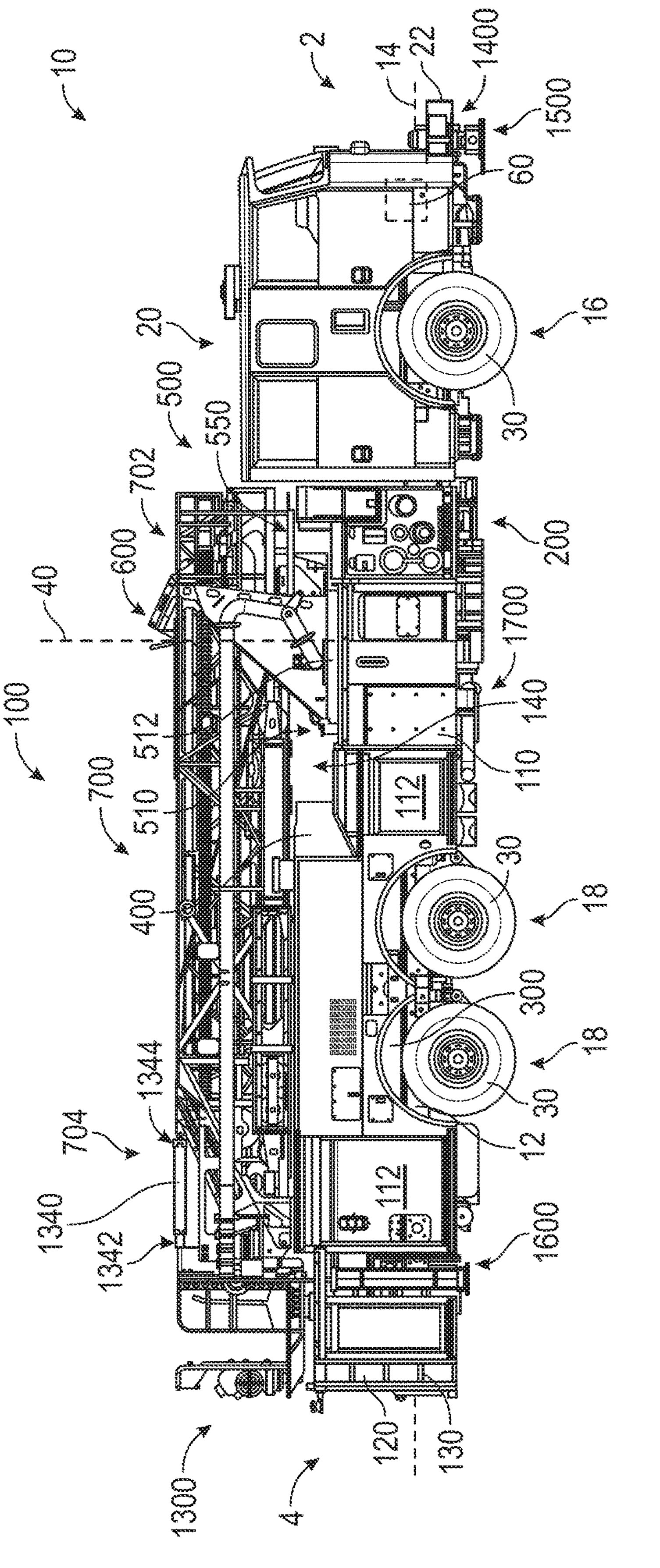
FIG. 2 is a right side view of the mid-mount fire apparatus of FIG. 1, according to an exemplary embodiment.

According to the exemplary embodiment shown in FIGS. 1, 2, and 12, the aerial assembly 500 (e.g., the turntable 510, the work platform 550, the control console 600, the aerial ladder assembly 700, the work basket 1300, etc.) is rotatably coupled to the pedestal 308 such that the aerial assembly 500 is selectively repositionable into a plurality of operating orientations about a vertical axis, shown as vertical pivot axis 40. As shown in FIGS. 12, 14, and 15, the torque box 300 includes a pivotal connector, shown as slewing bearing 310, coupled to the pedestal 308. The slewing bearing 310 is a rotational rolling-element bearing with an inner element, shown as bearing element 312, and an outer element, shown as driven gear 314. The bearing element 312 may be coupled to the pedestal 308 with a plurality of fasteners (e.g., bolts, etc.).

As shown in FIGS. 14 and 15, a drive actuator, shown as rotation actuator 320, is coupled to the pedestal 308 (e.g., by an intermediate bracket, etc.). The rotation actuator 320 is positioned to drive (e.g., rotate, turn, etc.) the driven gear 314 of the slewing bearing 310. In one embodiment, the rotation actuator 320 is an electric motor (e.g., an alternating current (AC) motor, a direct current motor (DC), etc.) configured to convert electrical energy into mechanical energy. In other embodiments, the rotation actuator 320 is powered by air (e.g., pneumatic, etc.), a fluid (e.g., a hydraulic motor, a hydraulic cylinder, etc.), mechanically (e.g., a flywheel, etc.), or still another power source.

As shown in FIGS. 14 and 15, the rotation actuator 320 includes a driver, shown as drive pinion 322. The drive pinion 322 is mechanically coupled with the driven gear 314 of the slewing bearing 310. In one embodiment, a plurality of teeth of the drive pinion 322 engage a plurality of teeth on the driven gear 314. By way of example, when the rotation actuator 320 is engaged (e.g., powered, turned on, etc.), the rotation actuator 320 may provide rotational energy (e.g., mechanical energy, etc.) to an output shaft. The drive pinion 322 may be coupled to the output shaft such that the rotational energy of the output shaft drives (e.g., rotates, etc.) the drive pinion 322. The rotational energy of the drive pinion 322 may be transferred to the driven gear 314 in response to the engaging teeth of both the drive pinion 322 and the driven gear 314. The driven gear 314 thereby rotates about the vertical pivot axis 40, while the bearing element 312 remains in a fixed position relative to the driven gear 314.

As shown in FIGS. 1, 2, and 16-18, the turntable 510 includes a first portion, shown as rotation base 512, and a second portion, shown as side supports 514, that extend vertically upward from opposing lateral sides of the rotation base 512. According to an exemplary embodiment, (i) the work platform 550 is coupled to the side supports 514, (ii) the aerial ladder assembly 700 is pivotally coupled to the side supports 514, (iii) the control console 600 is coupled to the rotation base 512, and (iv) the rotation base 512 is disposed within the aerial assembly recess 140 and interfaces with and is coupled to the driven gear 314 of slewing bearing 310 such that (i) the aerial assembly 500 is selectively pivotable about the vertical pivot axis 40 using the rotation actuator 320, (ii) at least a portion of the work platform 550 and the aerial ladder assembly 700 is positioned below the roof of the front cabin 20, and (iii) the turntable 510 is coupled rearward of the front cabin 20 and between the front axle 16 and the tandem rear axles 18 (e.g., the turntable 510 is coupled to the frame 12 such that the vertical pivot axis 40 is positioned rearward of a centerline of the front axle 16, forward of a centerline of the tandem rear axle 18, rearward of a rear edge of a tire of the front axle 16, forward of a front edge of a wheel of the front axle of the tandem rear axles 18, rearward of a front edge of a tire of the front axle 16, forward of a rear edge of a wheel of the rear axle of the tandem rear axles 18, etc.). Accordingly, loading from the work basket 1300, the aerial ladder assembly 700, and/or the work platform 550 may transfer through the turntable 510 into the torque box 300 and the frame 12.

As shown in FIG. 12, the rear assembly 100 includes a rotation swivel, shown as rotation swivel 316, that includes a conduit. According to an exemplary embodiment, the conduit of the rotation swivel 316 extends upward from the pedestal 308 and into the turntable 510. The rotation swivel 316 may couple (e.g., electrically, hydraulically, fluidly, etc.) the aerial assembly 500 with other components of the fire apparatus 10. By way of example, the conduit may define a passageway for water to flow into the aerial ladder assembly 700. Various lines may provide electricity, hydraulic fluid, and/or water to the aerial ladder assembly 700, actuators, and/or the control console 600.

According to an exemplary embodiment, the work platform 550 provides a surface upon which operators (e.g., fire fighters, rescue workers, etc.) may stand while operating the aerial assembly 500 (e.g., with the control console 600, etc.). The control console 600 may be communicably coupled to various components of the fire apparatus 10 (e.g., actuators of the aerial ladder assembly 700, rotation actuator 320, water turret, etc.) such that information or signals (e.g., command signals, fluid controls, etc.) may be exchanged from the control console 600. The information or signals may relate to one or more components of the fire apparatus 10. According to an exemplary embodiment, the control console 600 enables an operator (e.g., a fire fighter, etc.) of the fire apparatus 10 to communicate with one or more components of the fire apparatus 10. By way of example, the control console 600 may include at least one of an interactive display, a touchscreen device, one or more buttons (e.g., a stop button configured to cease water flow through a water nozzle, etc.), joysticks, switches, and voice command receivers. An operator may use a joystick associated with the control console 600 to trigger the actuation of the turntable 510 and/or the aerial ladder assembly 700 to a desired angular position (e.g., to the front, back, or side of fire apparatus 10, etc.). By way of another example, an operator may engage a lever associated with the control console 600 to trigger the extension or retraction of the aerial ladder assembly 700.

Figure 16:
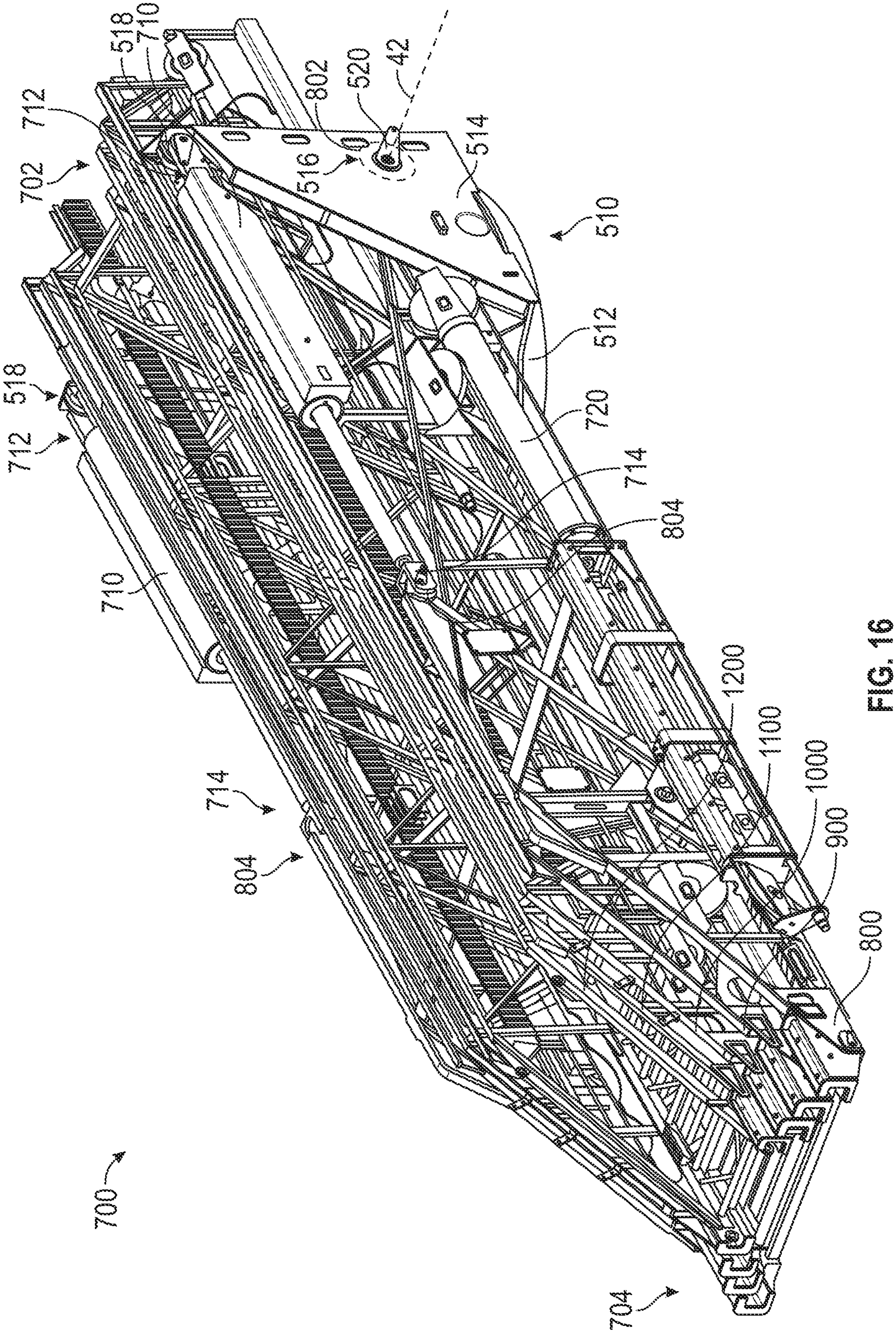
FIG. 16 is a perspective view of an aerial ladder assembly and turntable of the mid-mount fire apparatus of FIG. 1, according to an exemplary embodiment.
Figure 17:
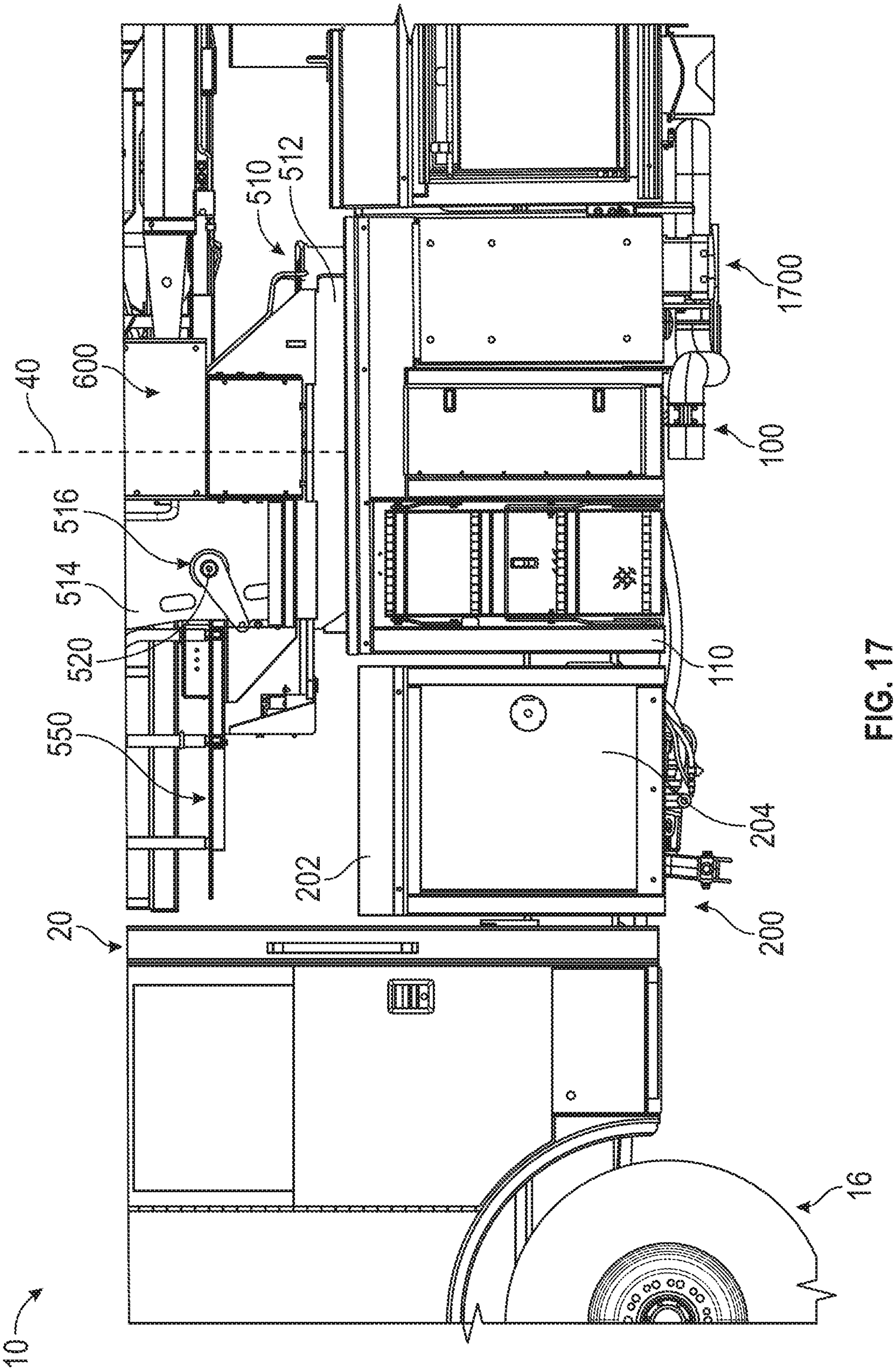
FIG. 17 is a side view of a pump housing of the mid-mount fire apparatus of FIG. 1 in a first configuration, according to an exemplary embodiment.
Figure 18:
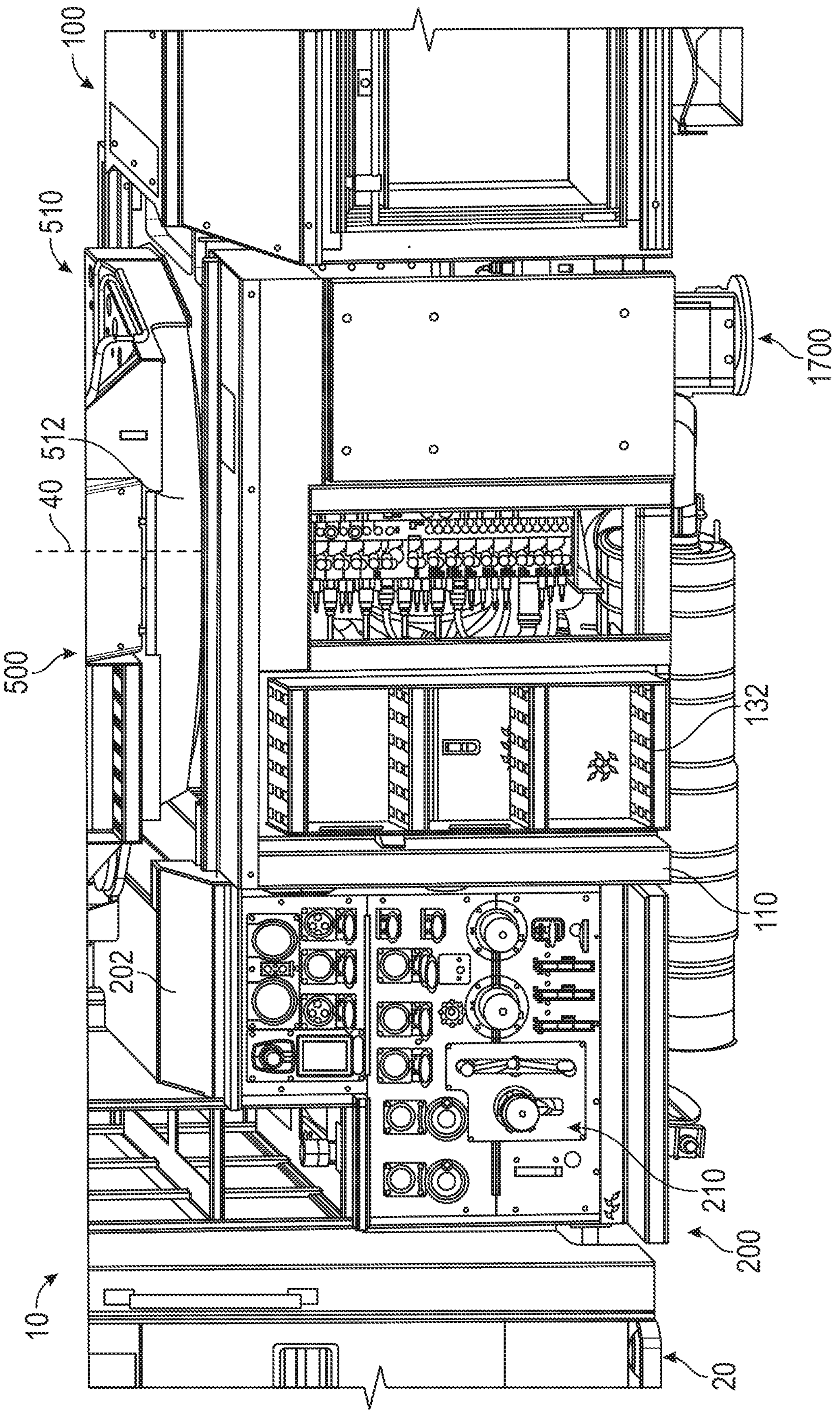
FIG. 18 is a side perspective view of a pump system within the pump housing of FIG. 17 in a second configuration, according to an exemplary embodiment.

As shown in FIG. 16, the aerial ladder assembly 700 has a plurality of nesting ladder sections that telescope with respect to one another including a first section, shown as base section 800; a second section, shown as lower middle section 900; a third ladder section, shown as middle section 1000; a fourth section, shown as upper middle section 1100; and a fifth section, shown as fly section 1200. As shown in FIGS. 16 and 17, the side supports 514 of the turntable 510 define a first interface, shown as ladder interface 516, and a second interface, shown as actuator interface 518. As shown in FIG. 16, the base section 800 of the aerial ladder assembly 700 defines first interfaces, shown as pivot interfaces 802, and second interfaces, shown as actuator interfaces 804. As shown in FIGS. 16 and 17, the ladder interfaces 516 of the side supports 514 of the turntable 510 and the pivot interfaces 802 of the base section 800 are positioned to align and cooperatively receive a pin, shown as heel pin 520, to pivotally couple the proximal end 702 of the aerial ladder assembly 700 to the turntable 510. As shown in FIG. 17, the aerial ladder assembly 700 includes first ladder actuators or linear actuators (e.g., hydraulic cylinders, etc.), shown as pivot actuators 710. Each of the pivot actuators 710 has a first end portion, shown as end 712, coupled to a respective actuator interface 518 of the side supports 514 of the turntable 510 and an opposing second end portion, shown as end 714, coupled to a respective actuator interface 804 of the base section 800. According to an exemplary embodiment, the pivot actuators 710 are kept in tension such that retraction thereof lifts and rotates the distal end 704 of the aerial ladder assembly 700 about a lateral axis, shown as lateral pivot axis 42, defined by the heel pin 520. In other embodiments, the pivot actuators 710 are kept in compression such that extension thereof lifts and rotates the distal end 704 of the aerial ladder assembly 700 about the lateral pivot axis 42. In an alternative embodiment, the aerial ladder assembly only includes one pivot actuator 710.

As shown in FIG. 16, the aerial ladder assembly 700 includes one or more second ladders actuators, shown as extension actuators 720. According to an exemplary embodiment, the extension actuators 720 are positioned to facilitate selectively reconfiguring the aerial ladder assembly 700 between an extended configuration and a retracted/stowed configuration (see, e.g., FIGS. 1-3, 16, etc.). In the extended configuration (e.g., deployed position, use position, etc.), the aerial ladder assembly 700 is lengthened, and the distal end 704 is extended away from the proximal end 702. In the retracted configuration (e.g., storage position, transport position, etc.), the aerial ladder assembly 700 is shortened, and the distal end 704 is withdrawn towards the proximal end 702.

According to the exemplary embodiment shown in FIGS. 1-3 and 16, the aerial ladder assembly 700 has over-retracted ladder sections such that the proximal ends of the lower middle section 900, the middle section 1000, the upper middle section 1100, and the fly section 1200 extend forward of (i) the heel pin 520 and (ii) the proximal end of the base section 800 along the longitudinal axis 14 of the fire apparatus 10 when the aerial ladder assembly 700 is retracted and stowed. According to an exemplary embodiment, the distal end 704 of the aerial ladder assembly 700 (e.g., the distal end of the fly section 1200, etc.) is extensible to the horizontal reach of at least 88 feet (e.g., 93 feet, etc.) and/or or a vertical reach of at least 95 feet (e.g., 100 feet, etc.). According to an exemplary embodiment, the aerial ladder assembly 700 is operable below grade (e.g., at a negative depression angle relative to a horizontal, etc.) within an aerial work envelope or scrub area. In one embodiment, the aerial ladder assembly 700 is operable in the scrub area such that it may pivot about the vertical pivot axis 40 up to 50 degrees (e.g., 20 degrees forward and 30 degrees rearward from a position perpendicular to the longitudinal axis 14, etc.) on each side of the body 110 while at a negative depression angle (e.g., up to negative 15 degrees, more than negative 15 degrees, up to negative 20 degrees, etc. below level, below a horizontal defined by the top platform 122 of the body 110, etc.).

Figure 3:
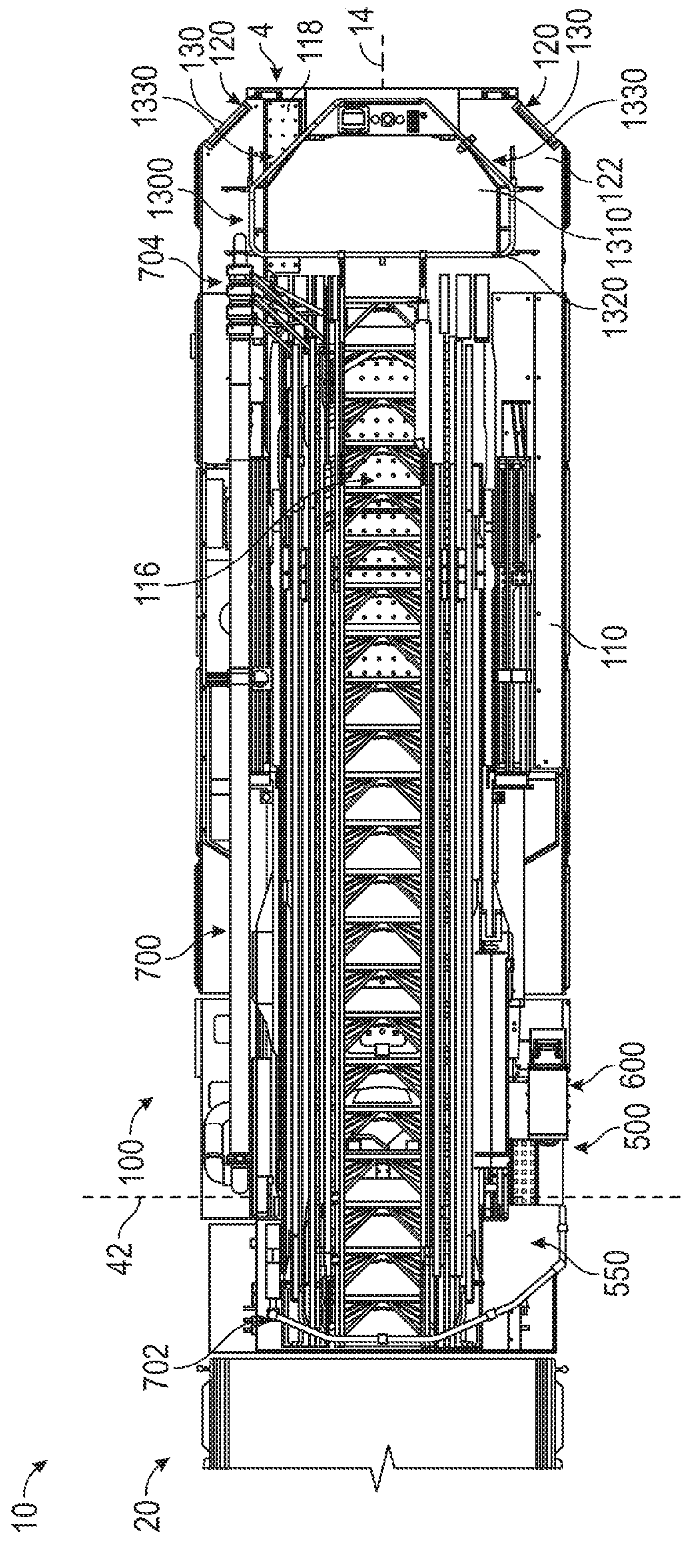
FIG. 3 is a top view of the mid-mount fire apparatus of FIG. 1, according to an exemplary embodiment.
Figure 4:
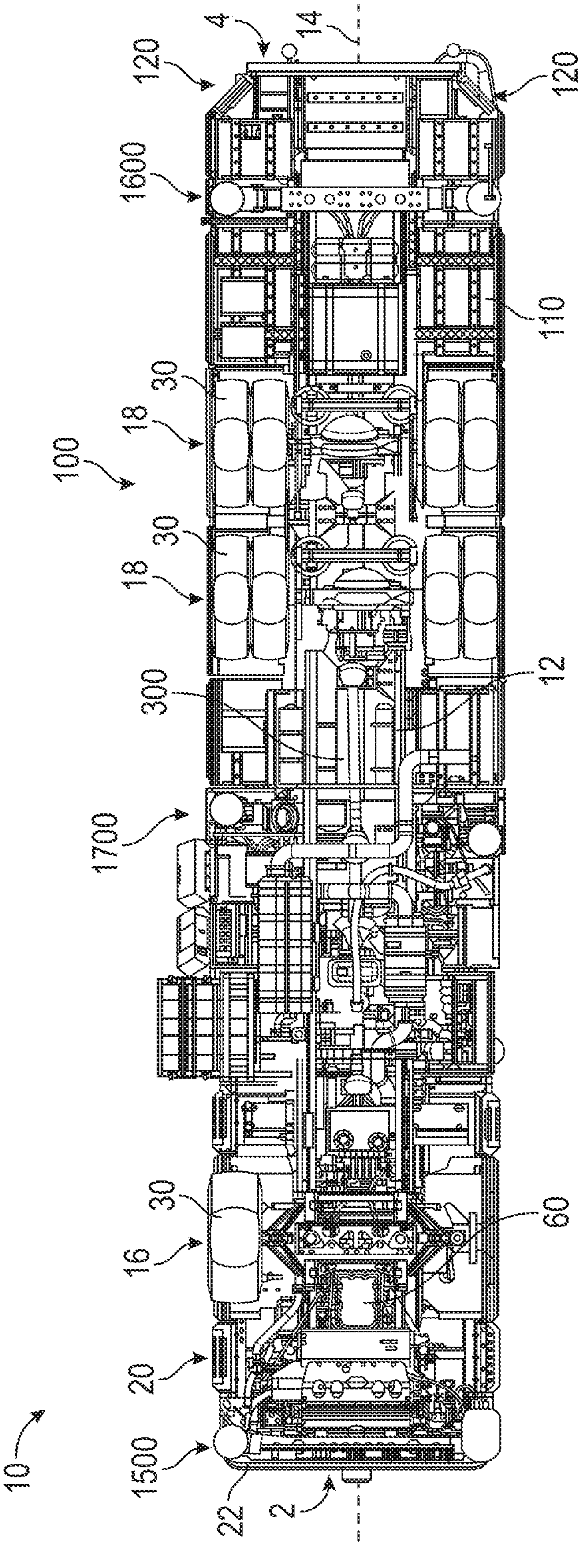
FIG. 4 is a bottom view of the mid-mount fire apparatus of FIG. 1, according to an exemplary embodiment.
Figure 5:
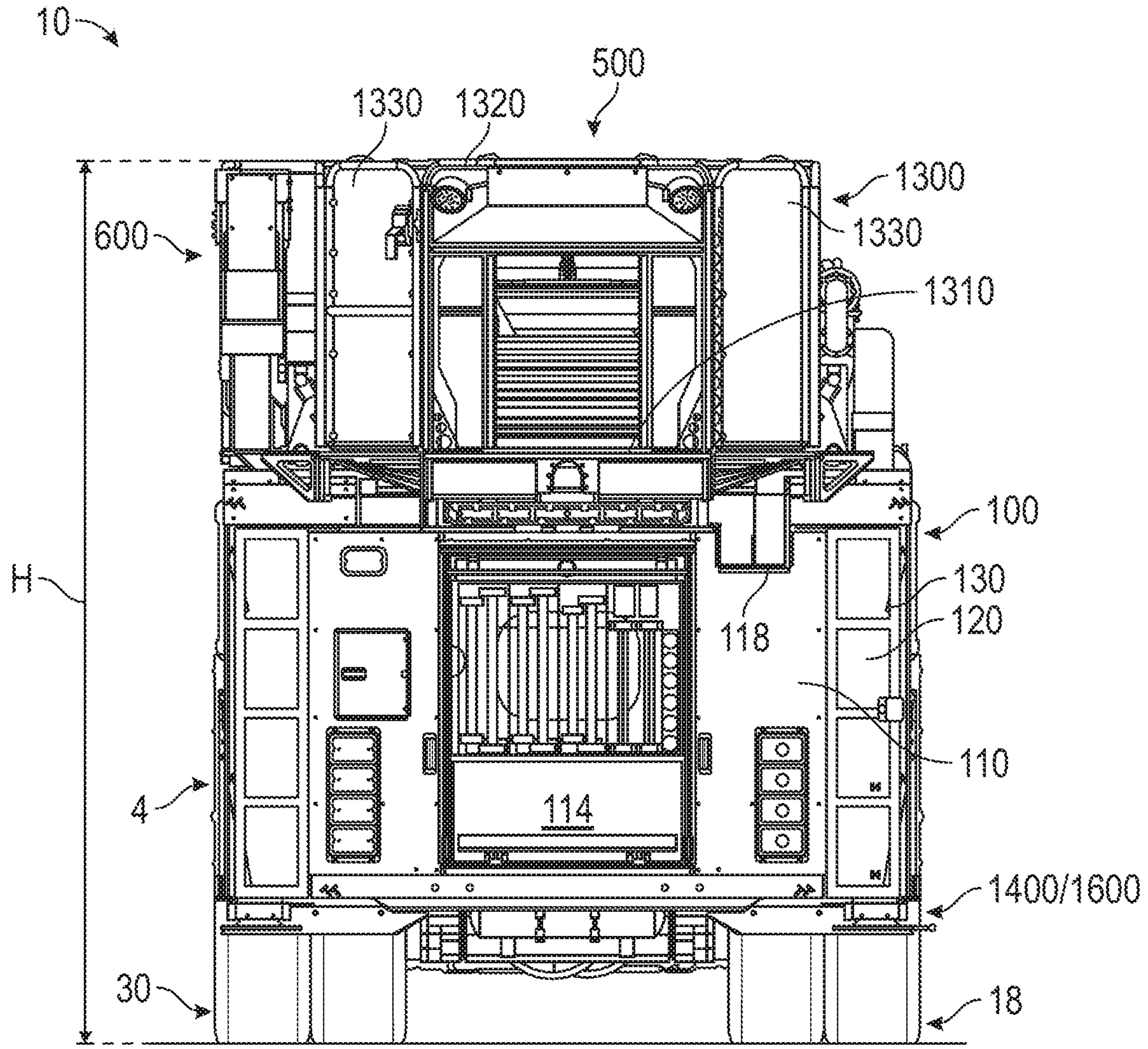
FIG. 5 is a rear view of the mid-mount fire apparatus of FIG. 1, according to an exemplary embodiment.
Figure 10:
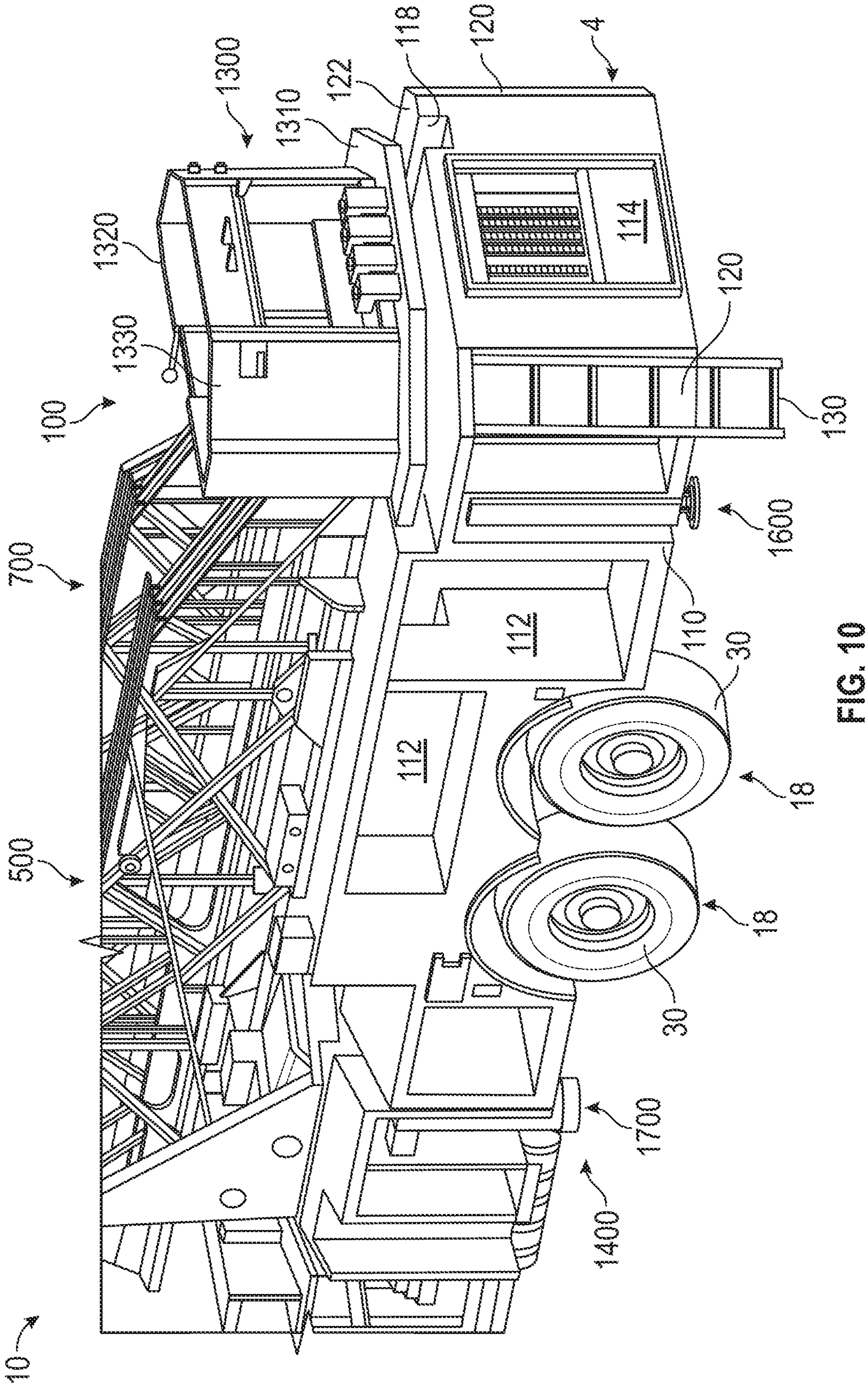
FIG. 10 is a rear perspective view of a rear assembly of the mid-mount fire apparatus of FIG. 1, according to an exemplary embodiment.
Figure 11:
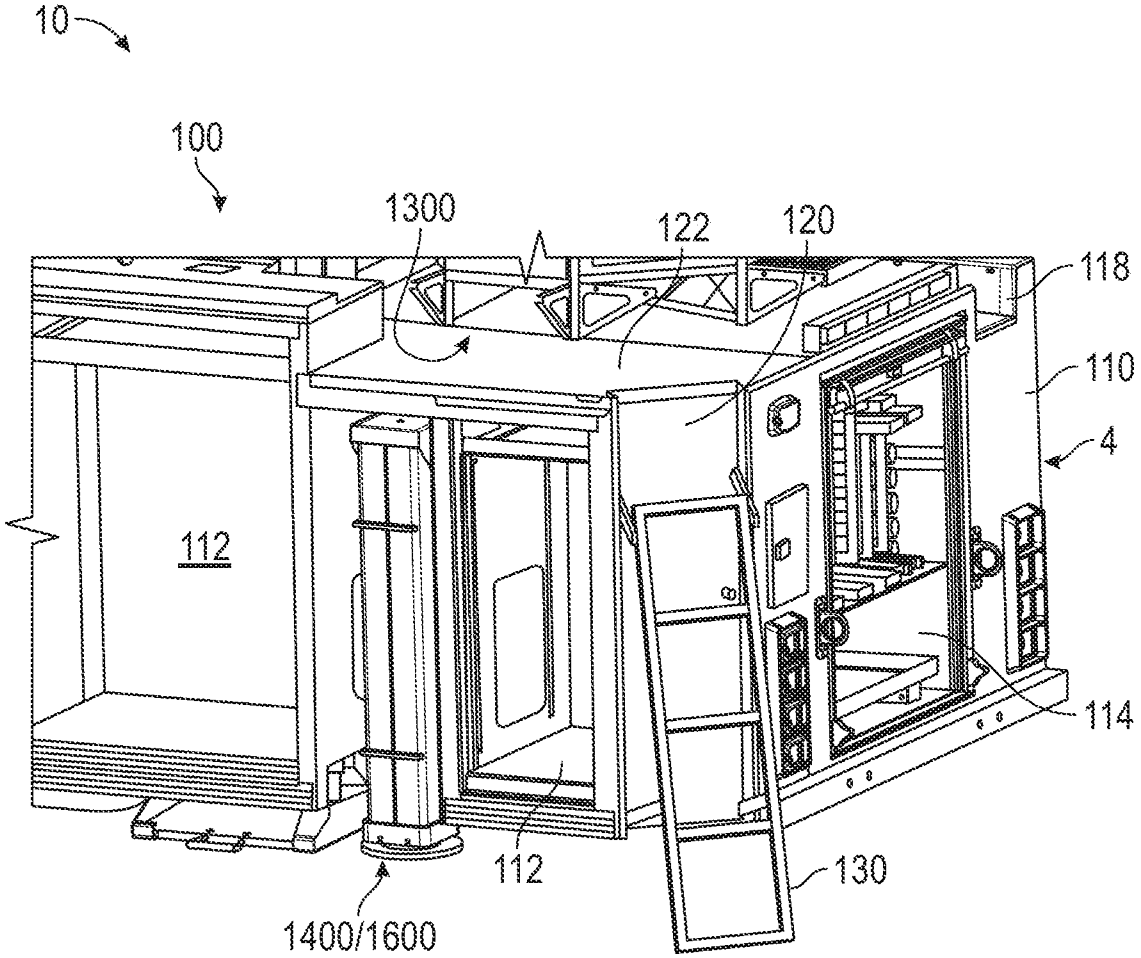
FIG. 11 is detailed rear perspective view of the rear assembly of FIG. 10, according to an exemplary embodiment.

According to an exemplary embodiment, the work basket 1300 is configured to hold at least one of fire fighters and persons being aided by the fire fighters. As shown in FIGS. 3, 5, and 10, the work basket 1300 includes a platform, shown as basket platform 1310; a support, shown as railing 1320, extending around the periphery of the basket platform 1310; and angled doors, shown as basket doors 1330, coupled to the corners of the railing 1320 proximate the rear end 4 of the fire apparatus 10. According to an exemplary embodiment, the basket doors 1330 are angled to correspond with the chamfered corners 120 of the body 110.

In other embodiments, the aerial assembly 500 does not include the work basket 1300. In some embodiments, the work basket 1300 is replaced with or additionally includes a nozzle (e.g., a deluge gun, a water cannon, a water turret, etc.) or other tool. By way of example, the nozzle may be connected to a water source (e.g., the water tank 400, an external source, etc.) with a conduit extending along the aerial ladder assembly 700 (e.g., along the side of the aerial ladder assembly 700, beneath the aerial ladder assembly 700, in a channel provided in the aerial ladder assembly 700, etc.). By pivoting the aerial ladder assembly 700 into a raised position, the nozzle may be elevated to expel water from a higher elevation to facilitate suppressing a fire.

According to an exemplary embodiment, the pump system 200 (e.g., a pump house, etc.) is a mid-ship pump assembly. As shown in FIGS. 1, 2, 12, 17, and 18, the pump system 200 is positioned along the rear assembly 100 behind the front cabin 20 and forward of the vertical pivot axis 40 (e.g., forward of the turntable 510, the torque box 300, the pedestal 308, the slewing bearing 310, the heel pin 520, a front end of the body 110, etc.) such that the work platform 550 and the over-retracted portions of the aerial ladder assembly 700 overhang above the pump system 200 when the aerial ladder assembly 700 is retracted and stowed. According to an exemplary embodiment, the position of the pump system 200 forward of the vertical pivot axis 40 facilitates ease of install and serviceability. In other embodiments, the pump system 200 is positioned rearward of the vertical pivot axis 40.

Figure 19:
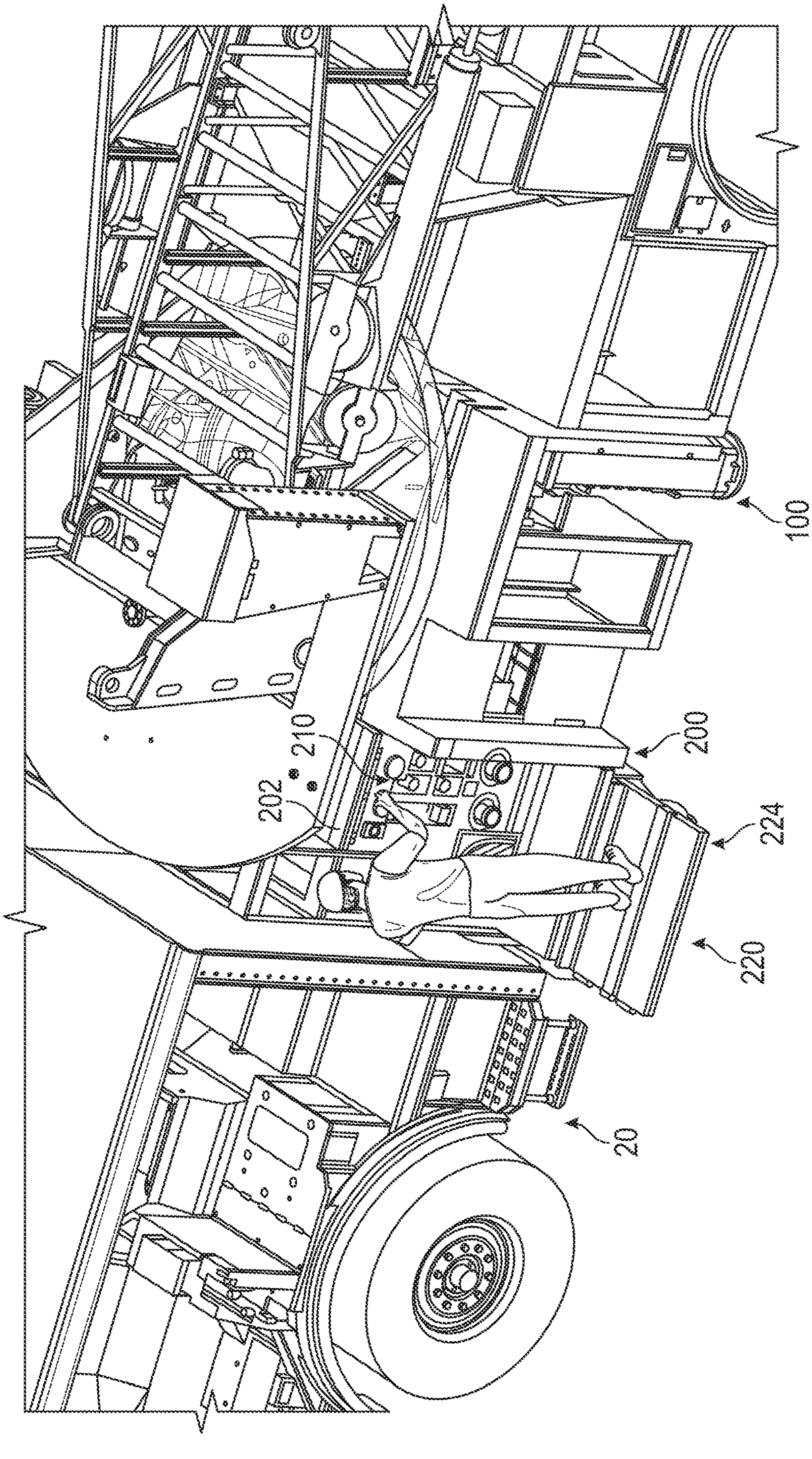
FIG. 19 is a side perspective view of the pump system of FIG. 18 with a platform in a deployed configuration, according to an exemplary embodiment.
Figure 20:
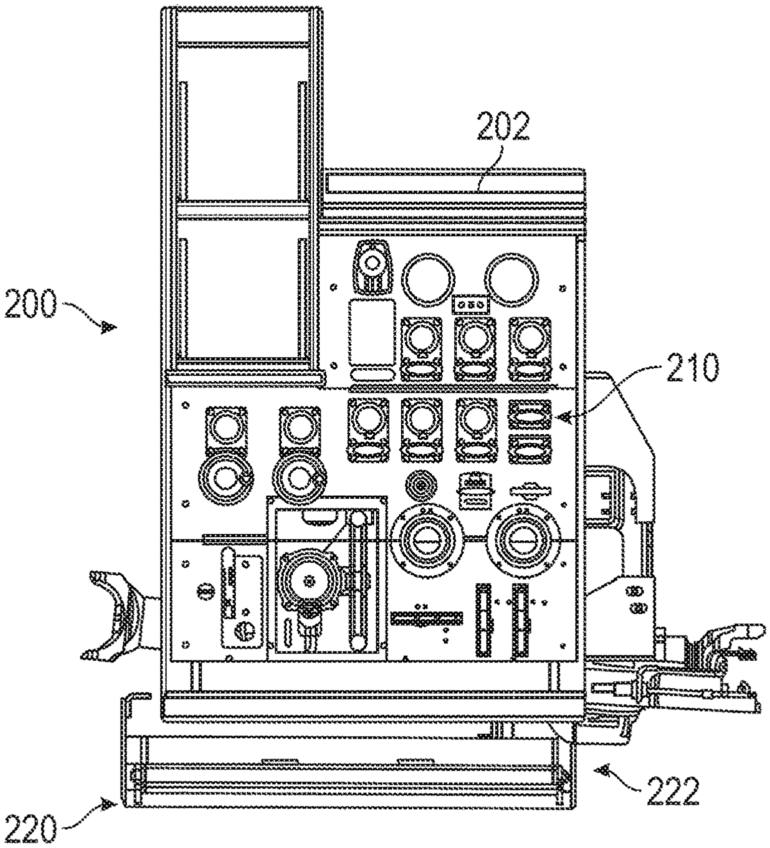
FIGS. 20 and 21 are opposing side views of the pump system of FIG. 18, according to an exemplary embodiment.
Figure 21:
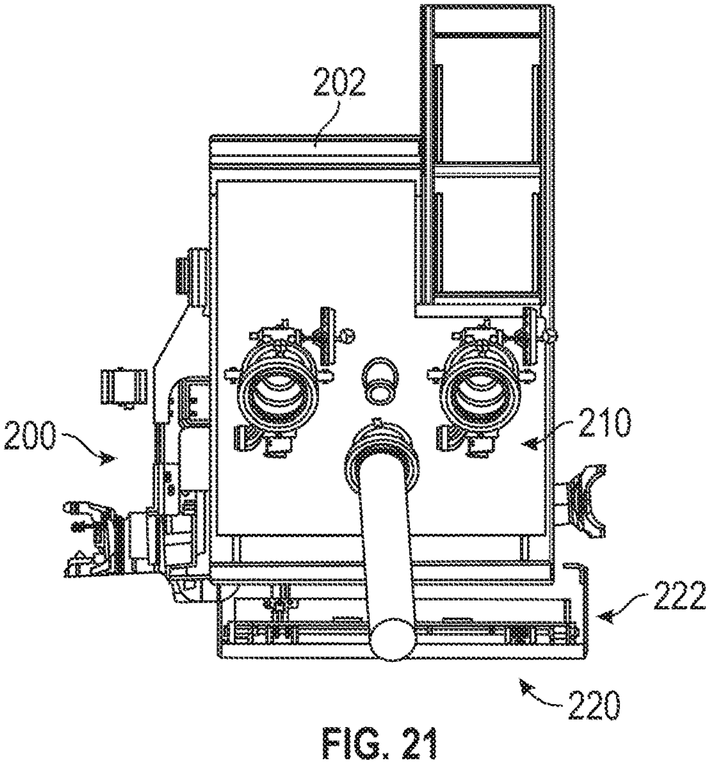

As shown in FIGS. 17-21, the pump system 200 includes a housing, shown as pump house 202. As shown in FIG. 17, the pump house 202 includes a selectively openable door, shown as pump door 204. As shown in FIGS. 18-21, the pump system 200 includes a pumping device, shown as pump assembly 210, disposed within the pump house 202. By way of example, the pump assembly 210 may include a pump panel having an inlet for the entrance of water from an external source (e.g., a fire hydrant, etc.), a pump, an outlet configured to engage a hose, various gauges, etc. The pump of the pump assembly 210 may pump fluid (e.g., water, agent, etc.) through a hose to extinguish a fire (e.g., water received at an inlet of the pump house 202, water stored in the water tank 400, etc.). As shown in FIGS. 19-21, the pump system 200 includes a selectively deployable (e.g., foldable, pivotable, collapsible, etc.) platform, shown as pump platform 220, pivotally coupled to the pump house 202. As shown in FIGS. 20 and 21, the pump platform 220 is in a first configuration, shown as stowed configuration 222, and as shown in FIG. 19, the pump platform 220 is in a second configuration, shown as deployed configuration 224.

Figure 6:
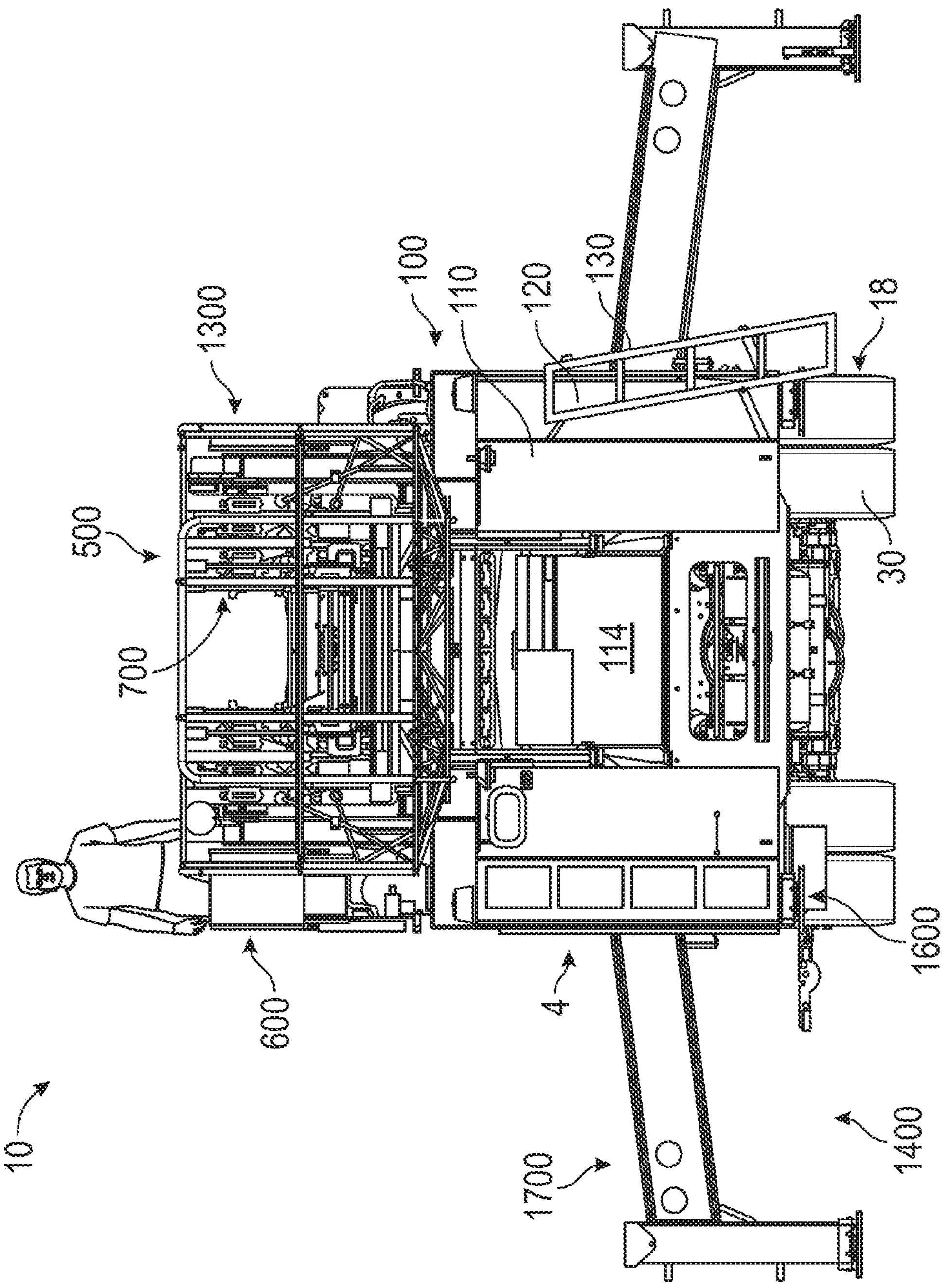
FIG. 6 is a is a rear view of the mid-mount fire apparatus of FIG. 1 having outriggers in an extended configuration, according to an exemplary embodiment.
Figure 7:
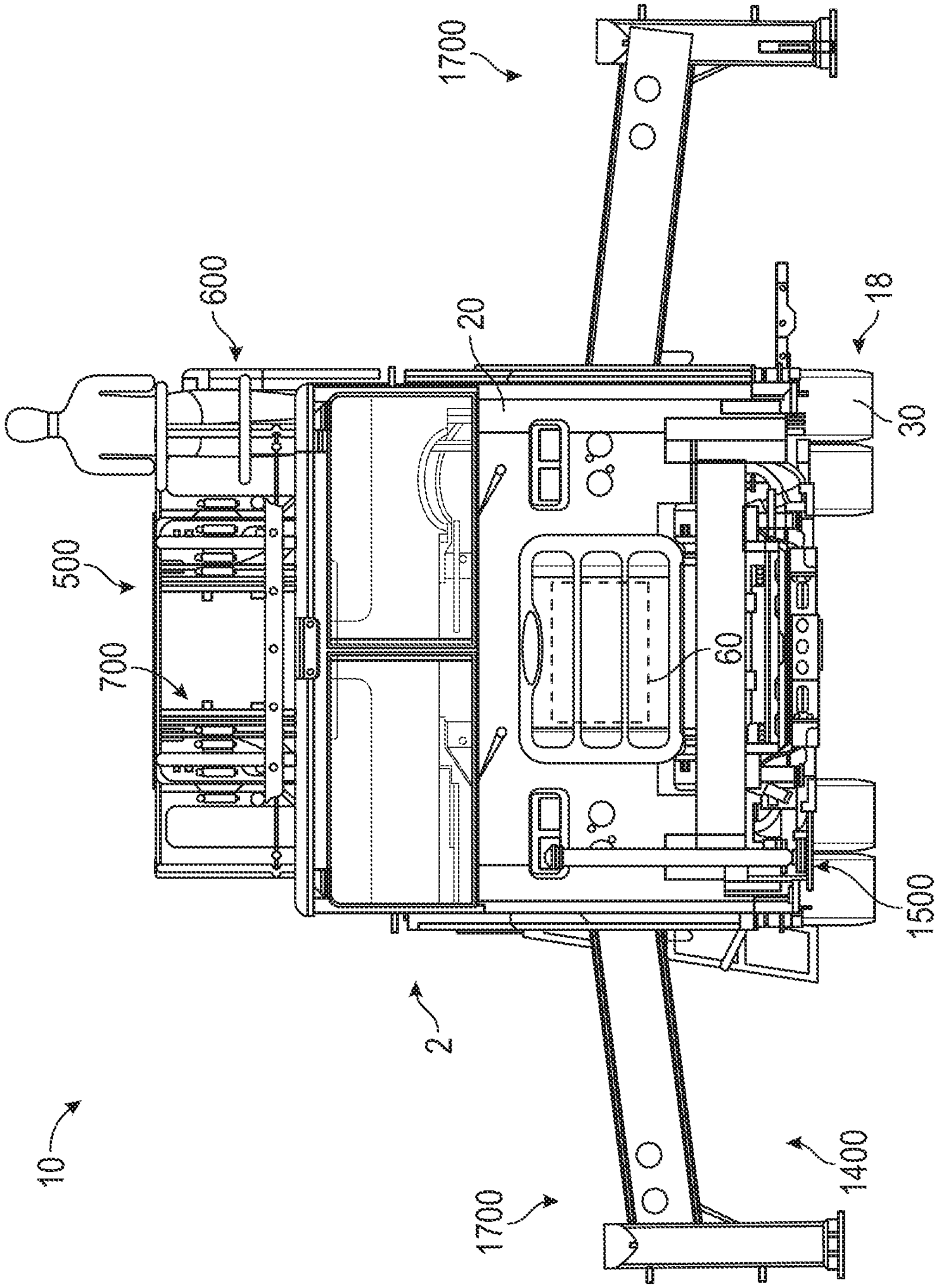
FIG. 7 is a front view of the mid-mount fire apparatus of FIG. 1 having outriggers in an extended configuration, according to an exemplary embodiment.

As shown in FIGS. 1, 2, 4, 6, 7, 10-12, 14, and 15, the fire apparatus 10 includes a stability system, shown as stability assembly 1400. As shown in FIGS. 1, 2, 4, and 7, the stability assembly 1400 includes first stabilizers, shown as front downriggers 1500, coupled to each lateral side of the front bumper 22 at the front end 2 of the front cabin 20. In other embodiments, the front downriggers 1500 are otherwise coupled to the fire apparatus 10 (e.g., to the front end 2 of the frame 12, etc.). According to an exemplary embodiment, the front downriggers 1500 are selectively deployable (e.g., extendable, etc.) downward to engage a ground surface. As shown in FIGS. 1, 2, 4-6, 10-12, 14, and 15, the stability assembly 1400 includes second stabilizers, shown as rear downriggers 1600, coupled to each lateral side of the rear end 4 of the frame 12 and/or the rear end 306 of the torque box 300. According to an exemplary embodiment, the rear downriggers 1600 are selectively deployable (e.g., extendable, etc.) downward to engage a ground surface. As shown in FIGS. 1, 2, 4, 6, 7, 10, 12, 14, 15, 17, and 18, the stability assembly 1400 includes third stabilizers, shown outriggers 1700, coupled to the front end 304 of the torque box 300 between the pedestal 308 and the body 302. As shown in FIGS. 6 and 7, the outriggers 1700 are selectively deployable (e.g., extendable, etc.) outward from each of the lateral sides of the body 110 and/or downward to engage a ground surface. According to an exemplary embodiment, the outriggers 1700 are extendable up to a distance of eighteen feet (e.g., measured between the center of a pad of a first outrigger and the center of a pad of a second outrigger, etc.). In other embodiments, the outriggers 1700 are extendable up to a distance of less than or greater than eighteen feet.

According to an exemplary embodiment, the front downriggers 1500, the rear downriggers 1600, and the outriggers 1700 are positioned to transfer the loading from the aerial ladder assembly 700 to the ground. For example, a load applied to the aerial ladder assembly 700 (e.g., a fire fighter at the distal end 704, a wind load, etc.) may be conveyed into to the turntable 510, through the pedestal 308 and the torque box 300, to the frame 12, and into the ground through the front downriggers 1500, the rear downriggers 1600, and/or the outriggers 1700. When the front downriggers 1500, the rear downriggers 1600, and/or the outriggers 1700 engage with a ground surface, portions of the fire apparatus 10 (e.g., the front end 2, the rear end 4, etc.) may be elevated relative to the ground surface. One or more of the wheel and tire assemblies 30 may remain in contact with the ground surface, but may not provide any load bearing support. While the fire apparatus 10 is being driven or not in use, the front downriggers 1500, the rear downriggers 1600, and the outriggers 1700 may be retracted into a stored position.

According to an exemplary embodiment, with (i) the front downriggers 1500, the rear downriggers 1600, and/or the outriggers 1700 extended and (ii) the aerial ladder assembly 700 fully extended (e.g., at a horizontal reach of 88 feet, at a vertical reach of 95 feet, etc.), the fire apparatus 10 withstands a rated tip load (e.g., rated meaning that the fire apparatus 10 can, from a design-engineering perspective, withstand a greater tip load, with an associated factor of safety of at least two, meets National Fire Protection Association ("NFPA") requirements, etc.) of at least 1,000 pounds applied to the work basket 1300, in addition to the weight of the work basket 1300 itself (e.g., approximately 700 pounds, etc.). In embodiments where the aerial assembly 500 does not include the work basket 1300, the fire apparatus 10 may have a rated tip load of more than 1,000 pounds (e.g., 1,250 pounds, etc.) when the aerial ladder assembly 700 is fully extended.

According to an exemplary embodiment, the tandem rear axles 18 have a gross axle weight rating of up to 48,000 pounds and the fire apparatus 10 does not exceed the 48,000 pound tandem-rear axle rating. The front axle 16 may have a 24,000 pound axle rating. Traditionally, mid-mount fire trucks have greater than a 48,000 pound loading on the tandem rear-axles thereof. However, some state regulations prevent vehicles having such a high axle loading, and, therefore, the vehicles are unable to be sold and operated in such states. Advantageously, the fire apparatus 10 of the present disclosure has a gross axle weight loading of at most 48,000 pounds on the tandem rear axles 18, and, therefore, the fire apparatus 10 may be sold and operated in any state of the United States.

Figure 8:
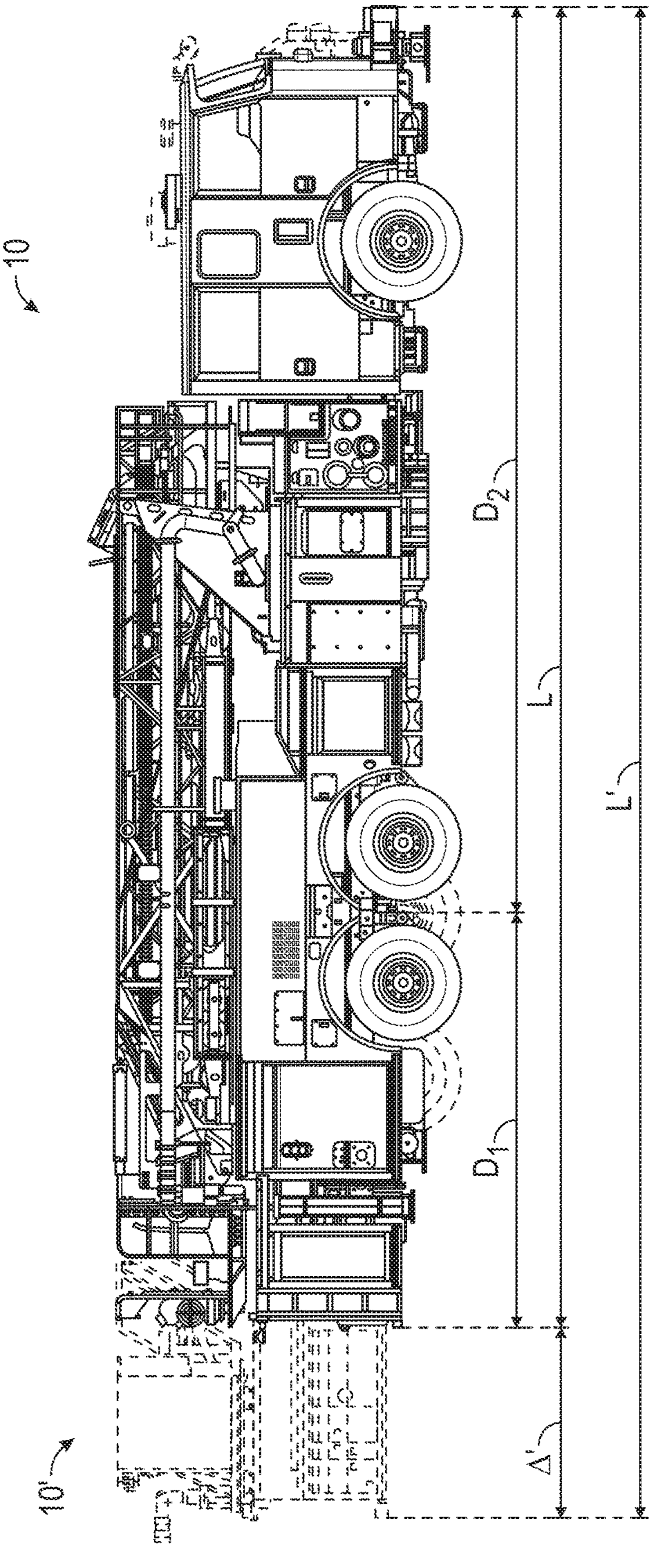
FIG. 8 is a side view of the mid-mount fire apparatus of FIG. 1 relative to a traditional mid-mount fire apparatus, according to an exemplary embodiment.
Figure 9:
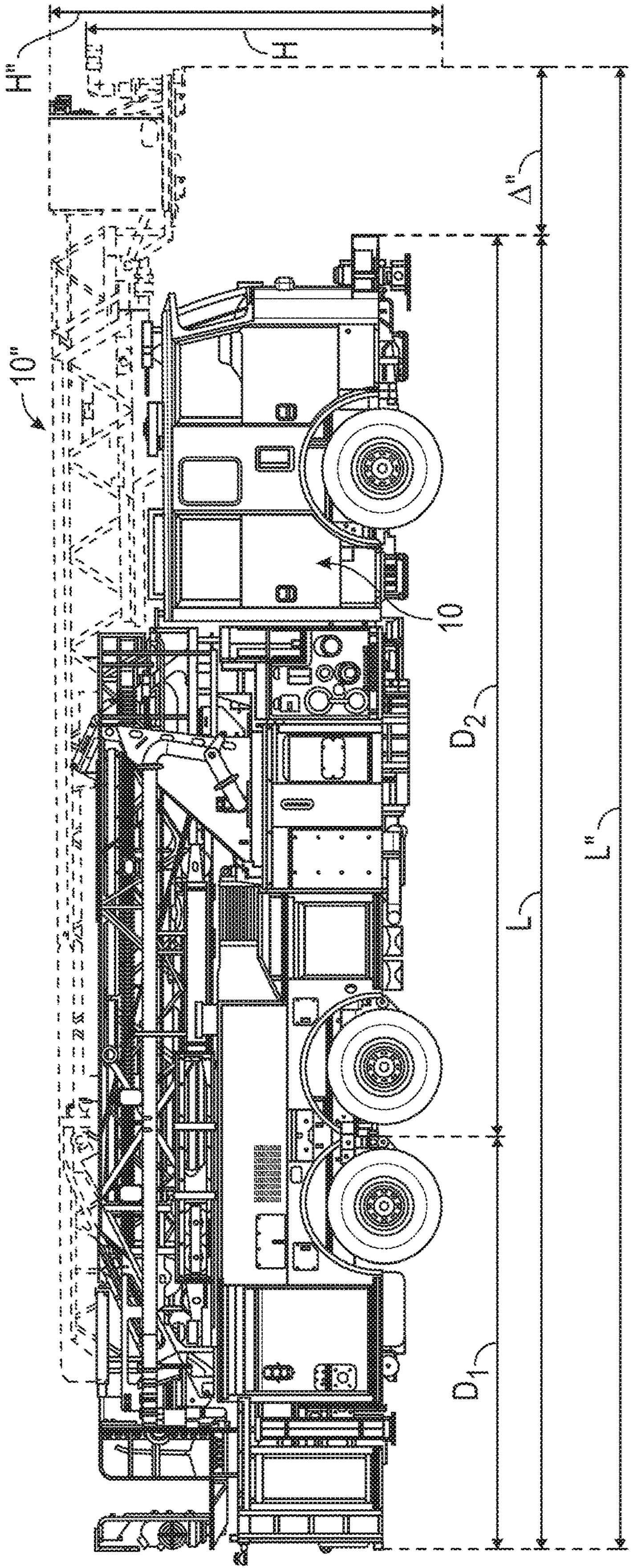
FIG. 9 is a side view of the mid-mount fire apparatus of FIG. 1 relative to a traditional rear-mount fire apparatus, according to an exemplary embodiment.

As shown in FIGS. 5 and 9, the fire apparatus 10 has a height H. According to an exemplary embodiment, the height H of the fire apparatus 10 is at most 128 inches (i.e., 10 feet, 8 inches). In other embodiments, the fire apparatus 10 has a height greater than 128 inches. As shown in FIGS. 8 and 9, the fire apparatus 10 has a longitudinal length L. According to an exemplary embodiment, the longitudinal length L of the fire apparatus 10 is at most 502 inches (i.e., 41 feet, 10 inches). In other embodiments, the fire apparatus 10 has a length L greater than 502 inches. As shown in FIGS. 8 and 9, the fire apparatus 10 has a distance $D_1$ between the rear end 4 of the body 110 and the middle of the tandem rear axles 18 (e.g., a body rear overhang portion, etc.). According to an exemplary embodiment, the distance $D_1$ of the fire apparatus 10 is at most 160 inches (i.e., 13 feet, 4 inches).

In other embodiments, the fire apparatus 10 has a distance $D_1$ greater than 160 inches. As shown in FIGS. 8 and 9, the fire apparatus 10 has a distance $D_2$ between the front end 2 of the front cabin 20 (excluding the front bumper 22) and the middle of the tandem rear axles 18. According to an exemplary embodiment, the distance $D_2$ of the fire apparatus 10 is approximately twice or at least twice that of the distance $D_1$ (e.g., approximately 321 inches, approximately 323 inches, at least 320 inches, etc.).

As shown in FIG. 8, the longitudinal length L of the fire apparatus 10 is compared to the longitudinal length L' of a traditional mid-mount fire apparatus 10'. As shown in FIG. 8, when the front axles of the fire apparatus 10 and the fire apparatus 10' are aligned, the fire apparatus 10' extends beyond the longitudinal length L of the fire apparatus 10 a distance Δ'. The distance Δ' may be approximately the same as the amount of the body 110 rearward of the tandem rear axles 18 of the fire apparatus 10 such that the amount of body rearward of the tandem rear axle of the fire apparatus 10' is approximately double that of the fire apparatus 10. Decreasing the amount of the body 110 rearward of the tandem rear axles 18 improves drivability and maneuverability, and substantially reduces the amount of damage that fire departments may inflict on public and/or private property throughout a year of operating their fire trucks.

One solution to reducing the overall length of a fire truck is to configure the fire truck as a rear-mount fire truck with the ladder assembly overhanging the front cabin (e.g., in order to provide a ladder assembly with comparable extension capabilities, etc.). As shown in FIG. 9, the longitudinal length L of the fire apparatus 10 is compared to the longitudinal length L' of a traditional rear-mount fire apparatus 10". As shown in FIG. 9, when the front axles of the fire apparatus 10 and the fire apparatus 10" are aligned, the ladder assembly of the fire apparatus 10" extends beyond the longitudinal length L of the fire apparatus 10 a distance Δ" such that the ladder assembly overhangs past the front cabin. Overhanging the ladder assembly reduces driver visibility, as well as rear-mount fire trucks do not provide as much freedom when arriving at a scene on where and how to position the truck, which typically requires the truck to be reversed into position to provide the desired amount of reach (e.g., which wastes valuable time, etc.). Further, the height H" of the fire apparatus 10" is required to be higher than the height H of the fire apparatus 10 (e.g., by approximately one foot, etc.) so that the ladder assembly of the fire apparatus 10" can clear the front cabin thereof.

Aerial Ladder Assembly Structure

Figure 22:
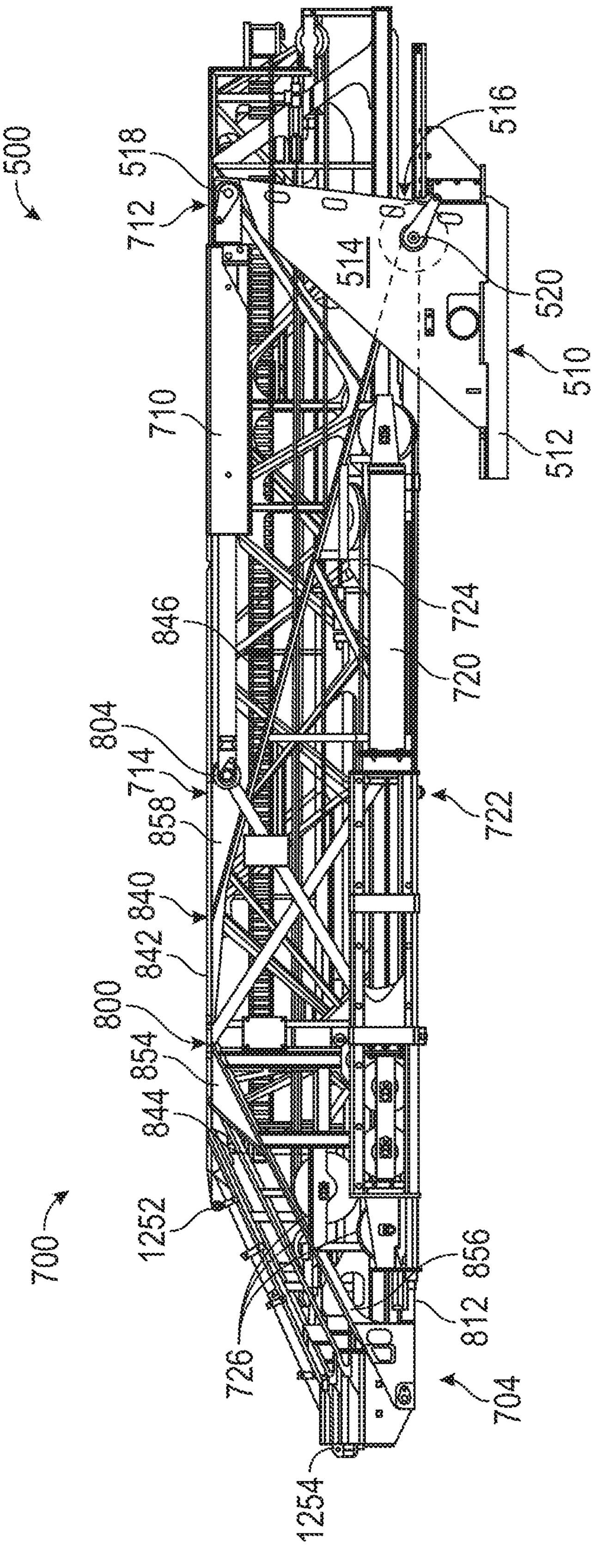
FIG. 22 is a side view of the aerial ladder assembly and turntable of FIG. 16, according to an exemplary embodiment.
Figure 23:
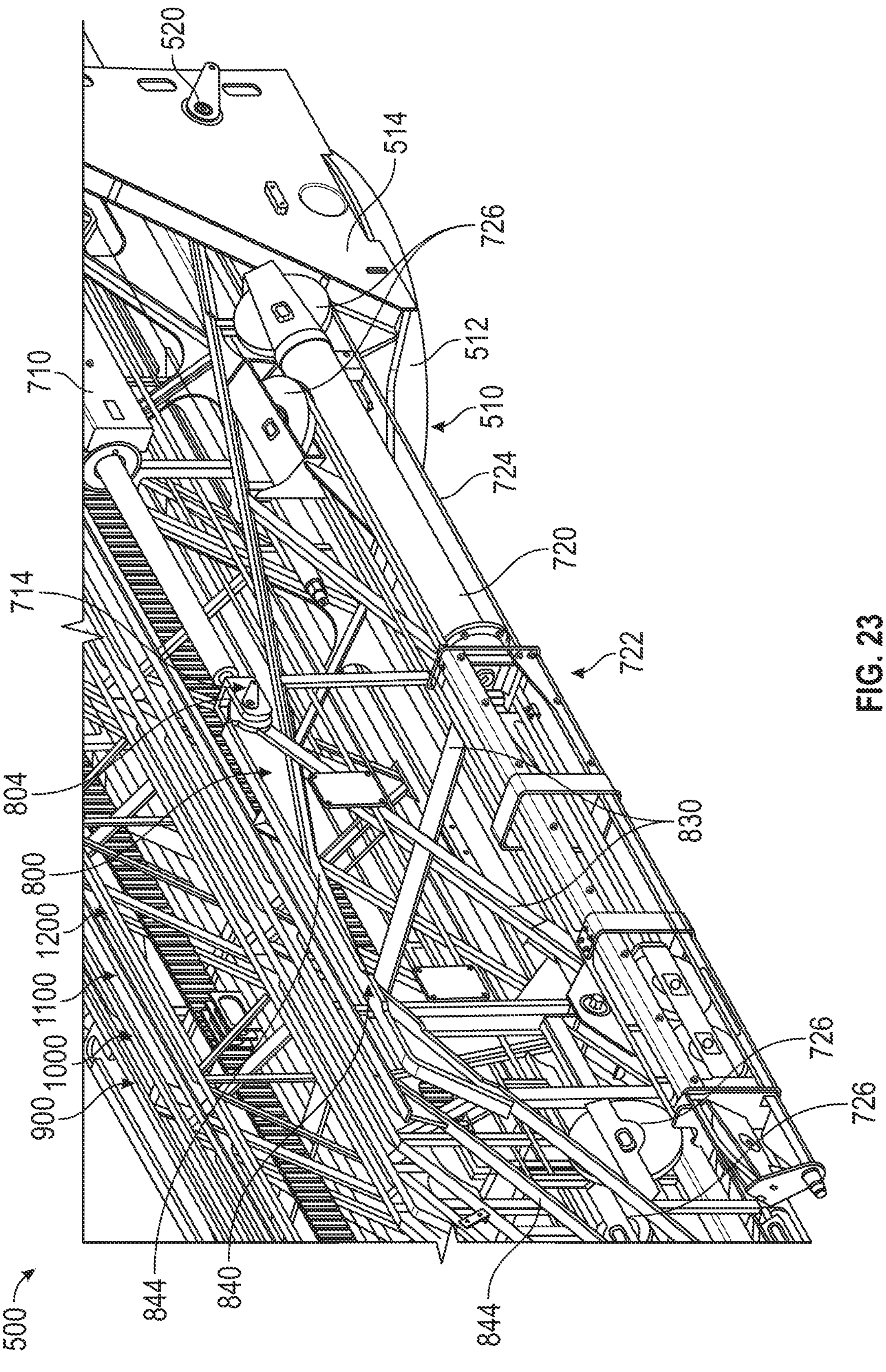
FIG. 23 is a perspective view of the aerial ladder assembly and turntable of FIG. 16, according to an exemplary embodiment.

Referring to FIGS. 16, 22, and 23, each extension actuator 720 is part of a cable control assembly 722. As the extension actuator 720 extends and retracts, a cable 724 is pulled into and/or payed out of the cable control assembly 722. The cables 724 extend along each of the base section 800, the lower middle section 900, the middle section 1000, the upper middle section 1100, and the fly section 1200 between a series of pulleys 726. The pulleys 726 are rotatably coupled to the base section 800, the lower middle section 900, the middle section 1000, the upper middle section 1100, and the fly section 1200. As the cable control assembly 722 pulls the cable 724 in and pays/or out the cable 724, the cable 724 exerts forces on the pulleys 726, which forces the aerial ladder assembly 700 to extend or retract. The cable control assemblies 722, the cables 724, and the pulleys 726 actively control both the extension and retraction of the aerial ladder assembly 700 such that the aerial ladder assembly 700 can extend and retract independent of the force of gravity.

Referring to FIGS. 24-28, a longitudinal axis 732, a lateral axis 734, and a vertical axis 736 are defined with respect to the aerial ladder assembly 700. A center plane 738 is defined perpendicular to the lateral axis 734 (i.e., parallel to the longitudinal axis 732 and the vertical axis 736). The center plane 738 is laterally centered with respect to the aerial ladder assembly 700 (e.g., with respect to each ladder section of the aerial ladder assembly 700).

Figure 26:
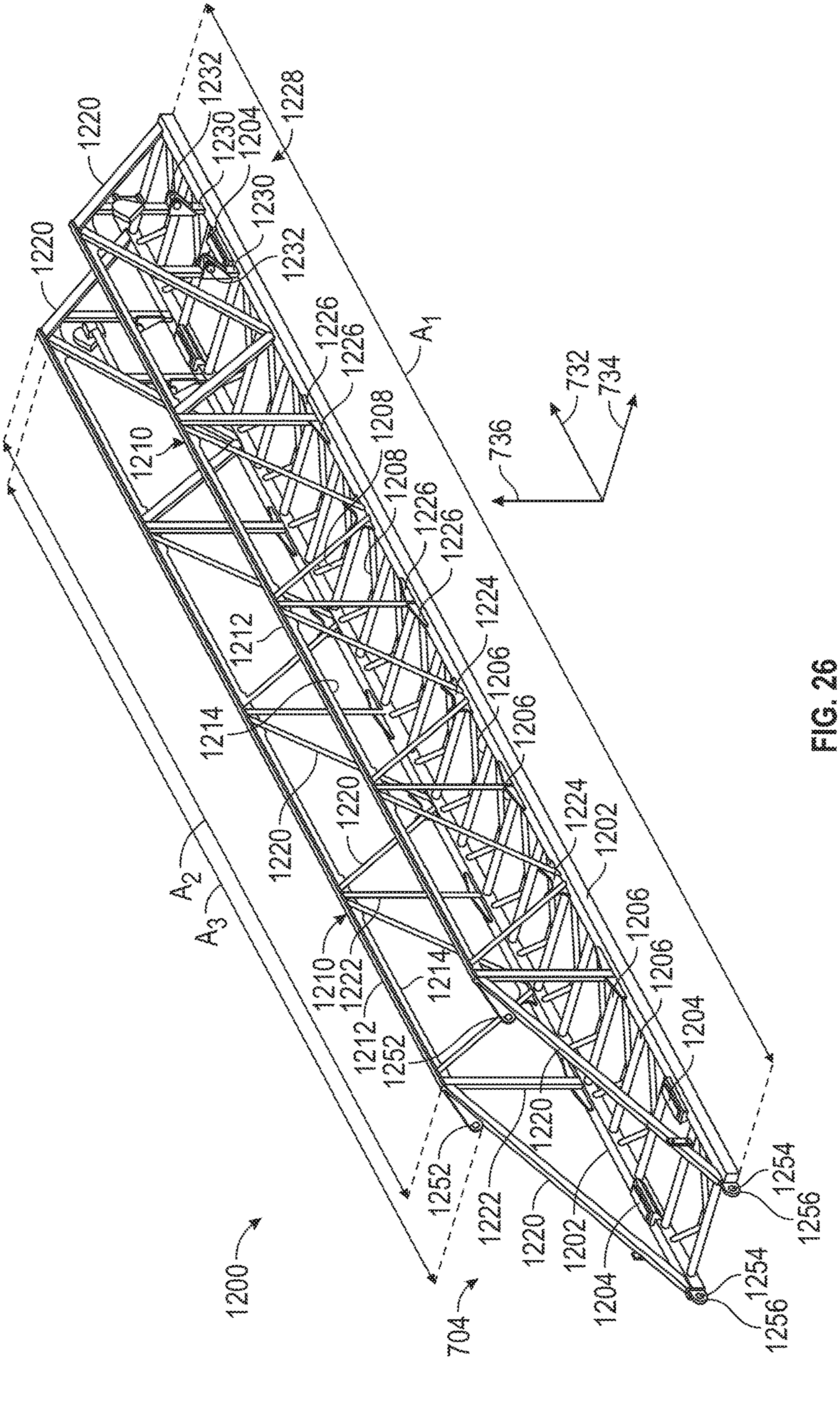
FIG. 26 is a perspective view of a fly section of the aerial ladder assembly of FIG. 16, according to an exemplary embodiment.
Figure 27:
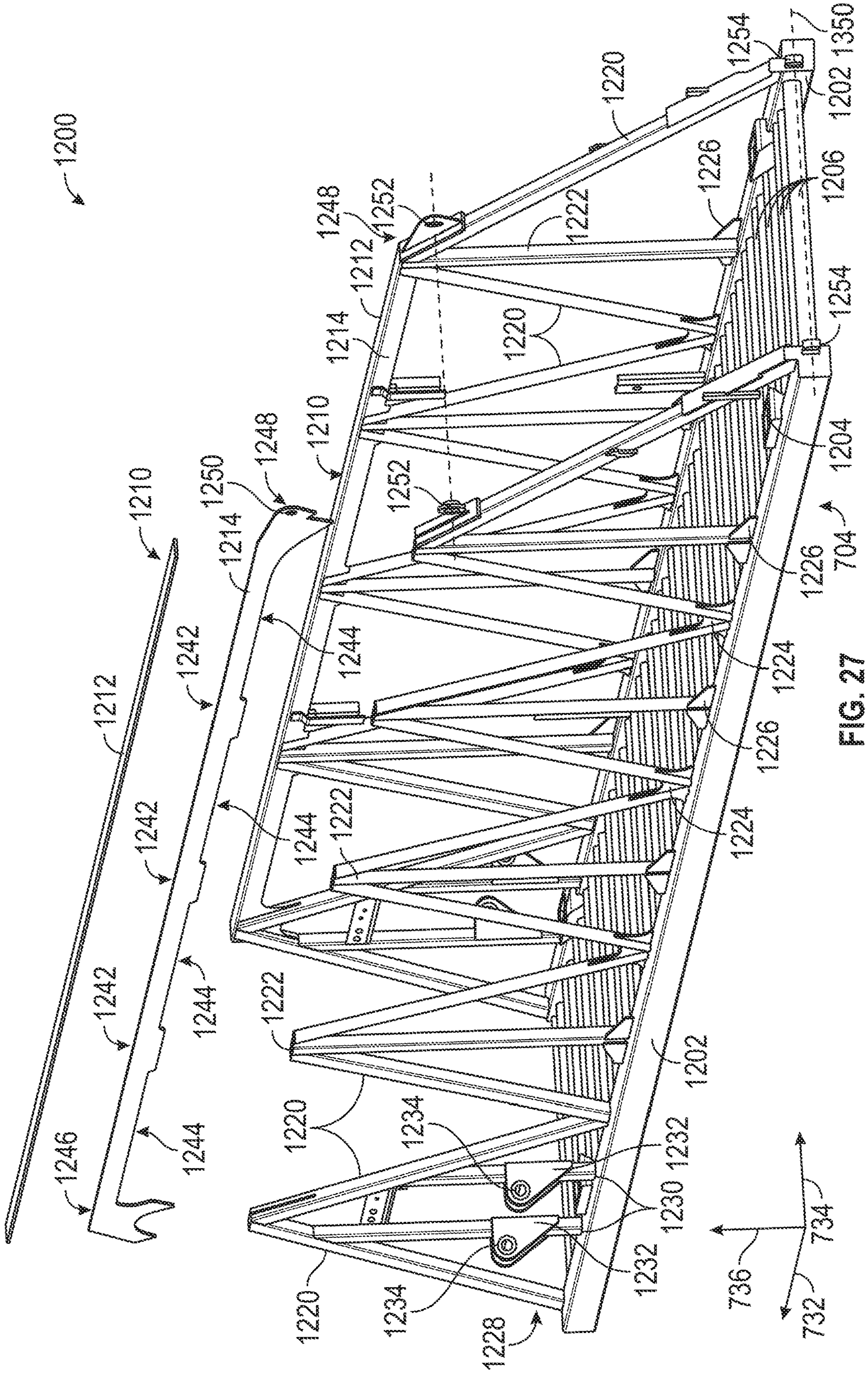
FIG. 27 is an exploded view of the fly section of FIG. 26, according to an exemplary embodiment.

Referring to FIGS. 26 and 27, the fly section 1200 is shown according to an exemplary embodiment. The fly section 1200 includes a pair of support members, shown as base rails 1202. The base rails 1202 extend longitudinally (i.e., parallel to the longitudinal axis 732) and are laterally offset from one another. The base rails 1202 are symmetrically arranged about the center plane 738. As shown, the base rails 1202 are tubular members each having a square cross section. In other embodiments, the base rails 1202 have other cross sectional shapes (e.g., C-channel, circular, etc.). Further alternatively, the base rails 1202 may be made from one or more members (e.g., tubular members, C-channels, etc.) coupled to one or more plates. The ends of the base rails 1202 may be capped (e.g., a plate welded over the open end) to prevent debris from entering the base rails 1202. Each base rail 1202 defines a pair of apertures 1204 that extend from an outer surface of the base rail 1202 to an interior volume of the base rail 1202. The apertures 1204 are arranged near opposite ends of the fly section 1200. The cables 724 may pass through one aperture 1204, through the interior volume of the base rail 1202, and out through the other aperture 1204. This arrangement reduces the length of the cable 724 that is exposed, reducing the chances of an operator or piece of equipment being caught by the cables 724. In other embodiments, other components extend through the apertures 1204 and into the base rail 1202, such as wires or hoses.

The fly section 1200 further includes a series of structural members or steps, shown as ladder rungs 1206, that extend between the base rails 1202. As shown, the ladder rungs 1206 are tubular members each having a round cross section. The ladder rungs 1206 are fixedly coupled to both base rails 1202, thereby indirectly fixedly coupling the base rails 1202 together. The ladder rungs 1206 are configured to act as steps to support the weight of operators and their equipment as the operators ascend or descend the aerial ladder assembly 700. The fly section 1200 further includes support members, shown as ladder rung supports 1208. The ladder rung supports 1208 extend between one of the base rails 1202 and one of the ladder rungs 1206 at an angle relative to the base rails 1202 (e.g., 30 degrees, 45 degrees, etc.). Each ladder rung support 1208 is fixedly coupled to one of the base rails 1202 and one of the ladder rungs 1206. Each ladder rung 1206 engages a pair of ladder rung supports 1208. The ladder rung supports 1208 extend below the corresponding ladder rung 1206 when the aerial ladder assembly 700 is raised. Accordingly, the ladder rung supports 1208 help to support the downward weight of the operators and their equipment. In other embodiments, the ladder rungs 1206 and/or the ladder rung supports 1208 have other cross sectional shapes (e.g., C-channel, square, etc.).

Figure 29:
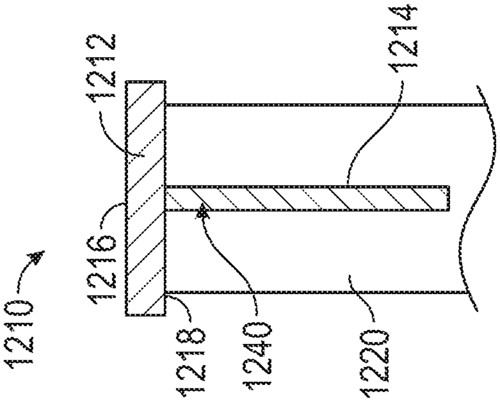
FIG. 29 is a section view of hand rail of the fly section of FIG. 26, according to an exemplary embodiment.

Referring to FIGS. 26-29, the fly section 1200 further includes a pair of hand rails 1210 extending longitudinally. Each hand rail 1210 is positioned above and laterally aligned with one of the base rails 1202. The hand rails 1210 are symmetrically arranged about the center plane 738. Each hand rail 1210 includes a rail, horizontal member, top member, or structural member, shown as top plate 1212, and a vertical member, center member, or structural member, shown as gusset plate 1214. The top plate 1212 has a solid cross section. Accordingly, the top plate 1212 is not a tubular member. As shown in FIG. 29, the top plate 1212 defines a top surface 1216 and a bottom surface 1218. The gusset plate 1214 engages and is fixedly coupled to the bottom surface 1218. In some embodiments, the top surface 1216 and the bottom surface 1218 extend horizontally (i.e., parallel to the longitudinal axis 732 and the lateral axis 734). The gusset plate 1214 extends vertically (e.g., parallel to the center plane 738).

Figure 28:
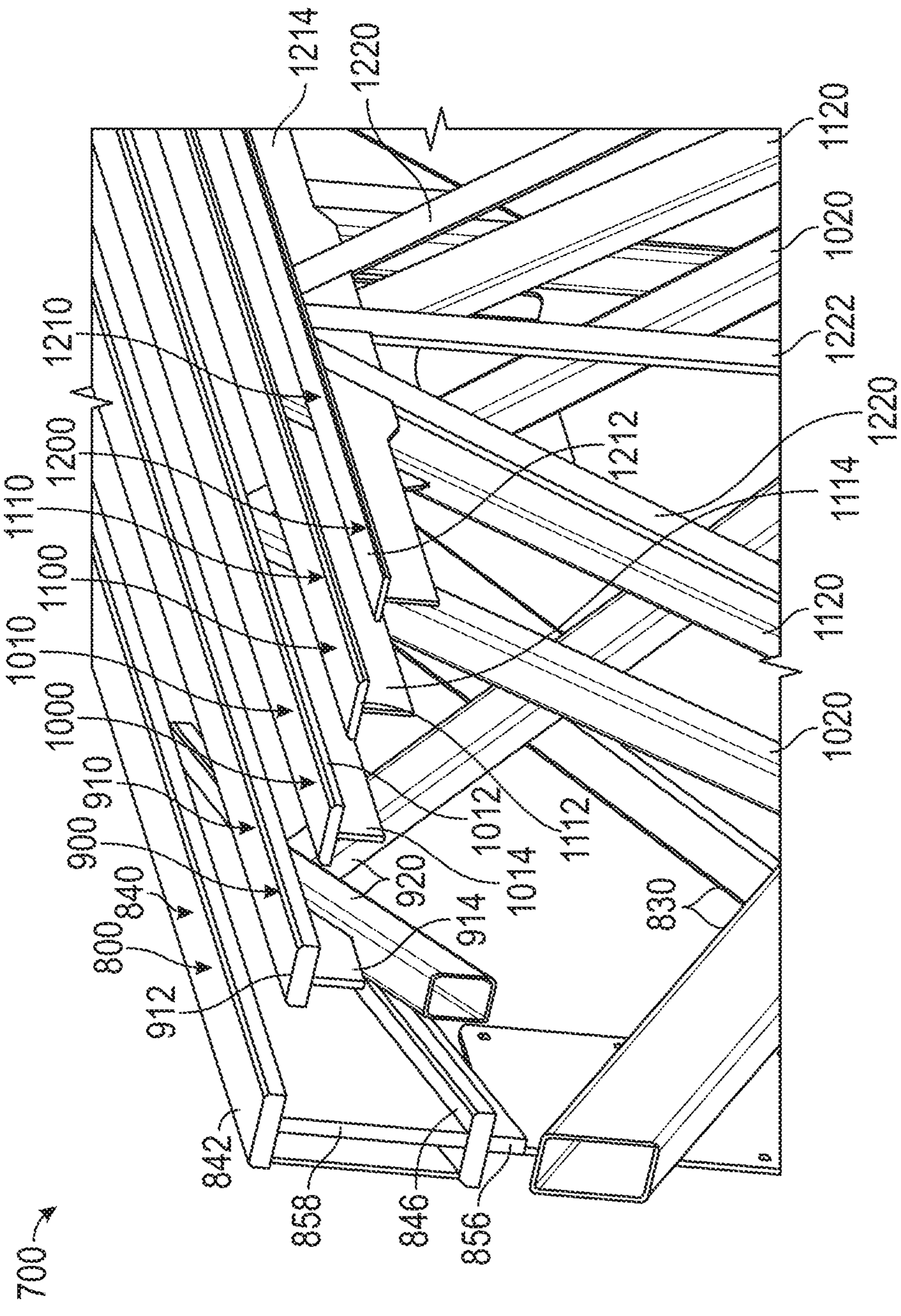
FIG. 28 is a section view of the aerial ladder assembly of FIG. 16, according to an exemplary embodiment.
Figure 30:
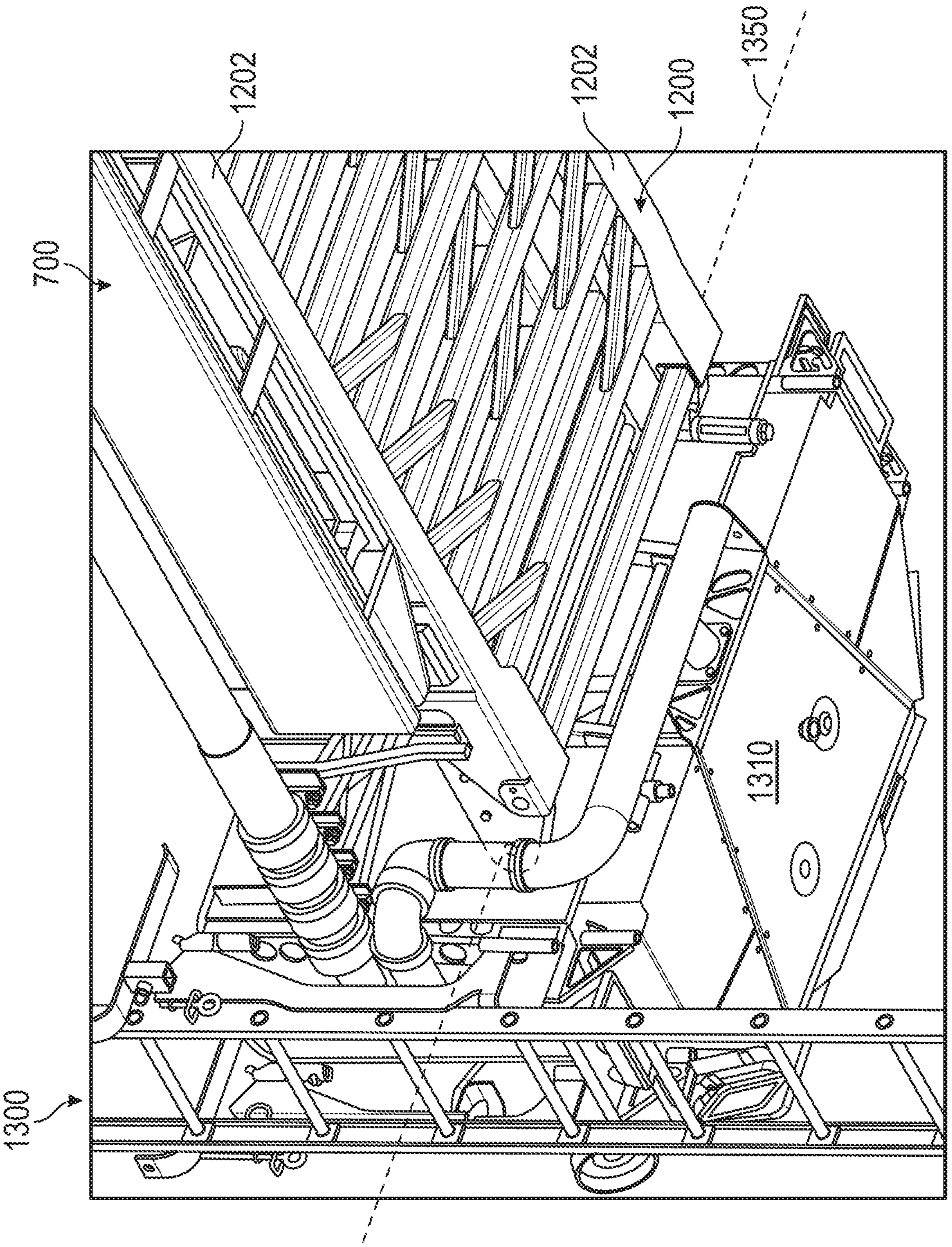
FIG. 30 is a bottom rear perspective view of a work basket of the mid-mount fire apparatus of FIG. 1 and the aerial ladder assembly of FIG. 16, according to an exemplary embodiment.
Figure 31:
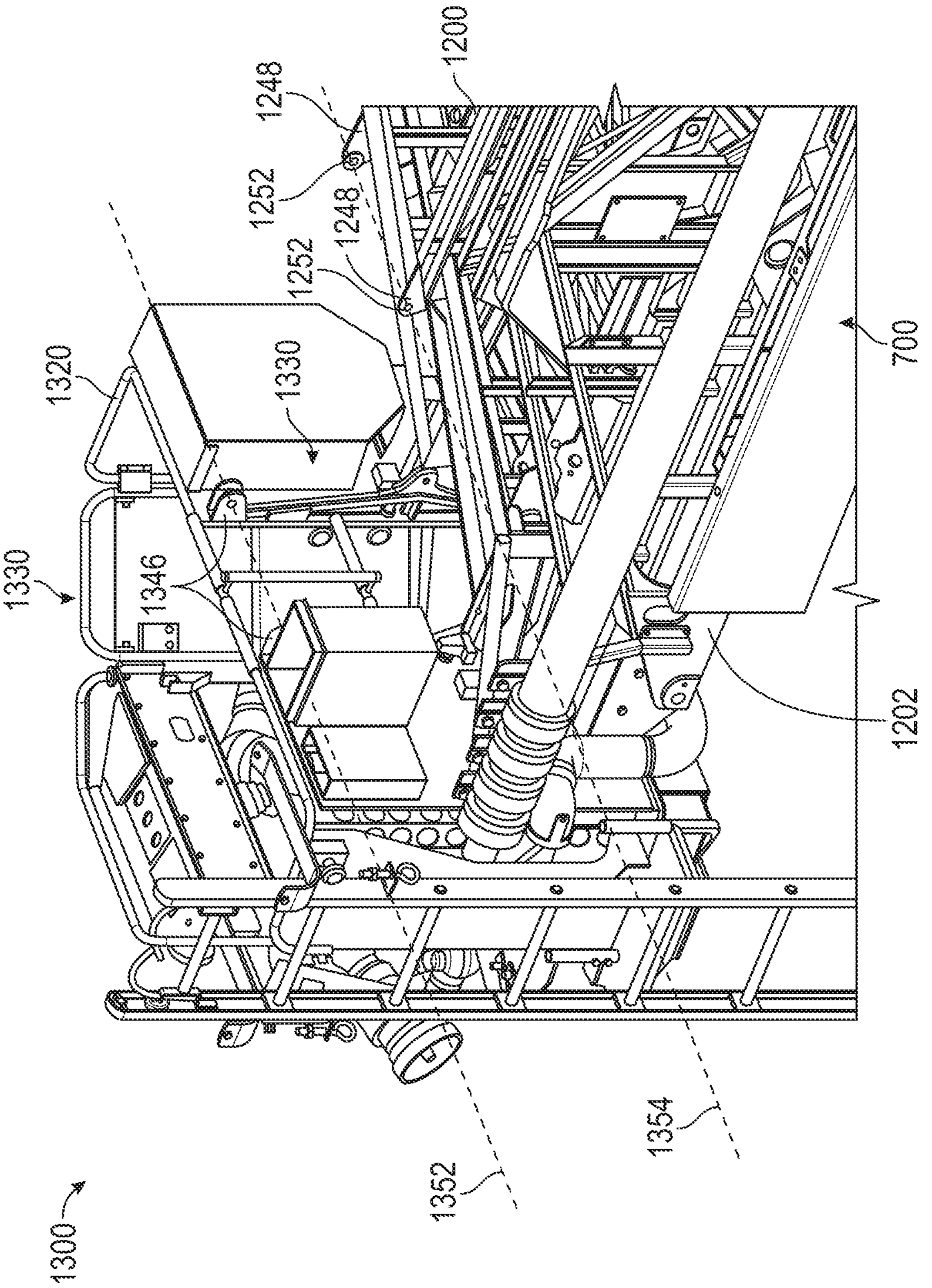
FIG. 31 is a top rear perspective view of the work basket of FIG. 30 and the aerial ladder assembly of FIG. 16, according to an exemplary embodiment.

Referring to FIGS. 26-28, the fly section 1200 includes a series of structural members, shown as angled lacing members 1220 and vertical lacing members 1222, extending between each base rail 1202 and the corresponding hand rail 1210. The angled lacing members 1220 and the vertical lacing members 1222 are each tubular members. In other embodiments, the angled lacing members 1220 and/or the vertical lacing members 1222 have a solid cross section. The angled lacing members 1220 and the vertical lacing members 1222 may have rectangular cross sections, circular cross sections, or other types of cross sections. The angled lacing members 1220 and the vertical lacing members 1222 extend within a plane parallel to the center plane 738. The angled lacing members 1220 are oriented at an angle relative to the longitudinal axis 732 (e.g., 30 degrees, 45 degrees, 60 degrees, etc.). The vertical lacing members 1222 extend perpendicular to the longitudinal axis 732 and engage the hand rail 1210 between the angled lacing members 1220. The angled lacing members 1220 and the vertical lacing members 1222 are fixedly coupled to the base rails 1202 and the hand rails 1210. Accordingly, each base rail 1202, the corresponding hand rail 1210, the corresponding angled lacing members 1220, and the corresponding vertical lacing members 1222 form a truss structure that resists bending about a lateral axis.

Figure 25:
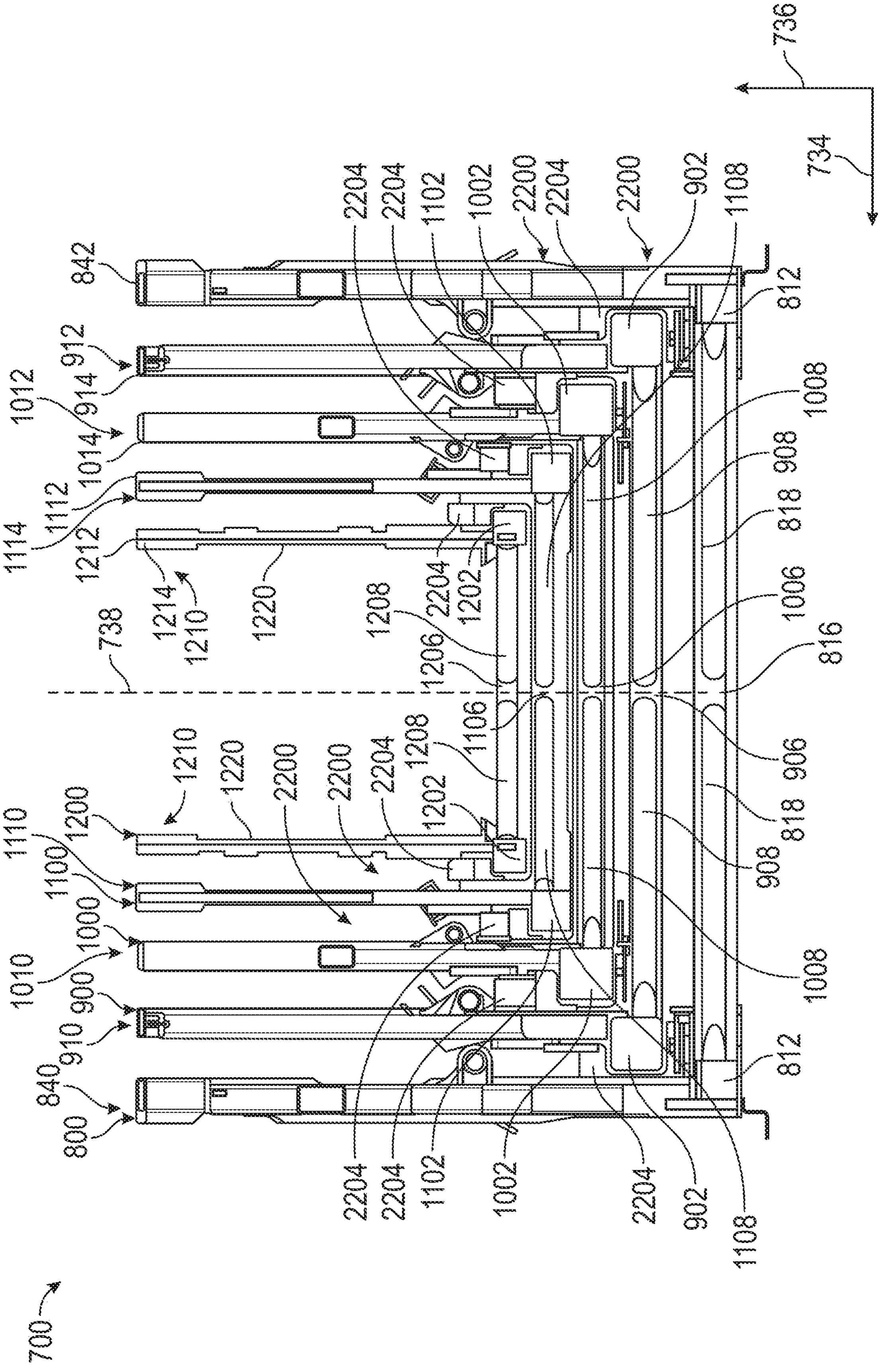
FIG. 25 is a rear view of the aerial ladder assembly of FIG. 16, according to an exemplary embodiment.

The angled lacing members 1220 and the vertical lacing members 1222 each engage the corresponding base rail 1202 at a bottom end. As shown in FIG. 25, the base rails 1202 extend farther laterally outward than (i.e., farther from the center plane 738 than) the angled lacing members 1220 and the vertical lacing members 1222. The bottom ends of some of the angled lacing members 1220 define a channel, slot, or groove that receives a support member, shown as gusset plate 1224. Specifically, pairs of the angled lacing members 1220 meet at the base rail 1202, and the gusset plate 1224 extends upward from the base rail 1202 into the grooves defined by the angled lacing members 1220. Each gusset plate 1224 is fixedly coupled to the base rail 1202 and the corresponding angled lacing members 1220. A series of support members, shown as gusset plates 1226, extend between an outer surface one of the vertical lacing members 1222 and the base rail 1202. Each gusset plate 1226 is fixedly coupled to the base rail 1202 and the corresponding vertical lacing member 1222. The gusset plates 1224 and the gusset plates 1226 increase the strength of the fly section 1200.

The fly section 1200 further includes a structural assembly, shown as pulley support assembly 1228. The pulley support assembly 1228 includes a pair of support members, shown as vertical supports 1230, that each extend between and fixedly couple to the base rail 1202 and one of the angled lacing members 1220. Each vertical support 1230 is coupled to a protrusion, shown as boss 1232. The bosses 1232 each define an aperture 1234 that extends longitudinally therethrough. The bosses 1232 are configured to support one of the pulleys 726. By way of example, a bracket that supports one of the pulleys 726 may extend into the apertures 1234.

Referring to FIGS. 26-29, the angled lacing members 1220 and the vertical lacing members 1222 each engage the hand rail 1210 at a top end. Specifically, the angled lacing members 1220 and the vertical lacing members 1222 each define a channel, slot, or groove 1240 that receives the gusset plate 1214. Accordingly, the angled lacing members 1220 and the vertical lacing members 1222 each extend both laterally inward of (i.e., closer to the center plane 738 than) and laterally outward of (i.e., farther from the center plane 738 than) the gusset plate 1214. The angled lacing members 1220 and the vertical lacing members 1222 may engage the gusset plate 1214 along the entire surface of the groove 1240. The angled lacing members 1220 and the vertical lacing members 1222 extend upward along the gusset plate 1214 until the angled lacing members 1220 and the vertical lacing members 1222 engage the bottom surface 1218 of the top plate 1212. The angled lacing members 1220 and the vertical lacing members 1222 are directly fixedly coupled to both the gusset plate 1214 and the top plate 1212. In another embodiment, one or more of the structural members of the aerial ladder assembly 700 (e.g., the angled lacing members 1220, the vertical lacing members 1222, etc.) do not extend to the respective a rail, horizontal member, top member, or structural member (e.g., top plate 1212, etc.). By way of example, the structural member(s) may be coupled to the respective support member(s) (e.g., gusset plate 1214, etc.), and the support member may be coupled to the rail, horizontal member, top member, or structural member, but the structural member(s) may terminate in one or more locations that are spaced from the rail, horizontal member, top member, or structural member.

The base rails 1202 extend a first length $A_1$ in the longitudinal direction. The top plates 1212 extend a second length $A_2$ in the longitudinal direction. The length $A_2$ is less than the length $A_1$. The gusset plates 1214 extend a third length $A_3$ in the longitudinal direction. The length $A_3$ is greater than the length $A_2$. Accordingly, the gusset plates 1214 extend along the entire length of the top plates 1212. This facilitates a connection between the top plate 1212 and the gusset plate 1214 that extends along the entire length of the top plate 1212, increasing the strength of the hand rail 1210. In other embodiments, each hand rail 1210 includes multiple gusset plates 1214 arranged sequentially along the length of the fly section 1200. In such an embodiment, the length $A_3$ may be less than the length $A_2$. By way of example, the length $A_3$ may be 25%, 50% or 75% of the length $A_2$.

A height of the gusset plate 1214 is defined parallel to the vertical axis 736. The gusset plate 1214 includes first sections, shown as interface sections 1242, positioned between second sections, shown as midsections 1244. The height of the gusset plate 1214 in the interface sections 1242 is greater than the height of the gusset plate 1214 in the midsections 1244. This provides a greater surface area for the angled lacing members 1220 and the vertical lacing members 1222 to couple to, increasing the strength of the coupling between the gusset plate 1214, the angled lacing members 1220, and the vertical lacing members 1222. A first end section, shown as proximal end section 1246, and a second end section, shown as distal end section 1248, of the gusset plate 1214 each have heights greater than that of the interface sections 1242 and the midsections 1244. The proximal end section 1246 is positioned adjacent the end of the top plate 1212 opposite the distal end 704 of the aerial ladder assembly 700. The distal end section 1248 is positioned adjacent the end of the top plate 1212 closest to the distal end 704 of the aerial ladder assembly 700.

The distal end section 1248 defines an aperture 1250 that extends laterally therethrough. The aperture 1250 receives a bearing or bushing, shown as bushing 1252. The bushing 1252 is coupled to the gusset plate 1214. The bushing 1252 defines a laterally-extending aperture. The bushing 1252 is configured to receive a pin (e.g., a bolt, a rod, a dowel pin, etc.) therethrough. The fly section 1200 further includes an interface, shown as protrusion 1254, extending longitudinally forward from each base rail 1202. The protrusion 1254 is fixedly coupled to the corresponding base rail 1202. The protrusions 1254 each define an aperture extending laterally therethrough that is configured to receive a pin.

Referring to FIGS. 1, 2, 30, and 31, the aerial assembly 500 includes a pair of linear actuators (e.g., hydraulic cylinders, pneumatic cylinders, electric linear actuators, etc.), shown as basket actuators 1340, each having a first end portion, shown as distal end portion 1342, and a second end portion, shown as proximal end portion 1344. The distal end portion 1342 pivotably couples to the work basket 1300. Specifically, a pair of protrusions, shown as brackets 1346, extend from a rear side of the work basket 1300 on either side of the basket door 1330 near the top of the work basket 1300. The brackets 1346 each define a set of laterally-extending apertures. A pin extends through the apertures of the brackets 1346 as well as an aperture defined by the distal end portion 1342 of the basket actuator 1340. The proximal end portion 1344 of the basket actuator 1340 pivotably couples to the fly section 1200. Specifically, a pin extends through the bushing 1252 as well as through an aperture defined by the proximal end portion 1344 of the basket actuator 1340. The work basket 1300 is also pivotably coupled to the fly section 1200. Specifically, a pair of protrusions or brackets extend rearward from the work basket 1300. These brackets each define laterally-extending apertures. A pair of pins extend through these laterally-extending apertures and the apertures of the protrusions 1254.

The work basket 1300 pivots about an axis of rotation 1350 relative to the fly section 1200. The basket actuators 1340 pivot about an axis of rotation 1352 relative to the work basket 1300 and about an axis of rotation 1354 relative to the fly section 1200. The axis of rotation 1350, the axis of rotation 1352, and the axis of rotation 1354 all extend parallel to the lateral axis 734. The basket actuators 1340 control the orientation of the work basket 1300 relative to the fly section 1200. When the basket actuators 1340 extend, the work basket 1300 rotates forward (i.e., away from the fly section 1200). When the basket actuators 1340 retract, the work basket 1300 rotates backward (i.e., toward the fly section 1200). Accordingly, the basket actuators 1340 are in tension when the work basket 1300 is loaded.

In the embodiment shown in FIGS. 26-29, the top plate 1212 has a rectangular cross section. The thickness of the top plate 1212, which is defined between the top surface 1216 and the bottom surface 1218, is uniform. The gusset plate 1214, the angled lacing members 1220, and the vertical lacing members 1222 are laterally centered on the top plate 1212. The top plate 1212 extends both (a) laterally inward of the gusset plate 1214, the angled lacing members 1220, and the vertical lacing members 1222 and (b) laterally outward of the gusset plate 1214, the angled lacing members 1220, and the vertical lacing members 1222. This provides an overhang for the operators to wrap their fingers around when traveling along the fly section 1200. The top surfaces of the angled lacing members 1220 and the vertical lacing members 1222 each engage the bottom surface 1218 along their entire lengths.

Conventional ladder sections include a tubular hand rail that engages a series of lacing members. Such tubular hand rails often have a rectangular cross sectional shape. The tubular shape of the tubular hand rail is resistant to bending, even when separated from the rest of the ladder section. Accordingly, the tubular hand rail increases the resistance to bending of the ladder section. However, the tubular hand rails can be quite difficult to grip properly, as the height of the tubular hand rail is commonly sufficient to prevent an operator's fingers from wrapping around the tubular hand rail to contact a bottom surface of the tubular hand rail. Instead, the operator is forced to grip onto the laterally-facing sides of the tubular hand rail, which is less secure and can lead to slipping.

The hand rail 1210 improves the strength and ease of use of the fly section 1200 relative to a conventional tubular hand rail. Under normal loading, the fly section 1200 is bent about a lateral bending axis extending near the vertical center of the fly section 1200. The moment of inertia of a structure, which defines its resistance to bending, is greater as the cross sectional area of the structure moves away from the axis about which the structure is bent. Accordingly, it is desirable to place as much material as possible near the top and bottom surfaces of the fly section 1200. The top plate 1212 is solid and positioned at the very top of the fly section 1200. In this arrangement, the contribution of the top plate 1212 to the moment of inertia of the fly section 1200 is maximized. Additionally, the gusset plate 1214 further increases the moment of inertia while strengthening the connections between the angled lacing members 1220, the vertical lacing members 1222, and the top plate 1212. Comparatively, the conventional tubular hand rail provides a lesser strength to weight ratio than the hand rail 1210. The bottom wall of the tubular hand rail is offset toward the bending axis, reducing its contribution to the moment of inertia of the corresponding ladder section. Additionally, the fly section 1200 can be shorter than a comparable ladder section incorporating a tubular hand rail, as the top plate 1212 does not need to be as far away from the bending axis to produce a similar moment of inertia.

Additionally, the hand rail 1210 is easier to grip than a conventional tubular hand rail. The width of the top plate 1212 of the hand rail 1210 is considerably less than its thickness. This facilitates an operator placing the palm of their hand on the top surface 1216 and wrapping their fingers along the lateral side surfaces of the top plate 1212 to engage the bottom surface 1218. Accordingly, the operator can apply a force perpendicular to the bottom surface 1218 and solidly engage the top plate 1212 to support themselves. The conventional tubular hand rail that only provides engagement with the lateral side surfaces relies on frictional forces between the operator's fingers and the lateral side surfaces of the tubular hand rail. The frictional forces are dependent on the grip strength of the operator. Accordingly, to obtain sufficient support, the operator constantly has to impart a gripping force on the tubular hand rail, which can be tiring.

Figure 32:
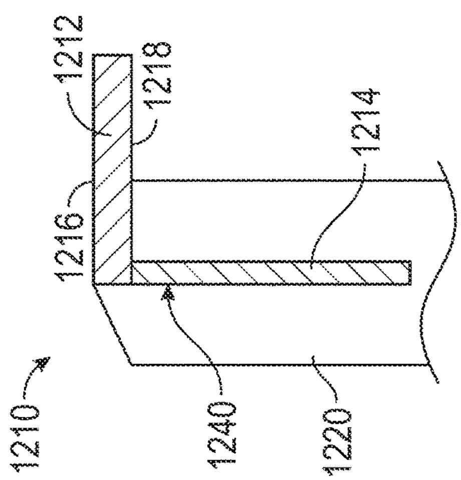
FIGS. 32-38 are section views of a hand rail of the fly section of FIG. 26, according to various exemplary embodiments.

Referring to FIGS. 32-40, in other alternative embodiments, the structure of the hand rail 1210 is modified. The shape, size, and position of the top plate 1212 and the gusset plate 1214 may be varied. Referring to FIG. 32, the top plate 1212 is offset laterally inward relative to the embodiment shown in FIG. 29. The side of the top plate 1212 that faces laterally outward is flush with the gusset plate 1214. The angled lacing members 1220 and the vertical lacing members 1222 extend laterally outward of the top plate 1212 and above the gusset plate 1214 to engage a lateral side of the top plate 1212. A portion of the top surfaces of the angled lacing members 1220 and the vertical lacing members 1222 is exposed such that it does not engage the top plate 1212. The angled lacing members 1220 and the vertical lacing members 1222 are chamfered to smooth the transitions between the angled lacing members 1220, the vertical lacing members 1222, and the top plate 1212.

Figure 33:
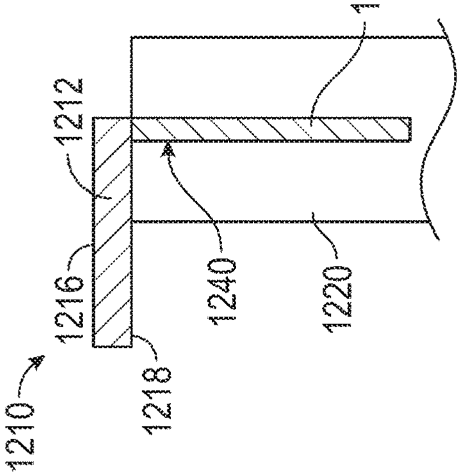

Referring to FIG. 33, the top plate 1212 is offset laterally outward relative to the embodiment shown in FIG. 29. The side of the top plate 1212 that faces laterally inward is flush with the gusset plate 1214. The angled lacing members 1220 and the vertical lacing members 1222 extend laterally inward of the top plate 1212. The angled lacing members 1220 and the vertical lacing members 1222 do not extend above the gusset plate 1214 to engage a lateral side of the top plate 1212.

Figure 34:
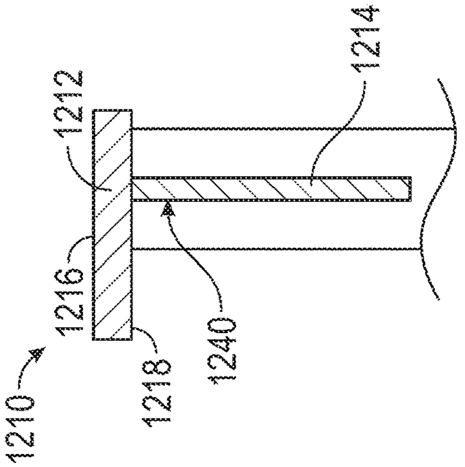

Referring to FIG. 34, the top plate 1212 is offset laterally outward relative to the embodiment shown in FIG. 29. Additionally, the angled lacing members 1220 and the vertical lacing members 1222 are narrower than the angled lacing members 1220 and the vertical lacing members 1222 shown in FIG. 29, and the gusset plate 1214 is shorter than the gusset plate 1214 shown in FIG. 29. Although the gusset plate 1214, angled lacing members 1220, and the vertical lacing members 1222 are not laterally centered with the top plate 1212, the top plate 1212 still extends both (a) laterally inward of the gusset plate 1214, the angled lacing members 1220, and the vertical lacing members 1222 and (b) laterally outward of the gusset plate 1214, the angled lacing members 1220, and the vertical lacing members 1222.

Figure 35:
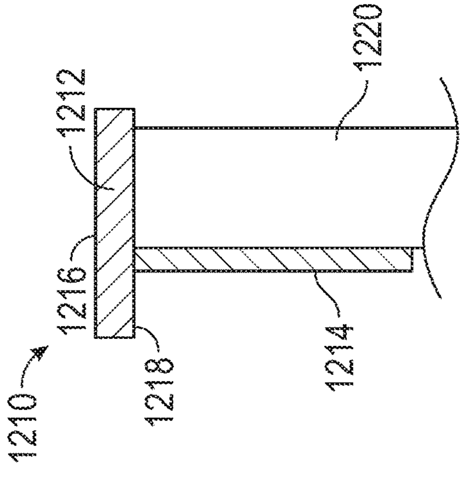

Referring to FIG. 35, the groove 1240 is omitted. Instead, the gusset plate 1214 engages and is coupled to a lateral side surface of the angled lacing members 1220 and the vertical lacing members 1222. The gusset plate 1214, angled lacing members 1220, and the vertical lacing members 1222 each engage the bottom surface 1218.

Figure 36:
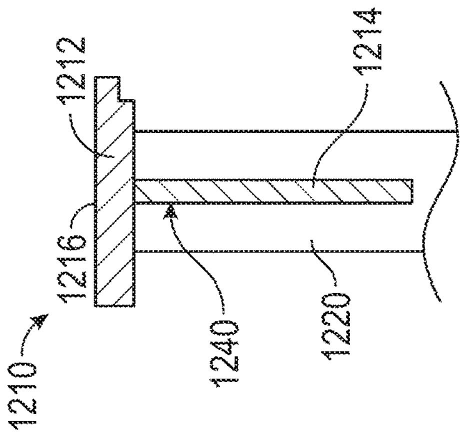

Referring to FIG. 36, the top plate 1212 is differently shaped than the top plate 1212 shown in FIG. 29. Specifically, a groove or notch is defined extending upward from the bottom surface 1218, removing a portion of the material of the top plate 1212. Accordingly, in this embodiment, the top plate 1212 does not have a uniform thickness. Instead, the thickness is reduced throughout the portion of the top plate 1212 that defines the notch. Due to the notch, a greater portion of the cross sectional area is positioned near the top surface 1216 than near the bottom surface 1218, increasing the moment of inertia to weight ratio of the hand rail 1210.

Figure 37:
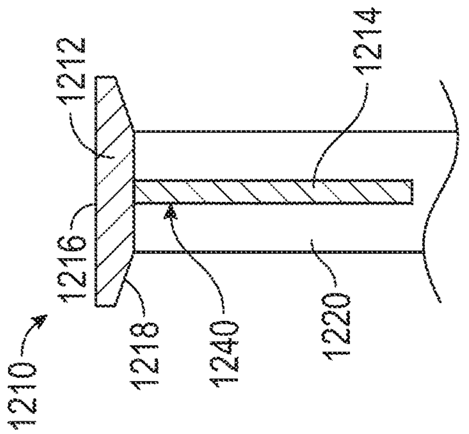

Referring to FIG. 37, the top surface 1216 and the bottom surface 1218 both extend horizontally near the lateral center of the hand rail 1210. As the top plate 1212 extends laterally beyond the angled lacing members 1220 and the vertical lacing members 1222, the bottom surface 1218 angles upwards such that the top plate 1212 tapers as it extends laterally outwards. This gradually reduces the thickness of the top plate 1212. Due to the taper, a greater portion of the cross sectional area is positioned near the top surface 1216 than near the bottom surface 1218, increasing the moment of inertia to weight ratio of the hand rail 1210. In other embodiments, the top plate 1212 is otherwise tapered. By way of example, the top surface 1216 may extend downward. By way of another example, the taper may extend through the entirety of the top plate 1212 such that the top surface 1216 is horizontal, and the entirety of the bottom surface 1218 extends at an angle relative to the top surface 1216.

Figure 38:
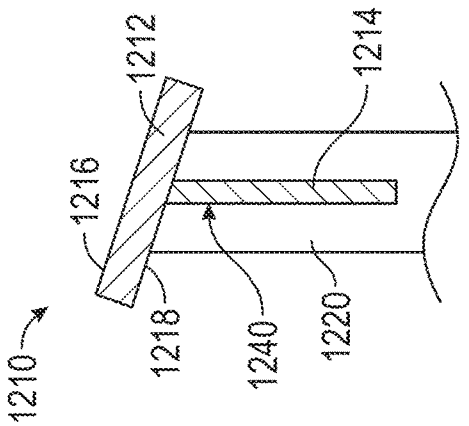

Referring to FIG. 38, the top plate 1212 is angled about a longitudinal axis relative to a horizontal plane. Accordingly, the top surface 1216 and the bottom surface 1218 extend upward as the top plate 1212 extends laterally outward. The top surfaces of the gusset plate 1214, the angled lacing members 1220, and the vertical lacing members 1222 are angled to match the angle of the bottom surface 1218. In other embodiments, the top plate 1212 may be angled in the opposite direction (i.e., such that the top surface 1216 and the bottom surface 1218 extend downward as the top plate 1212 extends laterally outward).

Figure 39:
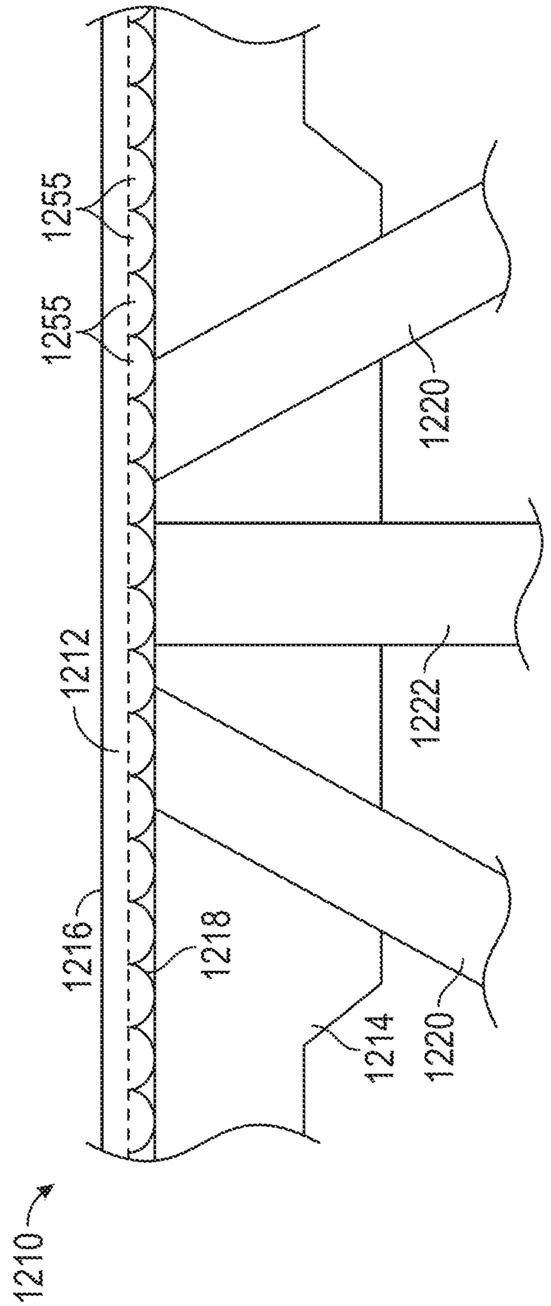
FIG. 39 is a side view of a hand rail of the fly section of FIG. 26, according to an exemplary embodiment.
Figure 40:
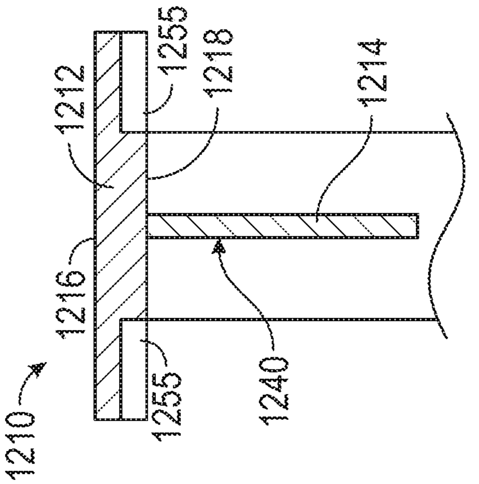
FIG. 40 is a section view a hand rail of the fly section of FIG. 26, according to an exemplary embodiment.

In some embodiments one or more surfaces of the top plate 1212 are shaped, textured (e.g., knurled, slotted, etc.), or otherwise configured to facilitate a solid grip by the user on the hand rail 1210. Referring to FIGS. 39 and 40, the bottom surface 1218 of the top plate 1212 is scalloped. Portions of the top plate 1212 are cut away to form a series of rounded protrusions 1255. In some embodiments, the rounded protrusions 1255 have a circular curvature. A portion of the bottom surface 1218 near the lateral center of the top plate 1212 is flat to facilitate engagement between the gusset plate 1214, the angled lacing member 1220, and the vertical lacing members 1222 and the bottom surface 1218. The rounded protrusions 1255 are located both laterally inward and laterally outward from the angled lacing members 1220 and the vertical lacing members 1222. The rounded protrusions 1255 facilitate a non-slipping engagement between an operator's fingers and the top plate 1212.

In some embodiments, the top plate 1212 is tapered in the longitudinal direction. By way of example, the width and/or thickness of the top plate 1212 may gradually decrease from the end of the fly section 1200 opposite the distal end 704 to the end of the fly section 1200 closest to the distal end 704. When a weight is placed at the distal end 704, the stresses in the fly section 1200 gradually increase as the fly section 1200 extends away from the distal end 704. Accordingly, the width and/or thickness of the top plate 1212 may be reduced gradually toward the distal end 704 without affecting the overall load capacity of the aerial ladder assembly 700. Further, this reduction in width and/or thickness decreases the overall weight of the aerial ladder assembly 700, increasing the load capacity of the aerial ladder assembly 700.

The fly section 1200 may be assembled as a weldment. By way of example, two or more of the base rails 1202, the ladder rungs 1206, the ladder rung supports 1208, the top plate 1212, the gusset plate 1214, the angled lacing members 1220, the vertical lacing members 1222, the gusset plates 1224, the gusset plates 1226, the vertical supports 1230, the bosses 1232, the bushings 1252, and the protrusions 1254 may be provided as separate components. These separate components than may be fixedly coupled to one another as shown and described herein through welding. Alternatively one or more of the components may be fastened together. In some embodiments, the top plate 1212 and the gusset plate 1214 are provided as separate components. In other embodiments, the top plate 1212 and the gusset plate 1214 are integrally formed as a single component. The top plate 1212 and the gusset plate 1214 may be welded or fastened together. Alternatively, the hand rail 1210 may be extruded or forged and subsequently machined into its final shape.

Figure 24:
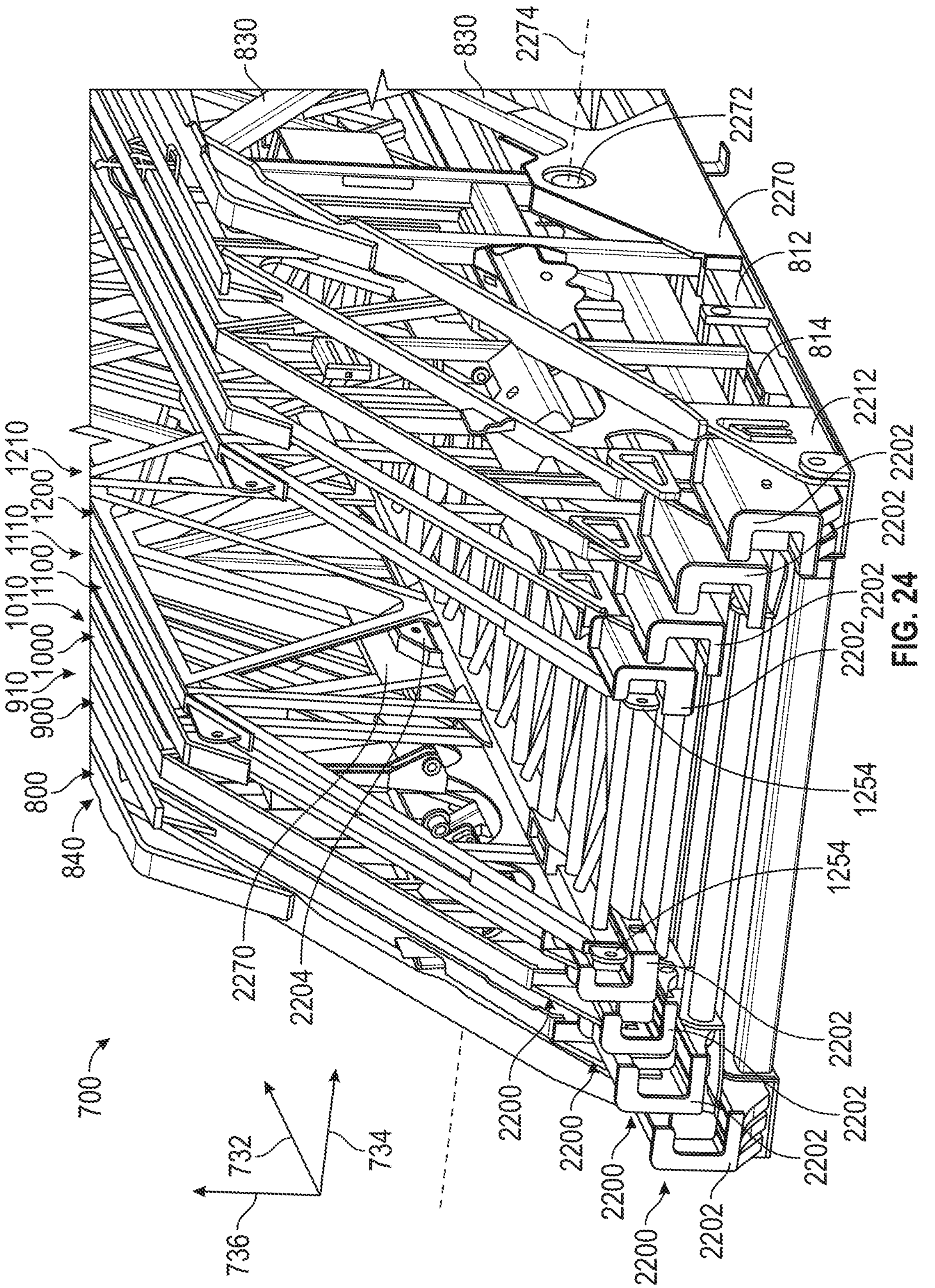
FIG. 24 is a perspective view of the aerial ladder assembly of FIG. 16, according to an exemplary embodiment.

Referring to FIGS. 24, 25, and 28, the lower middle section 900, the middle section 1000, and the upper middle section 1100 have a construction that is substantially similar to that of the fly section 1200 except as otherwise stated herein. Components in these sections may be substantially similar to the parts in the fly section 1200 having similar names. The lower middle section 900 includes a pair of base rails 902 fixedly coupled to one another by a series of ladder rungs 906 and ladder rung supports 908. The lower middle section 900 includes a hand rail 910 having a top plate 912 and a gusset plate 914. The hand rails 910 are coupled to the corresponding base rails 902 by a series of angled lacing members 920. The middle section 1000 includes a pair of base rails 1002 fixedly coupled to one another by a series of ladder rungs 1006 and ladder rung supports 1008. The middle section 1000 includes a hand rail 1010 having a top plate 1012 and a gusset plate 1014. The hand rails 1010 are coupled to the corresponding base rails 1002 by a series of angled lacing members 1020. The upper middle section 1100 includes a pair of base rails 1102 fixedly coupled to one another by a series of ladder rungs 1106 and ladder rung supports 1108. The upper middle section 1100 includes a hand rail 1110 having a top plate 1112 and a gusset plate 1114. The hand rails 1110 are coupled to the corresponding base rails 1102 by a series of angled lacing members 1120.

As shown in FIG. 25, the lower middle section 900 receives the middle section 1000, the middle section 1000 receives the upper middle section 1100, and the upper middle section 1100 receives the fly section 1200. The top surfaces of the top plate 912, the top plate 1012, the top plate 1112, and the top plate 1212 are all level with one another (e.g., arranged in the same horizontal plane). In another embodiment, one or more of the top surfaces of the top plate 912, the top plate 1012, the top plate 1112, and the top plate 1212 are not level with one another (e.g., arranged in the same horizontal plane). To facilitate this arrangement, each ladder section is taller and wider than the ladder section that it directly supports. As such, the upper middle section 1100 is taller and wider than the fly section 1200, the middle section 1000 is taller and wider than the upper middle section 1100, and the lower middle section 900 is taller and wider than the middle section 1000.

Referring to FIGS. 24, 25, and 28, each ladder section directly supports or indirectly supports all of the ladder sections above it. By way of example, the lower middle section 900 supports the middle section 1000 directly as well as the upper middle section 1100 and the fly section 1200 indirectly. Accordingly, each sequential ladder section is configured to support a greater load. This is accomplished using structural members of greater size and thickness. An overall thickness of each top plate may be defined as the greatest distance between the top surface of the top plate and the bottom surface of the top plate as measured parallel to the vertical axis 736. As shown in FIG. 28, the overall thickness of the top plate 1112 is greater than that of the top plate 1212, the overall thickness of the top plate 1012 is greater than that of the top plate 1112, and the overall thickness of the top plate 912 is greater than that of the top plate 1012. The width (e.g., measured in a lateral direction) of each of the top plates may be the same. As shown in FIG. 28, the gusset plate 1114 is wider (e.g., measured in a lateral direction) than the gusset plate 1214, the gusset plate 1014 is wider than the gusset plate 1114, and the gusset plate 914 is wider than the gusset plate 1014. The height of each of the gusset plates (e.g., measured in a vertical direction) between the angled lacing members (e.g., at the midsections 1244) may be the same. The height of each of the gusset plates near the angled lacing members (e.g., at the interface sections 1242) may increase in each of the lower ladder sections.

The arrangement of the lacing members in the lower middle section 900, the middle section 1000, and the upper middle section 1100 may vary from that of the fly section 1200. By way of example, the lower middle section 900, the middle section 1000, and the upper middle section 1100 may include only angled lacing members and no vertical lacing members. By way of another example, the angled lacing members 1120, the angled lacing members 1020, and the angled lacing members 920 may have a rectangular cross section instead of a circular cross section. Additionally, the lower middle section 900, the middle section 1000, and the upper middle section 1100 may each include pulley support assemblies similar to the pulley support assemblies 1228. The fly section 1200 includes a pair of pulley support assemblies 1228 positioned near a lower end (e.g., an end opposite the distal end 704) of the fly section 1200. The lower middle section 900, the middle section 1000, and the upper middle section 1100 may each include two pairs of pulley support assemblies: one pair located at each end of the ladder section. The additional pulley support assemblies may support the cables 724 as they extend to the next ladder section.

Referring to FIGS. 22-25, 28, and 41, the base section 800 is shown according to an exemplary embodiment. The base section 800 may have a construction that is similar to that of the fly section 1200 except as otherwise stated herein. Accordingly, components in the base section 800 may be substantially similar to the components in the fly section 1200 having similar names. The base section 800 includes a pair of base rails 812 extending longitudinally. The base rails 812 may define apertures 814, through which cables, wires, or hoses may enter the base rails 812. The base rails 812 are fixedly coupled to one another by a series of ladder rungs 816 and ladder rung supports 818 extending between the base rails 812. A series of angled lacing members 830 and vertical lacing members 832 are coupled to and extend upward from the base rails 812.

The base section 800 includes a pair of hand rails 840 positioned above the base rails 812. The hand rails 840 each include a top plate 842, a top plate 844, and a top plate 846, each having a solid cross section. A first section 848 of the top plate 842 extends horizontally, and a second section 850 of the top plate 842 is bent downward and extends toward the distal end 704, engaging the top surface of the top plate 846. The top plate 844 engages the bottom surface of the first section 848 of the top plate 842 and extends downward toward the distal end 704. The top plate 846 engages the bottom surface of the top plate 842 and extends downward away from the distal end 704. The angled lacing members 830 and the vertical lacing members 832 engage and fixedly couple to bottom surfaces of the top plate 842, the top plate 844, and/or the top plate 846.

The hand rails 840 each further include a gusset plate 854 extending vertically between and fixedly coupled to the bottom surface of the top plate 842 and a top surface of the top plate 844. A gusset plate 856 extends along and fixedly couples to a bottom surface of the top plate 844, a bottom surface of the top plate 842, and a bottom surface of the top plate 846. A gusset plate 858 extends between and fixedly couples to a bottom surface of the top plate 842 and a top surface of the top plate 846. The gusset plate 858 defines an aperture extending laterally therethrough that acts as the actuator interface 804 (e.g., that is configured to receive a pin that engages the end 714 of a pivot actuator 710). The angled lacing members 830 and the vertical lacing members 832 define slots, notches, or grooves that receive the gusset plate 856. Accordingly, the angled lacing members 830 and the vertical lacing members 832 extend along each lateral side of the gusset plate 856 to engage the bottom surfaces of the of the top plate 842, the top plate 844, and/or the top plate 846. The angled lacing members 830 and the vertical lacing members 832 are fixedly coupled to the gusset plate 856.

Load Transfer Stations

Figure 41:
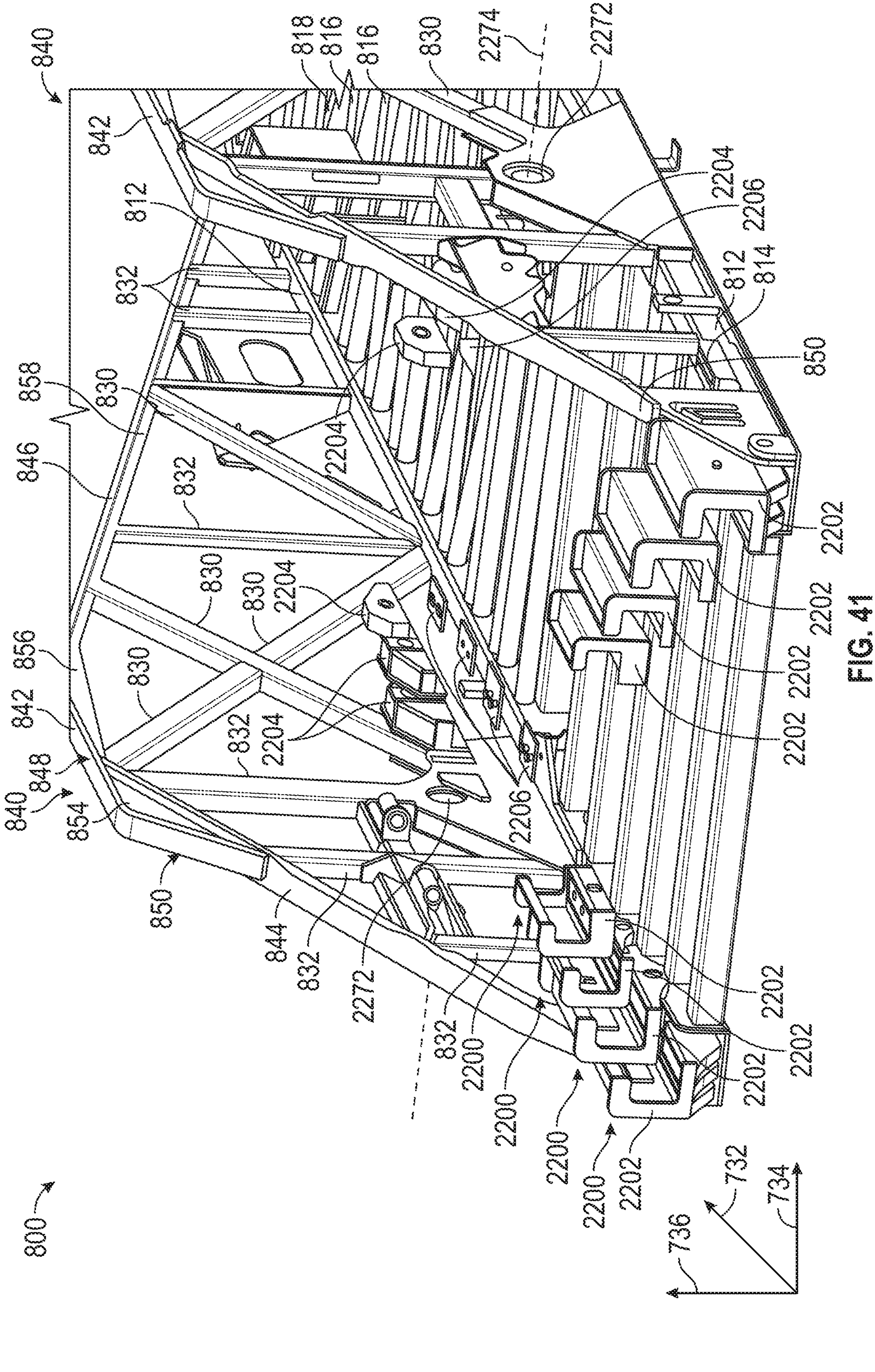
FIG. 41 is a perspective view of a base section and a series of load transfer stations of the aerial ladder assembly of FIG. 16, according to an exemplary embodiment.
Figure 42:
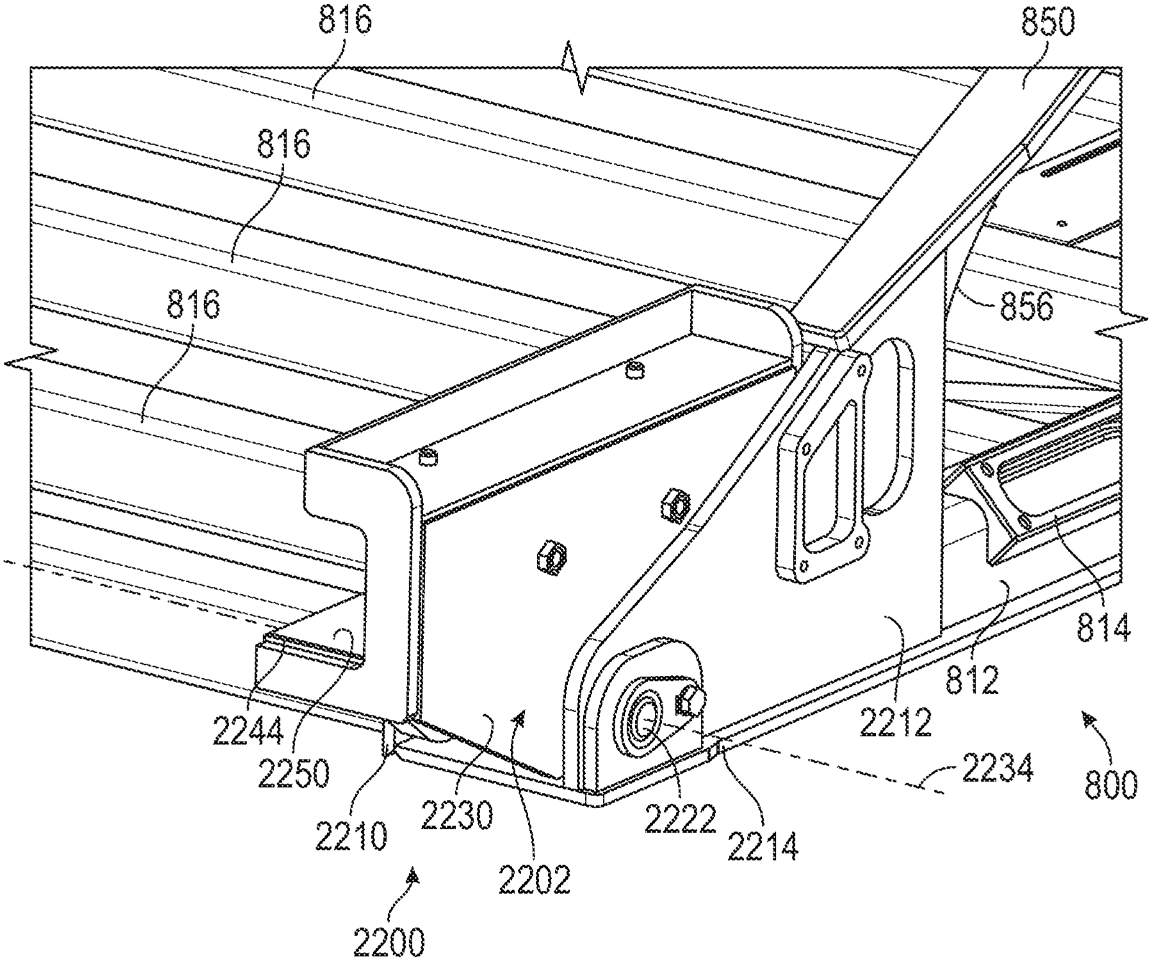
FIG. 42 is a perspective view of the base section of FIG. 41 and a front support of a load transfer station of FIG. 41, according to an exemplary embodiment.
Figure 43:
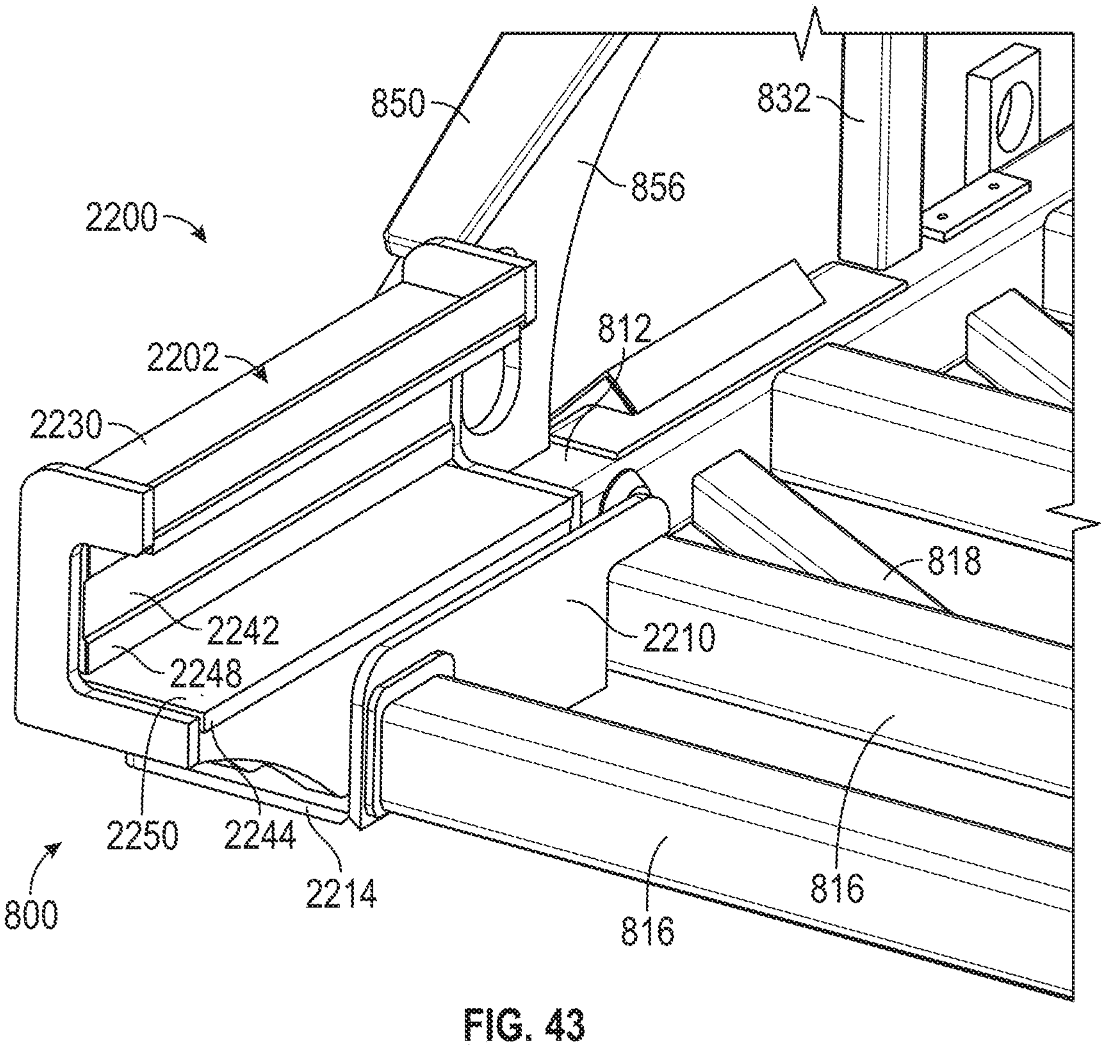
FIG. 43 is another perspective view the base section of FIG. 41 and the front support of FIG. 42, according to an exemplary embodiment.

Referring to FIGS. 24, 25, and 41, the aerial ladder assembly 700 includes a support series of support assemblies, shown as load transfer stations 2200, coupled to the base section 800, the lower middle section 900, the middle section 1000, and the upper middle section 1100. The load transfer stations 2200 slidably couple each ladder section to an adjacent ladder section, facilitating relative longitudinal movement (i.e., movement along the longitudinal axis 732) between each of the ladder sections. Specifically, a load transfer station 2200 slidably couples the lower middle section 900 to the base section 800. A load transfer station 2200 slidably couples the middle section 1000 to the lower middle section 900. A load transfer station 2200 slidably couples the upper middle section 1100 to the middle section 1000. A load transfer station 2200 slidably couples the fly section 1200 to the upper middle section 1100.

Each load transfer station 2200 includes a pair of first load-bearing bodies or load transfer sections, shown as front supports 2202, a pair of second load-bearing bodies or load transfer sections, shown as top rear supports 2204, and a pair of third load-bearing bodies or load transfer sections, shown as bottom rear supports 2206, arranged symmetrically about the center plane 738. The front supports 2202 are positioned at the front ends of the corresponding ladder sections (i.e., the end closest to the distal end 704). The top rear supports 2204 and the bottom rear supports 2206 are offset longitudinally rearward (i.e., away from the distal end 704) relative to the front supports 2202. In some embodiments, the top rear supports 2204 and the bottom rear supports 2206 are positioned in substantially the same longitudinal position. In other embodiments, the top rear supports 2204 and the bottom rear supports 2206 are longitudinally offset from one another.

The front supports 2202, top rear supports 2204, and bottom rear supports 2206 of certain ladder sections (e.g., the base section 800 and the middle section 1000) are shown in detail herein. It should be understood that similar arrangements may be utilized with any of the ladder sections described herein. When describing the load transfer stations 2200 generically, the ladder section to which the load transfer station 2200 is coupled (e.g., the lower ladder section, the base section 800, etc.) is referred to as the supporting ladder section, and the ladder section that the load transfer station 2200 slidably engages (e.g., the upper ladder section, the lower middle section 900, etc.) is referred to as the supported ladder section.

Referring to FIGS. 41-46, the load transfer stations 2200 each include a pair of first supports, shown as inner side plates 2210, a pair of second supports, shown as outer side plates 2212, and a pair of third supports, shown as base plates 2214. The inner side plates 2210 and the outer side plates 2212 each extend parallel to the center plane 738 and are laterally offset from one another. The base plates 2214 extend parallel to a horizontal plane. The inner side plates 2210 are fixedly coupled to one or more of the of the ladder rungs of the supporting ladder section. The outer side plates 2212 are fixedly coupled to the corresponding base rail, the corresponding hand rail, the corresponding vertical lacing members, and/or the corresponding angled lacing members of the supporting ladder section. The base plates 2214 are fixedly coupled to the corresponding base rail, the corresponding inner side plate 2210, and the corresponding outer side plate 2212 of the supporting ladder section.

FIGS. 41-44 illustrate the inner side plates 2210, the outer side plate 2212, and the base plates 2214 implemented with the base section 800. In this arrangement, the inner side plates 2210 are coupled to a pair of the ladder rungs 816 and are offset laterally inward of the base rails 812. The outer side plates 2212 are each coupled to an outer lateral surface (e.g., the outer lateral surface 2262) of the corresponding base rail 812, a bottom surface of the corresponding top plate 844, and an outer lateral surface of the corresponding gusset plate 856. The base plate 2214 is coupled to a bottom surface (e.g., the bottom surface 2264) of the corresponding base rail 812, a bottom surface of the corresponding inner side plate 2210, and a bottom surface of the corresponding outer side plate 2212.

Figure 45:
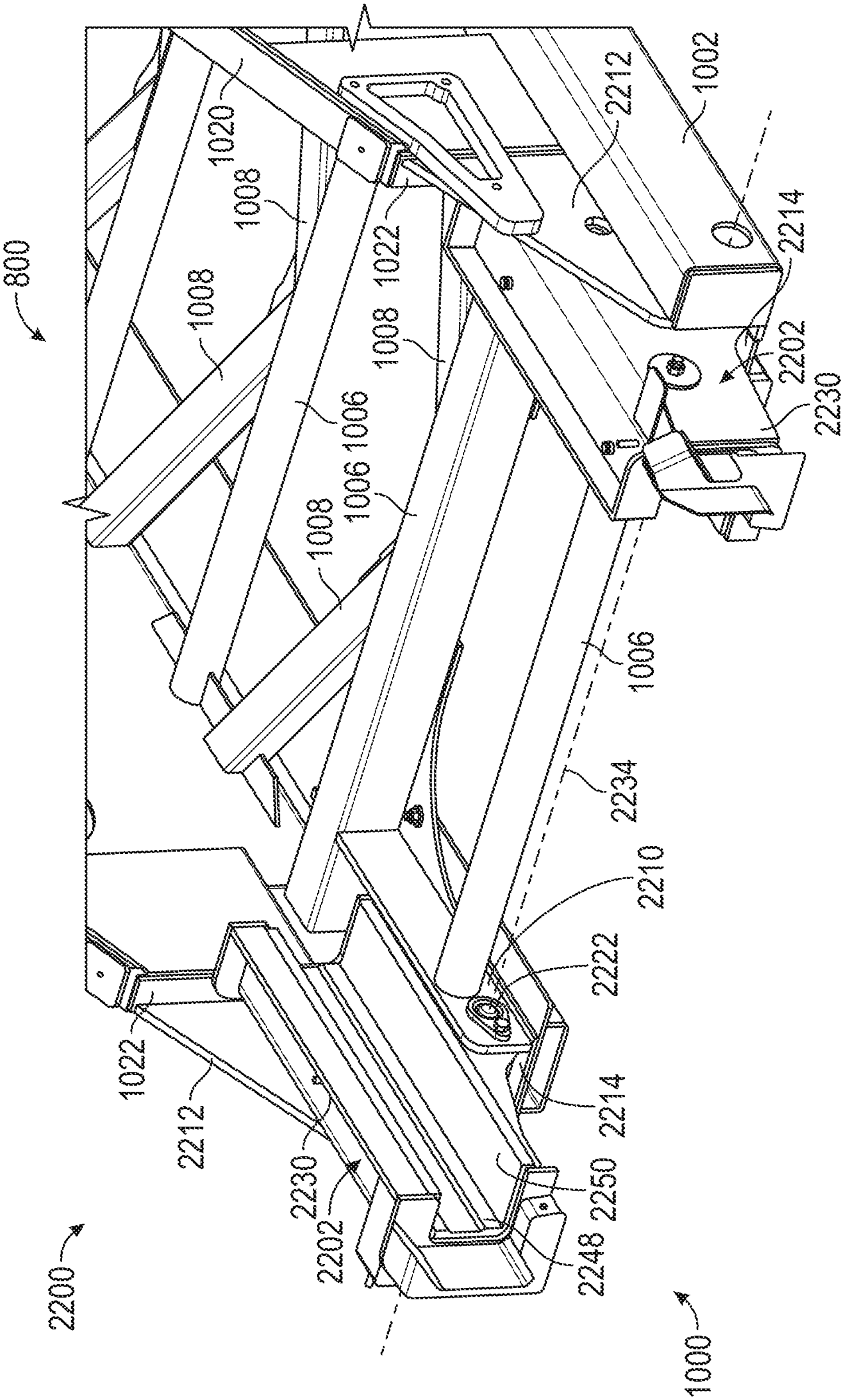
FIG. 45 is a perspective view of a middle section of the aerial ladder assembly of FIG. 16 and a front support of a load transfer station of FIG. 41, according to an exemplary embodiment.
Figure 46:
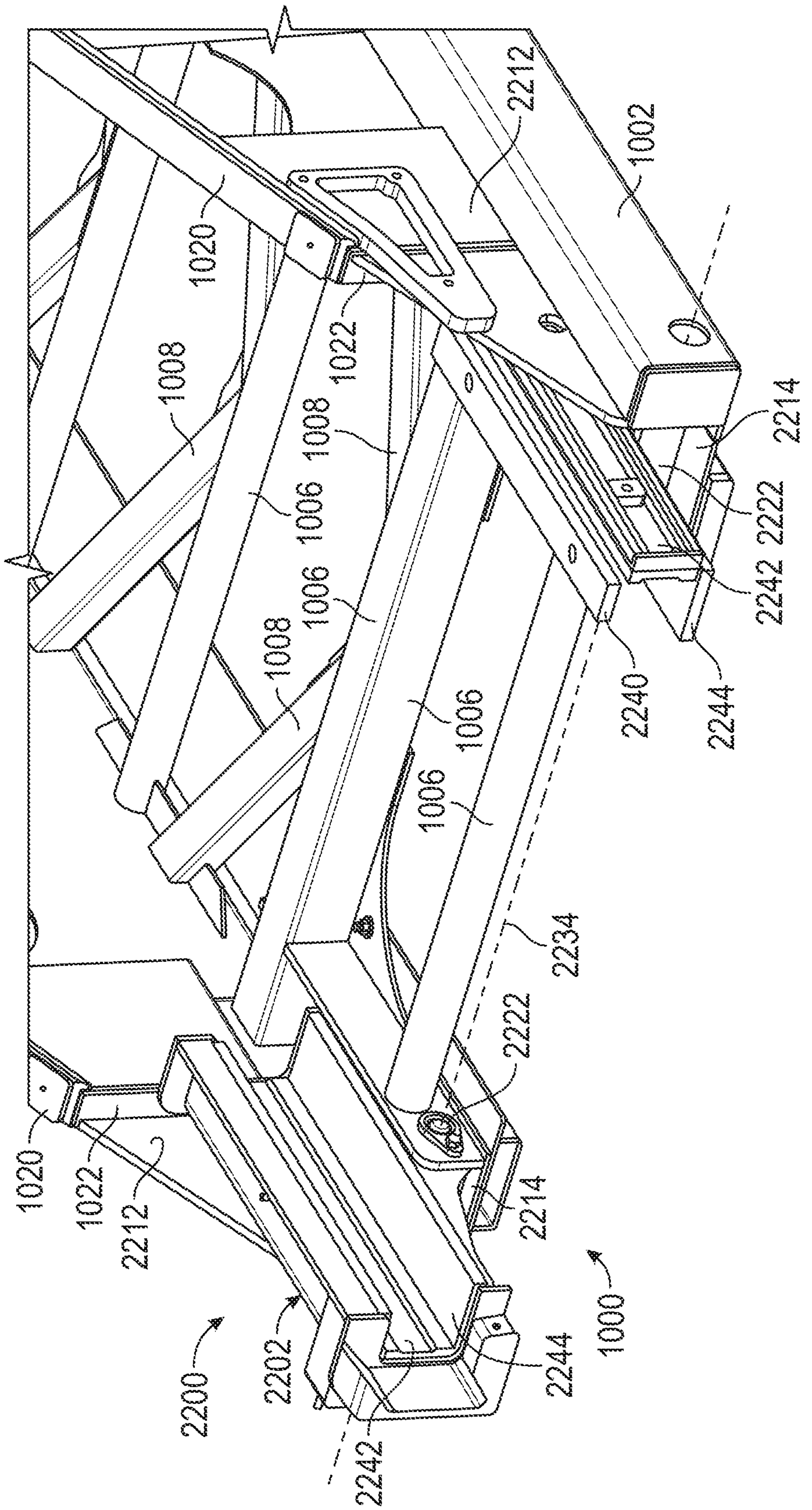
FIG. 46 is another perspective view of the middle section and the front support of FIG. 45, according to an exemplary embodiment.

FIGS. 45 and 46 illustrate the inner side plates 2210, the outer side plate 2212, and the base plates 2214 implemented with the base section 800. In this arrangement, the inner side plates 2210 are coupled to a pair of the ladder rungs 1006 and are offset laterally inward of the base rails 1002. The frontmost of the ladder rungs 1006 may extend only to inner side plates 2210 and not beyond the inner side plates 2210 to the base rails 1002. The outer side plates 2212 are coupled to a lateral surface of the corresponding base rail 1002, a bottom surface of one of the angled lacing members 1020, and front and back surfaces of one of the vertical lacing members 1022. In the embodiment shown in FIGS. 45 and 46, a laterally-inward section of the base rail 1002 is cut away, accommodating the placement of the outer side plate 2212. The base plate 2214 is coupled to a bottom surface (e.g., the bottom surface 2264) of the corresponding base rail 812, a bottom surface of one of the ladder rungs 1006, a bottom surface of the inner side plate 2210, and a bottom surface of the outer side plate 2212.

Figure 44:
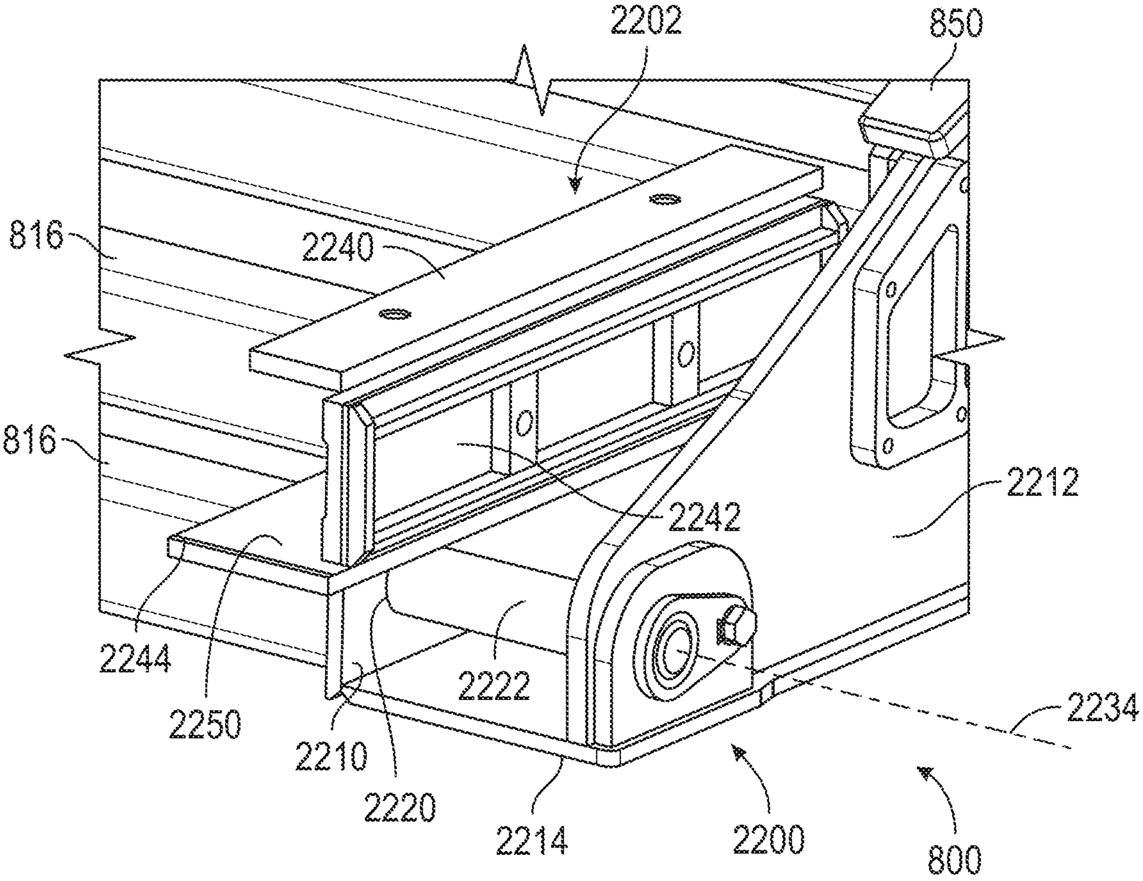
FIG. 44 is another perspective view of the base section of FIG. 41 and the front support of FIG. 42, according to an exemplary embodiment.

Referring to FIGS. 44 and 46, each pair of inner side plates 2210 and outer side plates 2212 defines a recess or aperture 2220 extending at least partially laterally therethrough. The apertures 2220 are configured to receive a cylindrical member, shown as pin 2222, (e.g., a bolt, a rod, a dowel pin, etc.). The pin 2222 extends laterally into and/or through both the inner side plate 2210 and the outer side plate 2212. The pin 2222 may be coupled to the inner side plate 2210 and/or the outer side plate 2212 (e.g., with a fastener) to prevent the pin 2222 from moving laterally.

Figure 47:
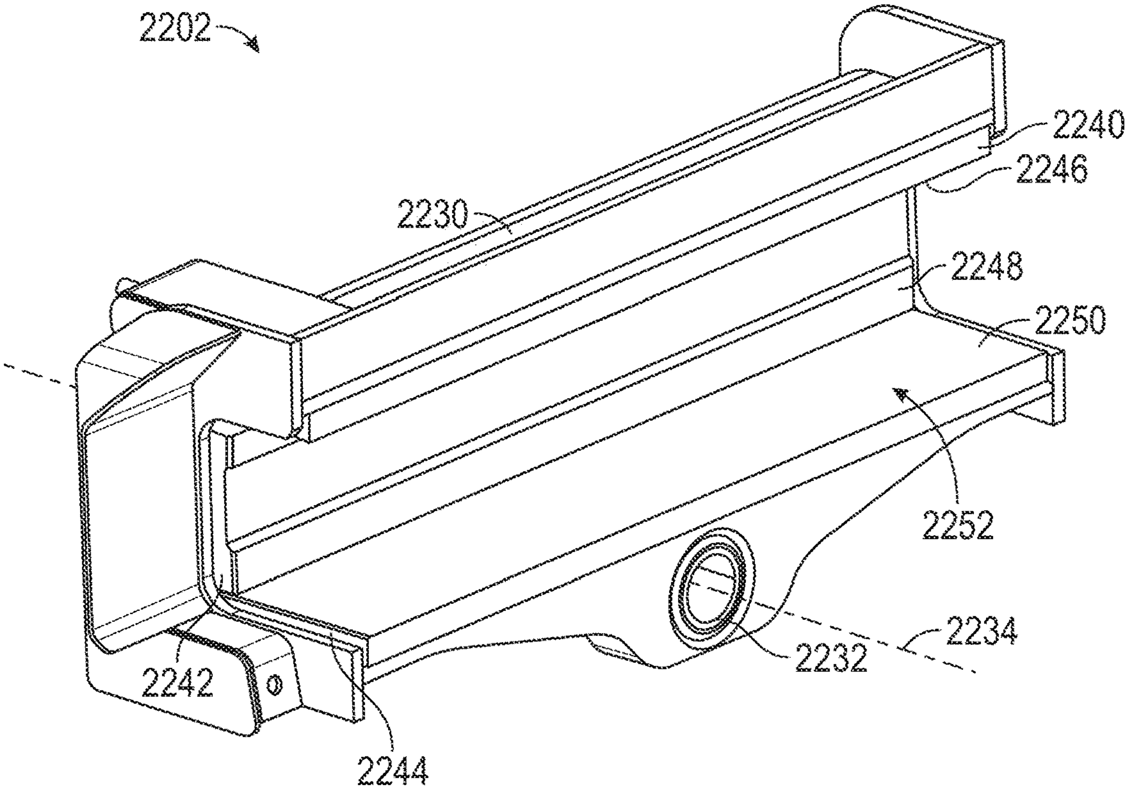
FIG. 47 is a perspective view of the front support of FIG. 45, according to an exemplary embodiment.

Referring to FIG. 47, a front support 2202 is shown. The front support 2202 includes a frame 2230. The frame 2230 defines an aperture 2232 that extends laterally therethrough. The aperture 2232 is configured to receive the pin 2222. Accordingly, the pin 2222 pivotably couples the front support 2202 to the supporting ladder section. Because the pin 2222 and the aperture 2232 extend laterally, the front supports 2202 are both configured to rotate about an axis of rotation 2234 that extends laterally. The frame 2230 may include one or more bushings or bearings that define the aperture 2232 to facilitate rotation between the frame 2230 and the pin 2222.

The front support 2202 further includes a first plate, shown as top guide 2240, a second plate, shown as lateral guide 2242, and a third plate, shown as bottom guide 2244. The top guide 2240, the lateral guide 2242, and the bottom guide 2244 are each coupled to the frame 2230. The frame 2230 is "C" shaped such that the top guide 2240 defines a top engagement surface 2246, the lateral guide 2242 defines a side engagement surface 2248, and the bottom guide 2244 defines a bottom engagement surface 2250. The top engagement surface 2246 faces downward, the side engagement surface 2248 faces laterally inward, and the bottom engagement surface 2250 faces upward. The top engagement surface 2246 and the bottom engagement surface 2250 extend parallel to one another, and the side engagement surface 2248 extends perpendicular to the top engagement surface 2246 and the bottom engagement surface 2250. The top engagement surface 2246, the side engagement surface 2248, and the bottom engagement surface 2250 are substantially flat. In other embodiments, the top engagement surface 2246, the side engagement surface 2248, and the bottom engagement surface 2250 are otherwise shaped. In some embodiments, the top guide 2240, the lateral guide 2242, the bottom guide 2244 are separate components that are coupled (e.g., fastened, adhered, etc.) to the frame 2230. In other embodiments, one or more of the top guide 2240, the lateral guide 2242, the bottom guide 2244, and the frame 2230 are integrally formed as a single piece.

Figure 48:
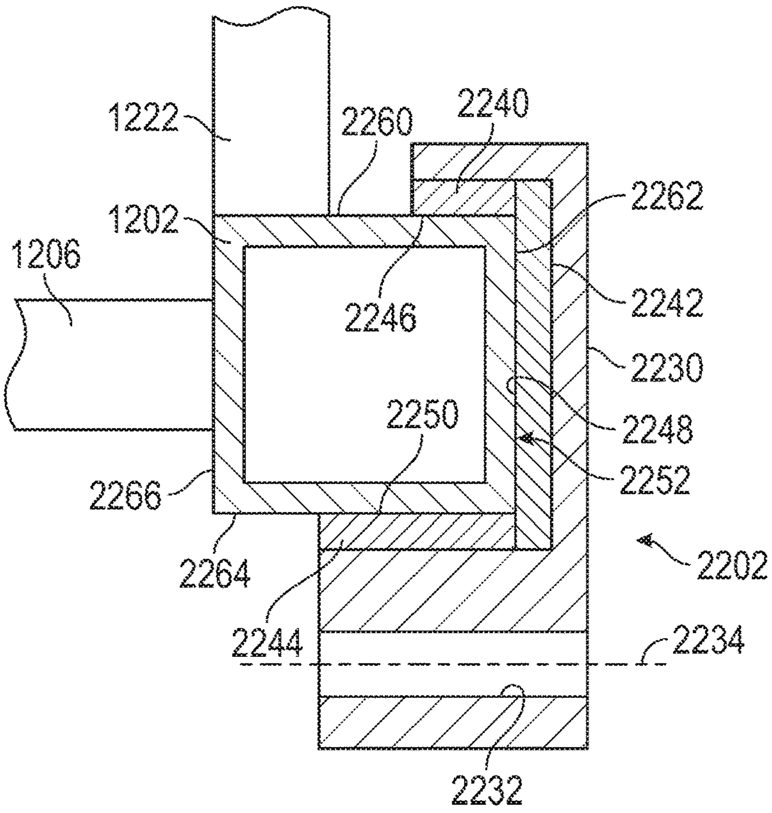
FIG. 48 is a section view of the fly section of FIG. 26 and a front support of a load transfer station of FIG. 41, according to an exemplary embodiment.

Referring to FIGS. 24 and 48, the top guide 2240, the lateral guide 2242, and the bottom guide 2244 together define a recess 2252 therebetween that receives a base rail (e.g., the base rail 1202) of the supported ladder section (e.g., the fly section 1200). Each base rail defines a top surface 2260, an outer lateral surface 2262, a bottom surface 2264, and an inner lateral surface 2266. The top engagement surfaces 2246 engage the top surfaces 2260 and the bottom engagement surfaces 2250 engage the bottom surfaces 2264, limiting upward and downward vertical movement of the supported ladder section relative to the front supports 2202. The side engagement surfaces 2248 engage the outer lateral surfaces 2262, limiting lateral movement of the supported ladder section in both lateral directions relative to the front supports 2202. The front supports 2202 may be sized and positioned such that each of these surfaces are engaged at all times, preventing vertical and lateral movement of the supported ladder section relative to the front supports 2202. Alternatively, the front supports 2202 may be sized and positioned such that spaces or gaps extend between some of these surfaces, facilitating some lateral or vertical movement of the supported ladder section relative to the front supports 2202.

The top guide 2240, the lateral guide 2242, and the bottom guide 2244 are configured to facilitate longitudinal sliding movement of the supported ladder section relative to the front supports 2202. The top guide 2240, the lateral guide 2242, and the bottom guide 2244 may be made from a material that has a low coefficient of friction when engaging the material of the base rails, facilitating sliding motion even under load. By way of example, the top guide 2240, the lateral guide 2242, and the bottom guide 2244 may be made from a hard plastic.

Because the front supports 2202 are pivotably coupled to the supporting ladder section, the front supports 2202 limit the upward and downward vertical movement and the lateral movement (e.g., in both lateral directions) of the supported ladder section relative to the supporting ladder section. However, the front supports 2202 facilitate longitudinal motion (e.g., both extension and retraction) of the supported ladder section relative to the supporting ladder section. The pivotable coupling of the front supports 2202 may additionally or alternatively facilitate maintaining a consistent distributed pressure across the load-bearing bodies or load transfer sections. The pivotable coupling of the front supports 2202 may additionally or alternatively facilitate maintaining a parallel arrangement between the front supports 2202 (e.g., a bottom surface thereof, an inner surface thereof, etc.) and the supported ladder section (e.g., the bottom of the supported ladder section, etc.).

Referring to FIGS. 24, 41, 49, and 50, the load transfer stations 2200 further include a pair of supports, shown as side plate assemblies 2270. The side plate assemblies 2270 extend substantially parallel to the center plane 738 and are symmetrically arranged about the center plane 738. The side plate assemblies 2270 are fixedly coupled to the base rails, the angled lacing members, and/or the vertical lacing members of the supporting ladder section. Each side plate assembly 2270 defines an aperture 2272 extending laterally therethrough. The apertures 2272 of each load transfer station 2200 define an axis of rotation 2274 that extends laterally through the center of each aperture 2272.

Figure 49:
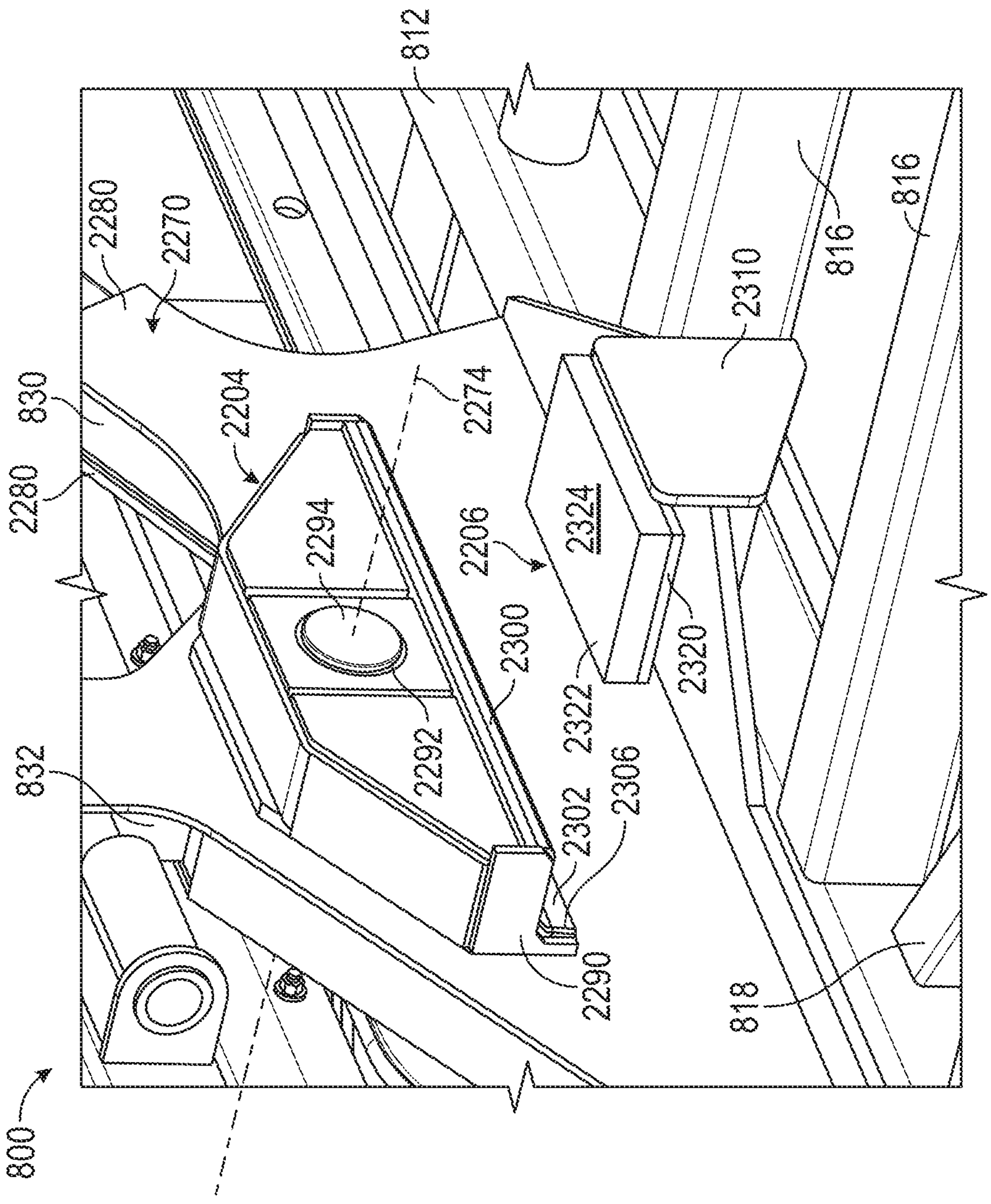
FIG. 49 is a perspective view of the base section of FIG. 41 and a top rear support and a bottom rear support of the load transfer station of FIG. 41, according to an exemplary embodiment.

Referring to FIGS. 41 and 49, the base section 800 includes a pair of side plate assemblies 2270. In the base section 800, the side plate assemblies 2270 each include a pair of side plates 2280. The side plates 2280 are each fixedly coupled to the base rail 812. One of the side plates 2280 is fixedly coupled to the inner lateral surfaces of one of the angled lacing members 830 and one of the vertical lacing members 832. The other side plate 2280 is fixedly coupled to the outer lateral surfaces of that angled lacing member 830 and that vertical lacing member 832. The side plates 2280 may define the aperture 2272 directly, or the side plates 2280 may define apertures that receive a bushing that defines the aperture 2272.

Figure 50:
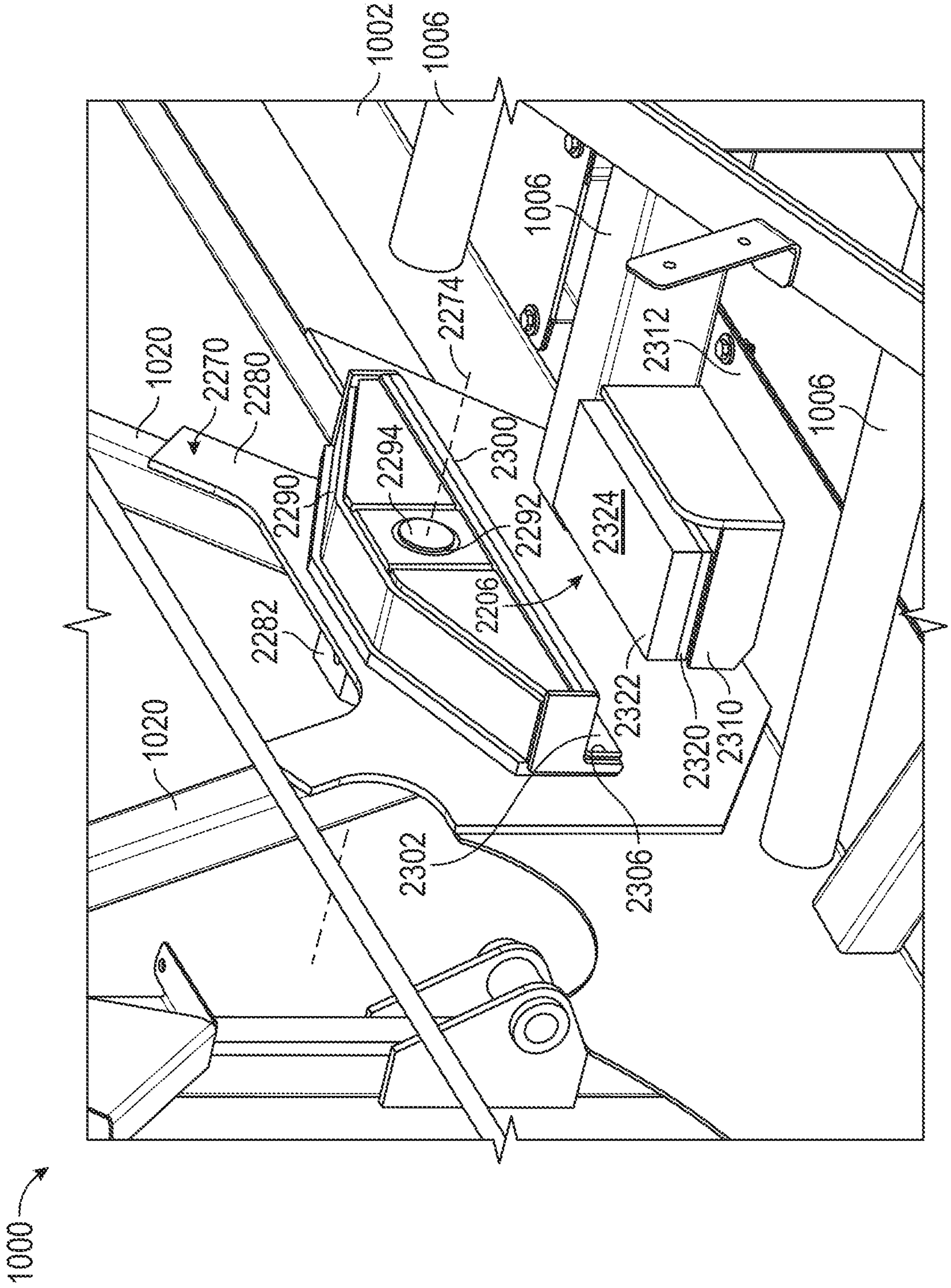
FIG. 50 is a perspective view of the middle section of FIG. 45 and a top rear support and a bottom rear support of the load transfer station of FIG. 45, according to an exemplary embodiment.

Referring to FIG. 50, the middle section 1000 includes a pair of side plate assemblies 2270. These side plate assemblies 2270 each include a side plate 2280 that is fixedly coupled to the inner lateral surfaces of the base rail 1002 and a pair of the angled lacing members 1020. A boss 2282 is fixedly coupled to an outer lateral surface of the side plate 2280. The side plate 2280 and the boss 2282 may define the aperture 2272 directly, or the side plate 2280 and the boss 2282 may define apertures that receive a bushing that defines the aperture 2272.

Figure 51:
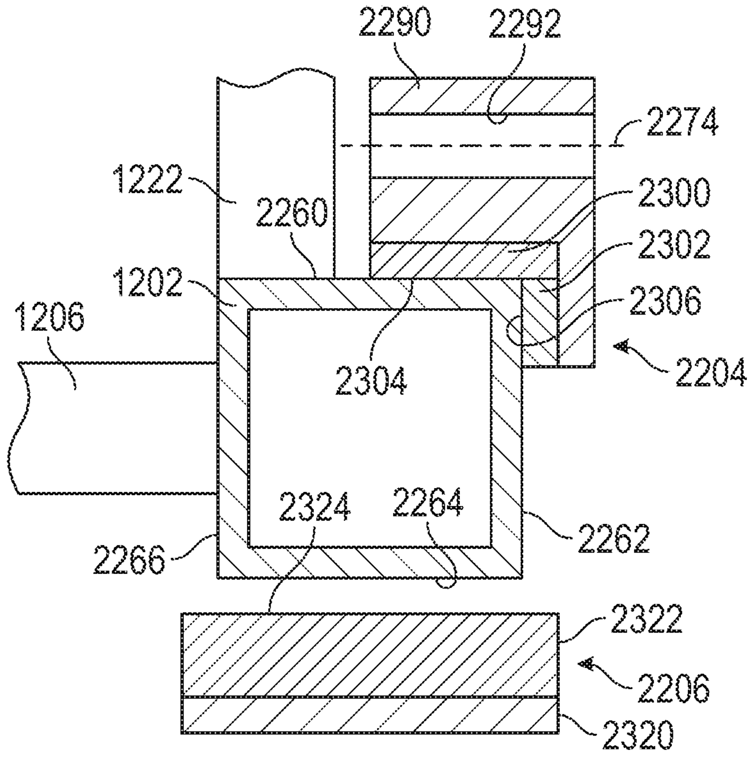
FIG. 51 is a section view of the fly section of FIG. 26 and a top rear support and a bottom rear support of the load transfer station of FIG. 48, according to an exemplary embodiment.

Referring to FIGS. 49, 50, and 51, the top rear supports 2204 are shown. Each top rear support 2204 includes a frame 2290. The frame 2290 defines an aperture 2292 that extends laterally therethrough. The aperture 2292 is configured to receive a pin 2294 that passes into the aperture 2272 of one of the side plate assemblies 2270. Accordingly, the pin 2294 pivotably couples the top rear support 2204 to the supporting ladder section. Because the pin 2294 and the aperture 2272 extend laterally, the top rear supports 2204 are both configured to rotate about the axis of rotation 2274. The frame 2290 may include one or more bushings or bearings that define the aperture 2292 to facilitate rotation between the frame 2290 and the pin 2294. Alternatively, the pin 2294 may be fixedly coupled to either the side plate assembly 2270 or the frame 2290.

The top rear support 2204 further includes a first plate, shown as top guide 2300, and a second plate, shown as lateral guide 2302. The top guide 2300 and the lateral guide 2302 are each coupled to the frame 2290. The frame 2230 is "L" shaped such that the top guide 2300 defines a top engagement surface 2304 and the lateral guide 2302 defines a side engagement surface 2306. The top engagement surface 2304 faces downward and the side engagement surface 2306 faces laterally inward. The side engagement surface 2306 extends perpendicular to the top engagement surface 2304. The top engagement surface 2304 and the side engagement surface 2306 are substantially flat. In other embodiments, the top engagement surface 2304 and the side engagement surface 2306 are otherwise shaped. In some embodiments, the top guide 2300 and the lateral guide 2302 are separate components that are coupled (e.g., fastened, adhered, etc.) to the frame 2290. In other embodiments, one or more of the top guide 2300 and the lateral guide 2302, and the frame 2230 are integrally formed as a single piece.

Referring to FIGS. 49 and 50, the load transfer stations 2200 further include a pair of supports, shown as brackets 2310. The brackets 2310 extend substantially horizontally and are symmetrically arranged about the center plane 738. The brackets 2310 are fixedly coupled to the base rails and/or the ladder rungs of the supporting ladder section. Each bracket 2310 is configured to couple to one of the bottom rear supports 2206.

Referring to FIG. 49, in the base section 800, the brackets 2310 are fixedly coupled to a top surface (e.g., the top surface 2260) of the corresponding base rail 812 and a front surface of one of the ladder rungs 816. Referring to FIG. 50, in the middle section 1000, the brackets 2310 are fixedly coupled to an inner lateral surface (e.g., the inner lateral surface 2266) of the corresponding base rail 1002 and a front surface of one of the ladder rungs 1006. Additionally, each bracket 2310 is fixedly coupled to a top surface of a plate 2312 that extends along a bottom surface of the ladder rungs 1006.

Referring to FIGS. 49-51, the bottom rear supports 2206 are shown. Each bottom rear support 2206 includes a first plate, shown as frame 2320, coupled to the bracket 2310. The frame 2320 may be fixedly coupled to the bracket 2310 or pivotably coupled to the bracket 2310 (e.g., such that the bottom rear supports 2206 rotate about a lateral axis). The bottom rear support 2206 further includes a second plate, shown as bottom guide 2322, coupled to a top surface of the frame 2320. The bottom guide 2322 defines a bottom engagement surface 2324 that faces upward. The bottom engagement surface 2324 is substantially flat. In other embodiments, the bottom engagement surface 2324 is otherwise shaped. In some embodiments, the bottom guide 2322 is a separate component that is coupled (e.g., fastened, adhered, etc.) to the frame 2320. In other embodiments, the bottom guide and the frame 2320 are integrally formed as a single piece.

Referring to FIGS. 24 and 51, the top guide 2300, the lateral guide 2302, and the bottom guide 2322 receive a base rail (e.g., the base rail 1202) of the supported ladder section (e.g., the fly section 1200) therebetween. The top engagement surfaces 2304 engage the top surfaces 2260, limiting upward vertical movement of the supported ladder section relative to the top rear supports 2204. The bottom engagement surfaces 2324 engage the bottom surfaces 2264, limiting downward vertical movement of the supported ladder section relative to the bottom rear supports 2206. The side engagement surfaces 2306 engage the outer lateral surfaces 2262, limiting lateral movement of the supported ladder section relative to the top rear supports 2204. The top rear supports 2204 may be sized and positioned such that the outer lateral surfaces 2262 are engaged at all times, preventing lateral movement of the supported ladder section relative to the top rear supports 2204. Alternatively, the top rear supports 2204 may be sized and positioned such that spaces or gaps extend between the outer lateral surfaces 2262 and the side engagement surfaces 2306, facilitating some lateral movement of the supported ladder section relative to the top rear supports 2204. The top rear supports 2204 and the bottom rear supports 2206 are sized and positioned such that a distance between the top engagement surface 2304 and the bottom engagement surface 2324 is greater than a distance between the top surface 2260 and the bottom surface 2264 of the base rail, providing a space between the base rail and one of the top rear support 2204 and the bottom rear support 2206.

The top guide 2300, the lateral guide 2302, and the bottom guide 2322 are configured to facilitate longitudinal sliding movement of the supported ladder section relative to the top rear supports 2204 and the bottom rear supports 2206. The top guide 2300, the lateral guide 2302, and the bottom guide 2322 may be made from a material that has a low coefficient of friction when engaging the material of the base rail, facilitating sliding motion even under load. By way of example, the top guide 2300, the lateral guide 2302, and the bottom guide 2322 may be made from a hard plastic.

In operation, the aerial ladder assembly 700 extends and retracts. Accordingly, each supported ladder section moves longitudinally relative to the supporting ladder section between a retracted position and an extended position. In the retracted position, the collective center of gravity of the supported ladder section and everything supported by it is positioned longitudinally rearward of the front support 2202. In some embodiments, in the retracted position, the collective center of gravity is positioned longitudinally rearward of the bottom rear supports 2206. In such a configuration, the supported ladder section engages and is supported by the top guides 2240 of the front supports 2202 and the bottom guides 2322 of the bottom rear supports 2206. The front supports 2202 rotate until the top engagement surfaces 2246 are parallel to the corresponding top surfaces 2260. Accordingly, the top guides 2240 engage the base rails along their entire lengths, spreading the force exerted by the front supports 2202 out over an area. In some embodiments, the bottom engagement surfaces 2324 are also parallel to the bottom surfaces 2264 such that the bottom guides 2322 engage the base rails along their entire lengths.

As the aerial ladder assembly 700 extends outward, the collective center of gravity moves longitudinally between the front supports 2202 and the bottom rear supports 2206. In other embodiments, the collective center of gravity is positioned longitudinally between the front supports 2202 and the bottom rear supports 2206 when the supported ladder section is in the retracted position. In this configuration, the supported ladder section engages and is supported by the bottom guides 2244 of the front supports 2202 and the bottom guides 2322 of the bottom rear supports 2206. The front supports 2202 may rotate until the bottom engagement surfaces 2250 are parallel to the corresponding bottom surfaces 2264. Accordingly, the bottom guides 2244 engage the base rails along their entire lengths, spreading the force exerted by the front supports 2202 out over an area. In some embodiments, the bottom engagement surfaces 2324 are also parallel to the bottom surfaces 2264 such that the bottom guides 2322 engage the base rails along their entire lengths.

As the aerial ladder assembly 700 extends further outward, the collective center of gravity moves longitudinally forward of the front supports 2202. In this configuration, the supported ladder section engages and is supported by the bottom guides 2244 of the front supports 2202 and the top guides 2240 of the top rear supports 2204. When moving into this configuration, the supported ladder section rotates until the supported ladder section engages the top rear supports 2204. The front supports 2202 rotate about the axis of rotation 2234 such that the bottom engagement surfaces 2250 remain parallel to the bottom surfaces 2264 throughout this movement. As the supported ladder section engages the top rear supports 2204, the top rear supports 2204 rotate until the top engagement surfaces 2304 are parallel to the corresponding top surfaces 2260. Accordingly, the top guides 2300 engage the base rails along their entire lengths, spreading the force exerted by the top rear supports 2204 out over an area. The aerial ladder assembly 700 may then extend in this configuration until the supported ladder section is in the extended position.

Conventional load transfer stations not include rotating supports. Instead, the supports are fixed to the supporting ladder section. This causes the supports to exert forces on the supported ladder section over a very small area (e.g., as a point load) as the supported ladder section rotates. This introduces large stresses into the supported ladder section. In contrast, the front support 2202 and the top rear support 2204 rotate until the surface area of the support contacting the supported ladder section is maximized. This reduces stresses and wear on the aerial ladder assembly 700, increasing the working life of the fire apparatus 10. Additionally, the reduced stresses facilitate reducing the weight of the load transfer stations.

Figure 52:
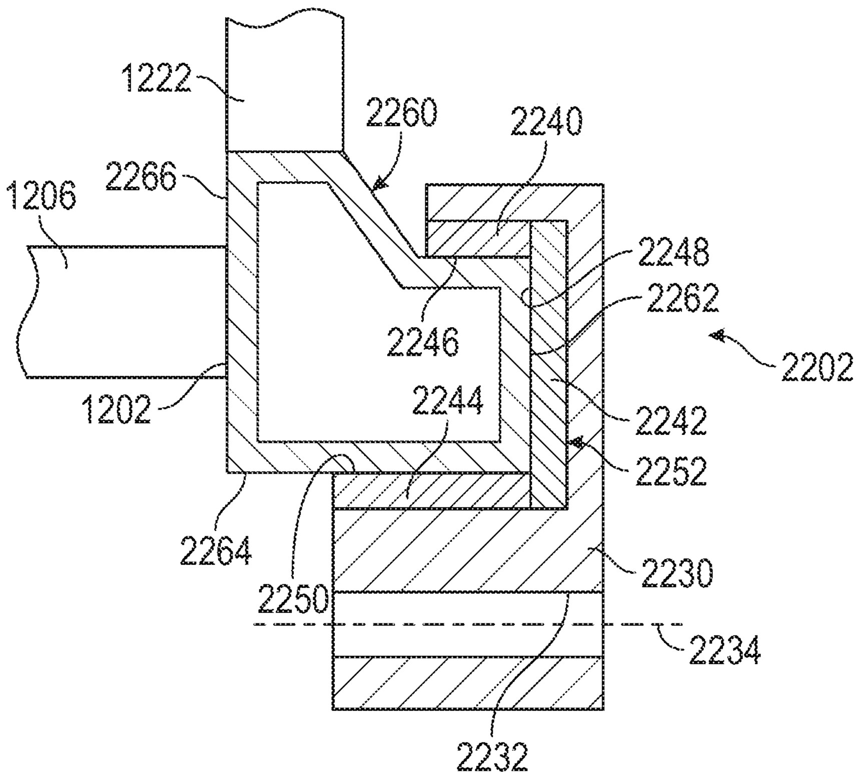
FIG. 52 is a section view of a fly section and a front support of a load transfer station of the aerial ladder assembly of FIG. 16, according to an exemplary embodiment.
Figure 53:
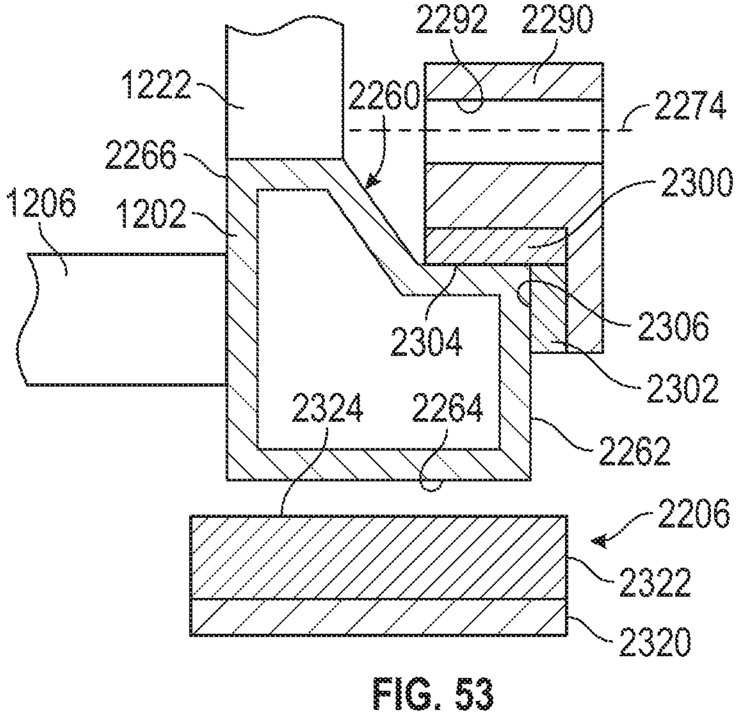
FIG. 53 is a section view of the fly section of FIG. 52 and a top rear support and a bottom rear support of the load transfer station of FIG. 52, according to an exemplary embodiment.
Figure 54:
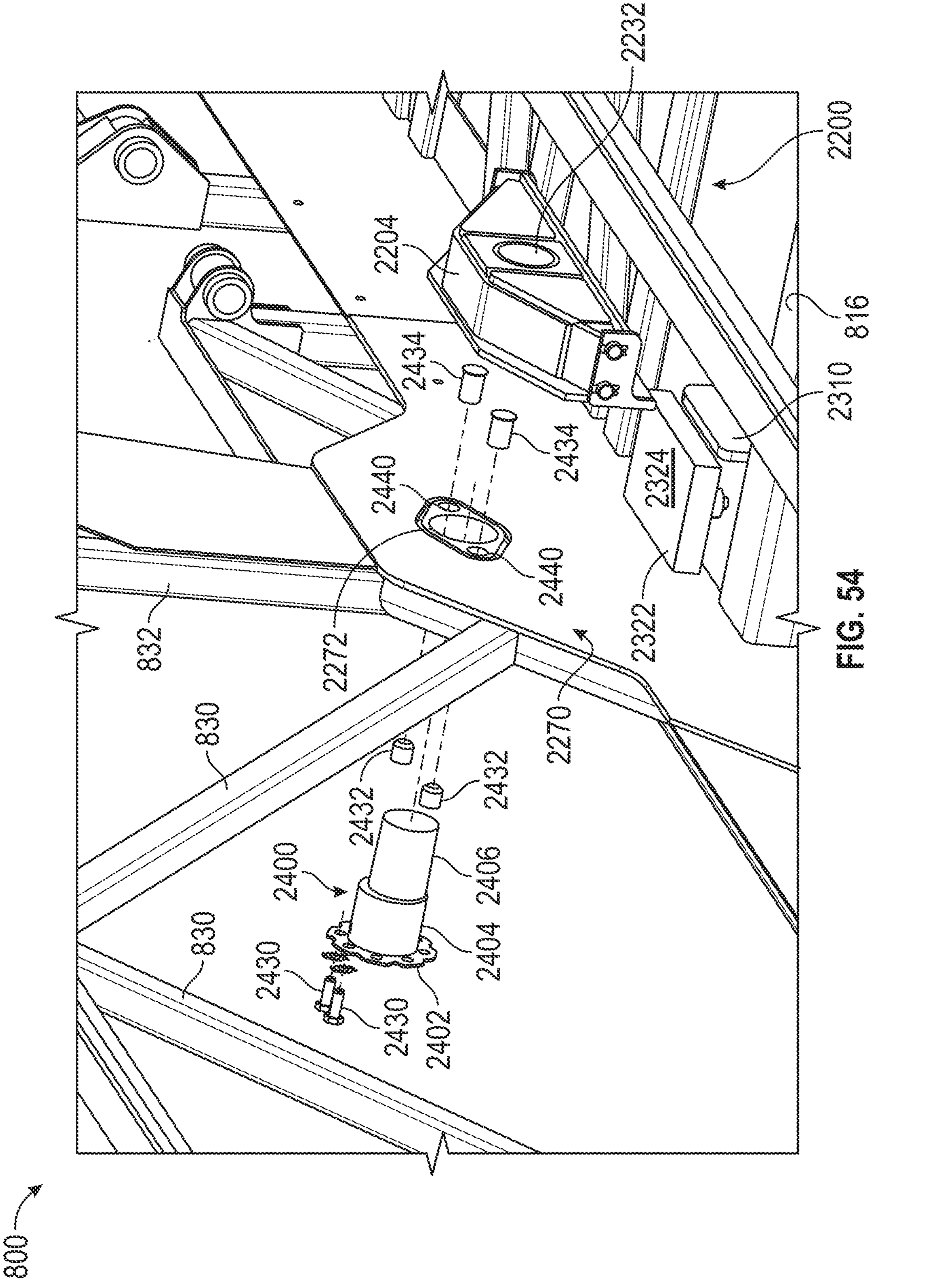
FIG. 54 is an exploded view of a base section of a ladder assembly and a load transfer station including a pin, according to an exemplary embodiment.
Figure 55:
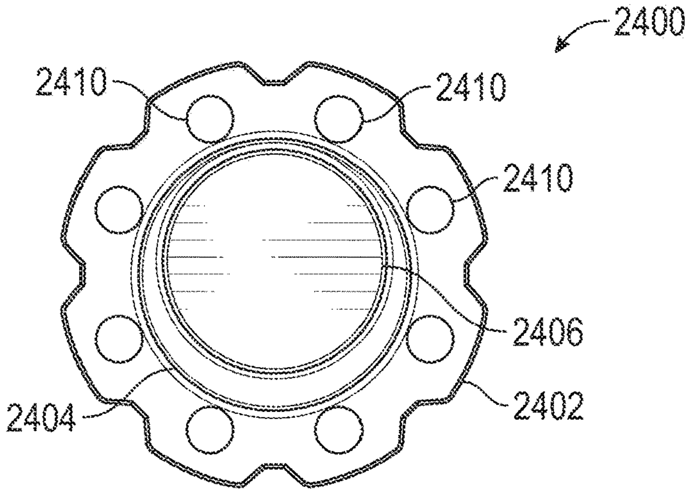
FIG. 55 is a side view of the pin of FIG. 54, according to an exemplary embodiment.
Figure 56:
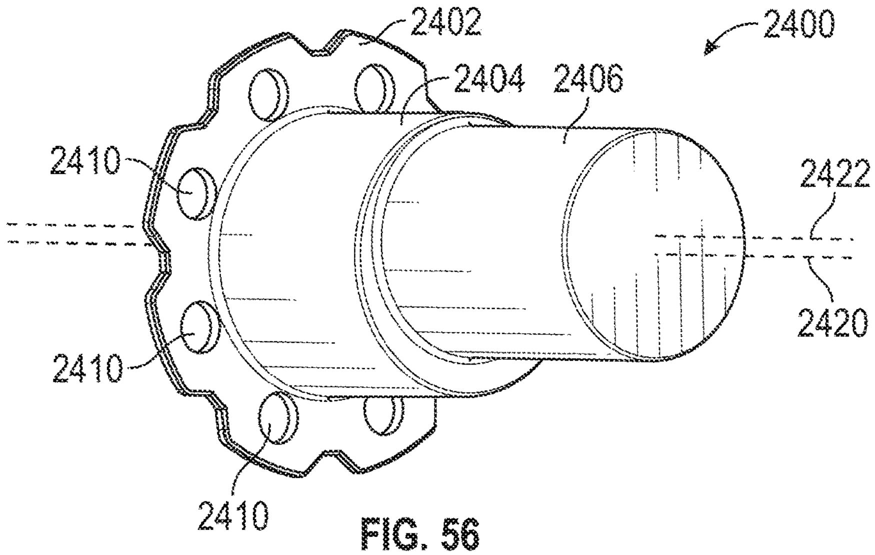
FIG. 56 is a perspective view of the pin of FIG. 54, according to an exemplary embodiment.
Figure 57:
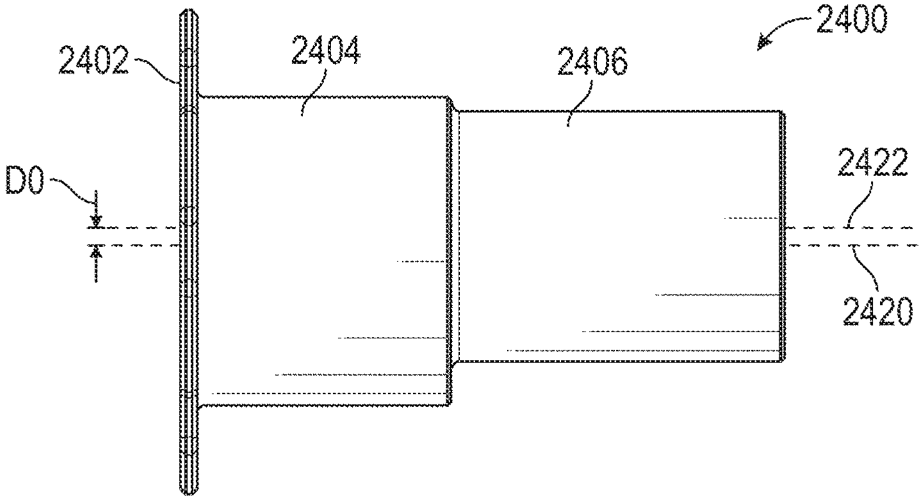
FIG. 57 is a front view of the pin of FIG. 54, according to an exemplary embodiment.

The top surface 2260, the outer lateral surface 2262, the bottom surface 2264, and the inner lateral surface 2266 may include multiple individual segments. In an alternative embodiment shown in FIGS. 52 and 53, the top surface 2260 of the base rail 1202 includes a first horizontal portion that engages the top engagement surface 2246 and the top engagement surface 2304, a second horizontal portion positioned above the first horizontal portion that engages a vertical lacing member 1222, and an angled portion extending between the first horizontal portion and the second horizontal portion. Accordingly, the top surface 2260 is the uppermost surface of the base rail 1202.

In some alternative embodiments, the pin 2222 and the pin 2294 are omitted, and the front support 2202 and the top rear support 2204 are otherwise pivotably coupled to the supporting ladder section. By way of example, the front supports 2202 may be pivotably coupled to the base rails of the supporting ladder section through first compliant mounts, and the top rear supports 2204 may be pivotably coupled to the base rails of the supporting ladder section through second compliant mounts. The compliant mounts are configured to elastically deform under loading, facilitating rotation of the front support 2202 and the top rear support 2204 relative to the supporting ladder section. The compliant mounts may be made of rubber, a series of compression springs, or another structure capable of elastic deformation.

Referring to FIGS. 54-57, a pin 2400 is shown as alternative embodiment of the pin 2294. The pin 2400 may be substantially similar to the pin 2294 except as otherwise stated herein. The pin 2400 includes a first portion, shown as mounting flange 2402, a second portion or shaft, shown as side plate portion 2404, and a third portion or shaft, shown as support portion 2406. The side plate portion 2404 is positioned between the mounting flange 2402 and the support portion 2406. When installed, the mounting flange 2402 engages an outer surface of the base section 800, the side plate portion 2404 extends through the aperture 2272 defined by the side plate assembly 2270, and the support portion 2406 extends through the aperture 2232 defined by the top rear support 2204. The pin 2400 pivotally couples the top rear support 2204 to the side plate assembly 2270.

The mounting flange 2402 and the support portion 2406 are substantially axially aligned. The mounting flange 2402 defines a series of apertures, shown as mounting apertures 2410. The mounting apertures 2410 are arranged in a substantially circular pattern centered around the side plate portion 2404. As shown, the mounting flange 2402 defines eight mounting apertures 2410, and the mounting apertures 2410 are equally spaced. In other embodiments, the mounting apertures 2410 are otherwise spaced and/or the mounting flange 2402 defines more or fewer mounting apertures 2410.

The side plate portion 2404 extends along and is substantially centered about an axis, shown as central axis 2420. The support portion 2406 extends along and is substantially centered about an axis, shown as central axis 2422. The central axis 2420 is offset from the central axis 2422 such that the side plate portion 2404 is substantially parallel to, but not aligned with, the support portion 2406. Specifically, the central axis 2420 is offset from the central axis 2422 by a distance DO.

The mounting apertures 2410 are each configured to receive a mounting fastener or pin, shown as fastener 2430. The fasteners 2430 are removably coupled to (e.g., received within, in threaded engagement with, etc.) a pair of first inserts, shown as threaded inserts 2432. A pair of second inserts, shown as spacers 2434, engage an outer surface of the top rear support 2204 to prevent the top rear support 2204 from scraping against the side plate assembly 2270. The threaded inserts 2432 and the spacers 2434 are received within a pair of apertures 2440 defined by the side plate assembly 2270 (e.g., by a bushing of the side plate assembly 2270). The threaded inserts 2432 and the spacers 2434 may be fixedly coupled (e.g., pressed into, welded, adhered, etc.) to the side plate assembly 2270. Accordingly, the fasteners 2430 selectively couple the pin 2400 to the side plate assembly 2270.

In operation, the pin 2400 facilitates adjustment of the vertical position of the top rear support 2204 relative to the base rail 812. This facilitates adjustment of the amount of vertical movement of the base rail 902 that is permitted between the top rear support 2204 and the bottom rear support 2206. To adjust this spacing, the fasteners 2430 are removed, permitting rotation of the pin 2400 relative to the side plate assembly 2270. When the pin 2400 is rotated, the central axis 2420 remains substantially centered within the aperture 2272, while the central axis 2422 rotates about the central axis 2420. In total, the vertical position of the top rear support 2204 may be varied by a distance of up to twice the distance DO. When the top rear support 2204 is in the desired position, the fasteners 2430 may be inserted into the mounting apertures 2410 that align with the apertures 2440, fixing the orientation of the pin 2400.

Although the pin 2400 has been described as coupling the top rear support 2204 to the base section 800, it should be understood that the pin 2400 may be used to couple one or both of the top rear supports 2204 to any of the ladder sections. Similarly, a pin 2400 may be used to couple one or both of the front supports 2202 to any of the ladder sections.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or movable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An aerial ladder assembly for a fire apparatus, the aerial ladder assembly comprising:

a first ladder section extending longitudinally;

a second ladder section extending longitudinally and selectively repositionable relative to the first ladder section in a longitudinal direction between an extended position and a retracted position;

a first support coupled to the first ladder section;

a second support coupled to the first ladder section and longitudinally offset from the first support; and a third support coupled to the first ladder section and configured to limit downward vertical movement of the second ladder section;

wherein the first support and the second support slidably couple the second ladder section to the first ladder section, wherein the first support is configured to limit downward vertical movement of the second ladder section, wherein the second support is configured to limit upward vertical movement of the second ladder section; and wherein the third support is configured to slidably engage the second ladder section when the second ladder section is in the retracted position.

2. The aerial ladder assembly of claim 1, wherein the first support is configured to limit upward vertical movement of the second ladder section.

3. The aerial ladder assembly of claim 2, wherein the first support is pivotable relative to the first ladder section about a first lateral axis, wherein the second support is pivotable relative to the first ladder section about a second lateral axis, and wherein the second support is pivotable relative to the third support.

4. The aerial ladder assembly of claim 1, wherein the second support is positioned rearward of the first support.

5. The aerial ladder assembly of claim 4, wherein the second support is configured to slidably engage the second ladder section when the second ladder section is in the extended position.

6. The aerial ladder assembly of claim 1, wherein at least one of the first support or the second support are configured to slidably engage the second ladder section to limit lateral movement of the second ladder section relative to the first ladder section.

7. The aerial ladder assembly of claim 1, wherein the second ladder section includes:

a base rail extending longitudinally, the base rail having a bottom surface;

a plurality of lacing members coupled to the base rail and extending above the base rail;

a plurality of ladder rungs coupled to the base rail and extending laterally inward relative to the base rail;

wherein the first support defines a first engagement surface configured to engage the bottom surface of the base rail.

8. The aerial ladder assembly of claim 7, wherein the base rail has an outer lateral surface opposite the ladder rungs, wherein the outer lateral surface is offset laterally outward of each of the lacing members.

9. The aerial ladder assembly of claim 8, wherein the base rail has a top surface opposite the bottom surface, wherein the lacing members are coupled to the top surface of the base rail, and wherein the first support further defines:

a second engagement surface configured to engage the top surface of the base rail; and a third engagement surface configured to engage the outer lateral surface of the base rail.

10. The aerial ladder assembly of claim 7, wherein the second support is positioned rearward of the first support, and wherein the second support defines a second engagement surface configured to engage a top surface of the base rail.

11. The aerial ladder assembly of claim 10, wherein the third support defines a third engagement surface configured to engage the bottom surface of the base rail.

12. The aerial ladder assembly of claim 11, wherein the first engagement surface, the second engagement surface, and the third engagement surface are each substantially flat.

* * * * *